United States Patent
Xie et al.

(10) Patent No.: US 12,096,465 B2
(45) Date of Patent: Sep. 17, 2024

(54) UPLINK DETERMINING METHOD AND APPARATUS

(71) Applicant: HUAWEI TECHNOLOGIES CO., LTD., Shenzhen (CN)

(72) Inventors: Xiaorong Xie, Shanghai (CN); Yanwen Wu, Shanghai (CN); Enhua He, Shanghai (CN); Zhou Xu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 483 days.

(21) Appl. No.: 17/325,343

(22) Filed: May 20, 2021

(65) Prior Publication Data
US 2021/0274513 A1    Sep. 2, 2021

Related U.S. Application Data

(63) Continuation of application No. PCT/CN2019/120400, filed on Nov. 22, 2019.

(30) Foreign Application Priority Data

Nov. 24, 2018 (CN) ......................... 201811411448.7

(51) Int. Cl.
*H04W 72/542* (2023.01)
*H04W 24/08* (2009.01)
(Continued)

(52) U.S. Cl.
CPC ......... *H04W 72/542* (2023.01); *H04W 24/08* (2013.01); *H04W 72/23* (2023.01); *H04W 72/0453* (2013.01)

(58) Field of Classification Search
CPC ... H04W 72/542; H04W 24/08; H04W 72/23; H04W 72/0453; H04W 72/21;
(Continued)

(56) References Cited

U.S. PATENT DOCUMENTS 11,924,881 B2 * 3/2024 Jeon ...................... H04W 16/14
2010/0177654 A1 * 7/2010 Charbit ............... H04W 72/542
370/252
(Continued)

FOREIGN PATENT DOCUMENTS

CN 108055700 A * 5/2018 ........ H04W 72/1268
CN 108353408 A   7/2018
(Continued)

OTHER PUBLICATIONS

3GPP TSG-RAN WG2 Meeting #100, Reno, USA, Nov. 27-Dec. 1, 2017, vivo Random access with SUL and corresponding Text Proposal, R2-1712762. (Year: 2017).*

(Continued)

*Primary Examiner* — Yuwen Pan
*Assistant Examiner* — Swati Jain
(74) *Attorney, Agent, or Firm* — Maier & Maier, PLLC

(57) ABSTRACT

An uplink determining method and an apparatus. An access network device may determine, based on signal quality of a downlink frequency band corresponding to a supplementary uplink (SUL) or signal quality of a frequency band of an SUL, the signal quality of the frequency band of the SUL, to accurately evaluate coverage performance of the SUL; and after determining the signal quality of the frequency band of the SUL, may determine whether to perform transmission on the supplementary uplink, to avoid a case in which the access network device blindly indicates a terminal to perform transmission on the supplementary uplink when signal quality of the supplementary uplink is not measured, leading to transmission of the terminal on the supplementary uplink with poor coverage and even a failure, thereby improving reliability and a transmission rate of uplink transmission and improving user experience.

11 Claims, 25 Drawing Sheets

(51) Int. Cl.
*H04W 72/0453* (2023.01)
*H04W 72/23* (2023.01)

(58) Field of Classification Search
CPC . H04W 76/15; H04W 24/10; H04W 36/0083; H04W 36/08; H04W 36/30; H04B 7/0632; H04L 5/0053
See application file for complete search history.

(56) References Cited

U.S. PATENT DOCUMENTS

| | | | | |
|---|---|---|---|---|
| 2013/0077597 | A1* | 3/2013 | Nukala | H04W 24/08 370/328 |
| 2013/0294296 | A1 | 11/2013 | Dimou et al. | |
| 2015/0245269 | A1* | 8/2015 | Shao | H04W 36/18 370/332 |
| 2019/0261424 | A1* | 8/2019 | Park | H04W 74/006 |
| 2019/0268965 | A1* | 8/2019 | Jang | H04L 5/0094 |
| 2020/0214025 | A1* | 7/2020 | Chen | H04W 48/12 |
| 2020/0396654 | A1* | 12/2020 | Freda | H04W 36/06 |
| 2021/0212128 | A1* | 7/2021 | Tang | H04W 24/10 |
| 2021/0321476 | A1* | 10/2021 | Zhang | H04W 52/365 |
| 2021/0385836 | A1* | 12/2021 | Ye | H04W 72/1268 |
| 2022/0095385 | A1* | 3/2022 | Yi | H04W 74/0833 |
| 2022/0158785 | A1* | 5/2022 | Wang | H04L 1/08 |
| 2022/0232637 | A1* | 7/2022 | Jiang | H04W 72/21 |
| 2022/0346155 | A1* | 10/2022 | Jang | H04L 1/1812 |

FOREIGN PATENT DOCUMENTS

| | | | | |
|---|---|---|---|---|
| CN | 108370574 | A | | 8/2018 |
| CN | 108521883 | A | | 9/2018 |
| CN | 110557821 | A * | 12/2019 | .......... H04W 52/146 |
| CN | 111083725 | A * | 4/2020 | ........... H04B 17/318 |
| CN | 106851822 | B * | 5/2020 | ............ H04W 68/02 |
| CN | 113170361 | A * | 7/2021 | ........ H04W 36/0069 |
| KR | 20190056073 | A * | 5/2019 | ........... H04W 28/04 |
| WO | 2018097680 | A1 | 5/2018 | |
| WO | 2018128426 | A1 | 7/2018 | |
| WO | 2018203736 | A1 | 11/2018 | |

OTHER PUBLICATIONS

3GPP TSG RAN WG1 Meeting #99bis Prague, Czech, Oct. 9-13, 2017, Title: Discussion on SUL carrier Source: ZTE, R2-1710899 (Year: 2017).*

CMCC, 3GPP TSG-RAN WG4 Meeting #86, R4-1801582: "Discussion on Pcompensation type parameters in S-criteria for NR", Athens, GR, Feb. 26-Mar. 2, 2018, 6 pages.

Huawei, HiSilicon, 3GPP TSG RAN meeting #81, RP-181861:"Definition of SUL+SDL band combination", Gold Coast, Australia, Sep. 10-13, 2018, RP-181861, 3 pages.

3GPP TS 38.101-1 V15.3.0 (Sep. 2018), 3rd Generation Partnership Project; Technical Specification Group Radio Access Network; NR; User Equipment (UE) radio transmission and reception; Part 1: Range 1 Standalone (Release 15), 219 pages.

3GPP TS 38.104 V15.3.0 (Sep. 2018), 3rd Generation Partnership Project; Technical Specification Group Radio Access Network; NR; Base Station (BS) radio transmission and reception (Release 15), 151 pages.

3GPP TS 38.331 V15.3.0 (Sep. 2018), 3rd Generation Partnership Project; Technical Specification Group Radio Access Network; NR; Radio Resource Control (RRC) protocol specification (Release 15), 445 pages.

* cited by examiner

Tx: Transmitter
Rx: Receiver

Tx: Transmitter
Rx: Receiver

Core network element 101
(network element in a 5GC)

Access network device 112
(gNB)

Terminal 121

UPLINK DETERMINING METHOD AND APPARATUS

CROSS-REFERENCE TO RELATED APPLICATIONS

This application is a continuation of International Application No. PCT/CN2019/120400, filed on Nov. 22, 2019, which claims priority to Chinese Patent Application No. 201811411448.7, filed on Nov. 24, 2018. The disclosures of the aforementioned applications are hereby incorporated by reference in their entireties.

TECHNICAL FIELD

This application relates to the field of communications technologies, and in particular, to an uplink determining method and an apparatus.

BACKGROUND

Currently, during networking in fifth generation ($5^{th}$ generation) mobile communications, a C-band (C-Band) has a large bandwidth, and is an optimal frequency band for implementing a 5G enhanced mobile broadband (enhanced mobile broadband, eMBB) service. However, downlink coverage is favored over uplink coverage in the C-band due to disproportion in uplink-downlink slot configurations in new radio (new radio, NR) and a large downlink power of a 5G base station. The limited uplink coverage has become a bottleneck for 5G deployment. In addition, with introduction of technologies such as beamforming and cell-specific reference signal-free (cell-specific reference signal-Free, CRS-Free), downlink interference is reduced and a difference between the uplink coverage and the downlink coverage in the C-band is further increased.

Therefore, in a schematic diagram of uplink and downlink decoupling shown in FIG. 1, a concept of a supplementary uplink (supplementary uplink, SUL) is introduced. Uplink data may be carried by using the SUL, and downlink data may be carried by using the C-band, to implement uplink and downlink decoupling. The SUL can effectively utilize resources in an idle frequency band below 3 GHZ (Sub-3G), improve the uplink coverage of the C-band, and enable the provisioning of 5G services in a wider area. The SUL also improves user experience of edge users.

However, how to determine signal quality of the SUL becomes an urgent problem to be resolved.

SUMMARY

This application provides an uplink determining method and an apparatus, to accurately determine whether to perform transmission on a supplementary uplink of a second access network device, thereby preventing the second access network device from blindly indicating a terminal to perform transmission on the supplementary uplink.

According to a first aspect, an uplink determining method is provided. The method includes: receiving first signal quality information, where the first signal quality information indicates signal quality of a first downlink DL, the first DL uses a downlink frequency band of a first frequency band, and an uplink frequency band of the first frequency band is the same as a frequency band of an SUL of a first access network device: determining uplink indication information based on the first signal quality information, where the uplink indication information is used to indicate to perform transmission on the SUL: and sending the uplink indication information to a terminal.

In this aspect, the first access network device may determine, based on signal quality of a downlink frequency band corresponding to the supplementary uplink SUL or signal quality of the frequency band of the SUL, the signal quality of the frequency band of the SUL, to accurately evaluate coverage performance of the SUL: and after determining the signal quality of the frequency band of the SUL, may determine whether to perform transmission on the supplementary uplink, to avoid a case in which the first access network device blindly indicates the terminal to perform transmission on the supplementary uplink when signal quality of the supplementary uplink is not measured, leading to transmission of the terminal on the supplementary uplink with poor coverage and even a failure, thereby improving reliability and a transmission rate of uplink transmission and improving user experience.

In an implementation, the method further includes: receiving second signal quality information, where the second signal quality information indicates signal quality of a second DL, and the second DL uses a downlink frequency band of a second frequency band: and the determining uplink indication information based on the first signal quality information includes: when the signal quality of the first DL is higher than a first threshold, determining the uplink indication information: or when the signal quality of the first DL is higher than the signal quality of the second DL, determining the uplink indication information.

In this implementation, when the signal quality of the first DL is greater than an absolute threshold or the signal quality of the second DL, the first access network device indicates UE to perform transmission on the SUL. In other words, when signal quality of an NUL is relatively poor, the first access network device indicates the UE to perform transmission on the SUL, to improve transmission reliability and user experience.

In another implementation, the receiving the first signal quality information includes: receiving the first signal quality information from the terminal: the receiving the second signal quality information includes: receiving the second signal quality information from the terminal: and the method further includes: sending second measurement control information to the terminal, where the second measurement control information is used to indicate to measure the signal quality of the second DL: and when the signal quality of the second DL is less than a second threshold, delivering first measurement control information to the terminal, where the first measurement control information is used to indicate to measure the signal quality of the first DL.

In this implementation, the first measurement control information may be delivered to the terminal through an air interface or a second access network device, and the second measurement control information may also be delivered to the terminal through an air interface or the second access network device. The first signal quality information may be received from the terminal through an air interface or the second access network device, and the second signal quality information may be received from the terminal through an air interface or the second access network device.

In still another implementation, before transmission is performed on the SUL, transmission is performed on the NUL, where the NUL uses an uplink frequency band of the second frequency band.

In this implementation, in a connected mode, when the signal quality of the first DL is greater than an absolute threshold or the signal quality of the second DL, the UE switches from transmission on the NUL to transmission on the SUL, to improve transmission reliability and user experience.

In still another implementation, the receiving first signal quality information includes: receiving the first signal quality information from the second access network device; and the receiving second signal quality information includes: receiving the second signal quality information from the second access network device, where the first access network device is a secondary access network device, and the second access network device is a master access network device.

In this implementation, in an EN-DC idle mode, both the first signal quality information and the second signal quality information need to be sent by the first access network device to the second access network device.

In still another implementation, the first DL is not a DL of the first access network device.

In this implementation, when the first DL is not the DL of the first access network device, the first access network device needs to deliver measurement control information to the UE to measure the signal quality of the first DL.

In still another implementation, the first DL is a DL of the first access network device.

In this implementation, that the first DL is the DL of the first access network device may be understood as that the first DL is provided by the first access network device, or a downlink frequency band of the first access network device is the same as the downlink frequency band of the first frequency band. In this case, the first access network device does not need to deliver measurement control information to the UE to measure the signal quality of the first DL.

In still another implementation, transmission on the SUL includes random access on the SUL.

In this implementation, the second access network device indicates, based on the first signal quality information, the UE to perform random access on the SUL.

According to a second aspect, an uplink determining method is provided. The method includes: sending first signal quality information, where the first signal quality information indicates signal quality of a first downlink DL, the first DL uses a downlink frequency band of a first frequency band, an uplink frequency band of the first frequency band is the same as a frequency band of an SUL of a first access network device, the first signal information is used to determine uplink indication information, and the uplink indication information is used to indicate to perform transmission on the SUL: and receiving the uplink indication information from the first access network device.

In this aspect, a terminal receives an uplink indication, where the uplink indication is determined by an access network device 112 based on signal quality of the frequency band of the SUL: and the access network device 112 accurately evaluates coverage performance of the SUL, and after determining the signal quality of the frequency band of the SUL, may determine whether to perform transmission on the supplementary uplink, to avoid a case in which the access network device 112 blindly indicates the terminal to perform transmission on the supplementary uplink when signal quality of the supplementary uplink is not measured, leading to transmission of the terminal on the supplementary uplink with poor coverage and even a failure, thereby improving reliability and a transmission rate of uplink transmission and improving user experience.

In an implementation, the method further includes: sending second signal quality information, where the second signal quality information indicates signal quality of a second DL of the first access network device, and the second DL uses a downlink frequency band of a second frequency band, where when the signal quality of the first DL is higher than a first threshold, the uplink indication information is received from the first access network device; or when the signal quality of the first DL is higher than the signal quality of the second DL, the uplink indication information is received from the first access network device.

In this implementation, when a signal quality value of a DL corresponding to the SUL is greater than an absolute threshold or a signal quality value of a DL corresponding to an NUL, a second access network device indicates UE to perform transmission on the SUL. In other words, when signal quality of the NUL is relatively poor, the second access network device indicates the UE to perform transmission on the SUL, to improve transmission reliability and user experience.

In another implementation, the sending the first signal quality information includes: sending the first signal quality information to the first access network device: the sending second signal quality information includes: sending the second signal quality information to the first access network device: and the method further includes: receiving second measurement control information from the first access network device, where the second measurement control information is used to indicate to measure the signal quality of the second DL: and when the signal quality of the second DL is lower than a second threshold, receiving first measurement control information from the first access network device, where the first measurement control information indicates to measure the signal quality of the first DL.

In this implementation, the UE separately measures, based on the measurement control information, the signal quality value of the downlink DL corresponding to the SUL and the signal quality value of the DL corresponding to the NUL.

In another implementation, before transmission is performed on the SUL, transmission is performed on the NUL.

In this implementation, when the UE is connected to only a gNB, or is in an EN-DC connected mode, when the signal quality value of the DL corresponding to the SUL is greater than an absolute threshold or the signal quality value of the DL corresponding to the NUL, the second access network device switches from transmission on the NUL to transmission on the SUL, to improve transmission reliability and user experience.

In another implementation, the sending first signal quality information includes: sending the first signal quality information to a second access network device: and the sending second signal quality information includes: sending the second signal quality information to the second access network device, where the first access network device is a secondary access network device, and the second access network device is a master access network device: and the method further includes: receiving the first measurement control information from the first access network device, where the first measurement control information indicates to measure the signal quality of the first DL: and receiving the second measurement control information from the first access network device, where the second measurement control information is used to indicate to measure the signal quality of the second DL.

In this implementation, in an NSA networking scenario, when the UE is connected to no gNB, that is, in an EN-DC idle mode, the UE receives the first measurement control information and the second measurement control information of the first access network device, and separately performs measurement. Both the first signal quality information and the second signal quality information that are obtained by the UE through measurement need to be forwarded by the first access network device to the second access network device.

In another implementation, the first DL is a DL of the second access network device.

In this implementation, in the EN-DC idle mode, a frequency band of a DL of the first access network device may be the same as a frequency band of a DL corresponding to an SUL of the second access network device. In this case, the first access network device does not need to deliver measurement control information to the UE to measure signal quality of the frequency band of the DL corresponding to the SUL.

In another implementation, the first DL is not a DL of the second access network device.

In this implementation, in the EN-DC idle mode, a frequency band of a DL of the first access network device may be different from a frequency band of a DL corresponding to an SUL of the second access network device, and the first access network device needs to deliver measurement control information to the UE to measure signal quality of the frequency band of the DL corresponding to the SUL.

In another implementation, transmission on the SUL includes random access on the SUL.

In this implementation, in the EN-DC idle mode, the second access network device indicates, based on the first signal quality information, the UE to perform random access on the SUL.

According to a third aspect, an uplink determining method is provided. The method includes: sending first signal quality information to a first access network device, where the first signal quality information indicates a signal quality value of a first downlink DL corresponding to a supplementary uplink SUL of the second access network device, the first DL uses a downlink frequency band of a first frequency band, an uplink frequency band of the first frequency band is the same as a frequency band of a supplementary uplink SUL of the first access network device, and the first signal quality information is used to determine to perform transmission on the SUL: receiving uplink indication information from the first access network device, where the uplink indication information is used to indicate to perform transmission on the SUL: and sending the uplink indication information to the terminal.

In an implementation, the method further includes: sending the second signal quality information to the first access network device, where the second signal quality information indicates signal quality of a DL corresponding to a normal uplink NUL of the second access network device, and the second DL uses a downlink frequency band value of a second frequency band. When a signal quality value of the DL corresponding to the NUL of the second access network device is less than a first threshold, and a signal quality value of a DL corresponding to the SUL of the second access network device is greater than a second threshold, the uplink indication information indicates to perform transmission on the SUL: or when a signal quality value of the DL corresponding to the NUL of the second access network device is less than a first threshold, and a signal quality value of a DL corresponding to the SUL of the second access network device is greater than the signal quality value of the DL corresponding to the NUL of the second access network device, the uplink indication information indicates to perform transmission on the SUL.

In another implementation, the method further includes: sending first measurement control information to the terminal, where the first measurement control information indicates to measure a signal quality value of a downlink DL corresponding to the SUL of the second access network device: receiving the first signal quality information from the terminal: sending second measurement control information to the terminal, where the second measurement control information indicates to measure the signal quality value of the DL corresponding to the NUL of the second access network device: and receiving the second signal quality information from the terminal. The first access network device is a master/secondary access network device, and the second access network device is a secondary/master access network device.

In still another implementation, the first DL is a DL of the second access network device, and a frequency band of a DL of the first access network device is the same as a frequency band of the DL corresponding to the SUL of the second access network device.

In still another implementation, the first DL is not a DL of the second access network device, and a frequency band of a DL of the first access network device is different from a frequency band of the DL corresponding to the SUL of the second access network device.

In still another implementation, transmission on the SUL includes random access on the SUL.

According to a fourth aspect, an uplink determining method is provided. The method includes: receiving first uplink signal quality information from a second access network device, where the first uplink signal quality information indicates a signal quality value of an uplink UL of the first access network device, the first UL uses an uplink frequency band of a first frequency band, and the uplink frequency band of the first frequency band is the same as a frequency band of a supplementary uplink SUL of the first access network device; determining uplink indication information based on the first uplink signal quality information, where the uplink indication information is used to indicate to perform transmission on a supplementary uplink SUL of the second access network device: and sending uplink indication information to a terminal, where the uplink indication information is used to indicate to perform transmission on the SUL, where a frequency band of the UL of the first access network device is the same as a frequency band of the SUL of the second access network device.

In an implementation, the method further includes: determining uplink signal quality value information of an NUL of the second access network device, where the second signal quality information indicates signal quality of a second DL, and the second DL uses a downlink frequency band of a second frequency band: and the determining, based on the first uplink signal quality information, uplink indication information for performing transmission on the SUL includes: when a signal quality value of a DL on the NUL of the second access network device is lower than a first threshold, and a signal quality value of a UL of the first access network device exceeds a second threshold, determining the uplink indication information for performing transmission on the SUL: or when an uplink signal quality value of the NUL of the second access network device is lower than a first threshold, and a signal quality value of a UL of the first access network device exceeds the uplink signal quality value of the NUL of the second access network device, determining the uplink indication information for performing transmission on the SUL, where the second UL uses an uplink frequency band of the second frequency band.

In another implementation, the first access network device is a master/secondary access network device, and the second access network device is a secondary/master access network device.

In another implementation, the performing transmission on the SUL includes: initiating random access on the SUL, or before performing transmission on the SUL, performing transmission on the normal uplink NUL, where the NUL uses the uplink frequency band of the second frequency band.

In another implementation, the method includes: obtaining the first uplink signal quality information, where the first uplink signal quality information indicates the signal quality value of the uplink UL of the first access network device: and sending the first uplink signal quality information to the first access network device, where the first uplink signal quality information is used to determine the uplink indication information, the uplink indication is used to indicate to perform transmission on the supplementary uplink SUL of the first access network device, and the frequency band of the UL of the first access network device is the same as the frequency band of the SUL of the second access network device.

In another implementation, the method further includes: receiving the uplink indication information from the first access network device, where the uplink indication information indicates to perform transmission on the SUL: and sending the uplink indication information to the terminal. The first access network device is a master/secondary access network device, and the second access network device is a secondary/master access network device.

In another implementation, when the uplink signal quality value of the NUL of the second access network device is lower than the first threshold, and the signal quality value of the UL of the first access network device exceeds the second threshold, the uplink indication information indicates to perform transmission on the SUL, and the uplink indication information is determined: or when the uplink signal quality value of the NUL of the second access network device is lower than the first threshold, and the signal quality value of the UL of the first access network device exceeds the uplink signal quality value of the NUL of the second access network device, the uplink indication information indicates to perform transmission on the SUL, and the uplink indication information is determined, where the second UL uses the uplink frequency band of the second frequency band.

According to a fifth aspect, a method is provided. The method includes: obtaining first uplink signal quality information, where the first uplink signal quality information indicates a signal quality value of an uplink UL of the first access network device: and sending the first uplink signal quality information to the first access network device, where the first uplink signal quality information is used to determine uplink indication information, and the uplink indication is used to indicate to perform transmission on a supplementary uplink SUL of the first access network device, and a frequency band of the UL of the first access network device is the same as a frequency band of an SUL of a second access network device.

In an implementation, the method further includes: receiving the uplink indication information from the first access network device, where the uplink indication information indicates to perform transmission on the SUL: and sending the uplink indication information to a terminal. The first access network device is a master/secondary access network device, and the second access network device is a secondary/master access network device.

In another implementation, when an uplink signal quality value of an NUL of the second access network device is lower than a first threshold, and the signal quality value of the UL of the first access network device exceeds a second threshold, the uplink indication information indicates to perform transmission on the SUL, and the uplink indication information is determined: or when an uplink signal quality value of an NUL of the second access network device is lower than a first threshold, and the signal quality value of the UL of the first access network device exceeds the uplink signal quality value of the NUL of the second access network device, the uplink indication information indicates to perform transmission on the SUL, and the uplink indication information is determined, where the second UL uses an uplink frequency band of a second frequency band.

According to a sixth aspect, an embodiment of this application provides an apparatus. The apparatus may be a terminal, or may be a chip in a terminal. The apparatus has a function of implementing the method according to the second aspect. The function may be implemented by hardware, or may be implemented by hardware executing corresponding software. The hardware or the software includes one or more modules corresponding to the function. The apparatus includes a processing unit and a communications unit. Optionally, the apparatus may further include a storage unit. The processing unit may receive or send information by using the communications unit, and the processing unit may process the information, to enable the apparatus to implement the method according to the second aspect.

In an optional design, when the apparatus is the terminal, the terminal includes a processing unit and a communications unit. The processing unit may be, for example, a processor, and the communications unit may be, for example, a transceiver. The transceiver includes a radio frequency circuit. Optionally, the terminal further includes a storage unit. The storage unit may be, for example, a memory. When the terminal includes the storage unit, the storage unit is configured to store computer-executable instructions. The processing unit is connected to the storage unit. The processing unit executes the computer-executable instructions stored in the storage unit, to enable the terminal to perform the method according to the second aspect.

In an aspect, optionally, the communications unit is configured to send first signal quality information, where the first signal quality information indicates signal quality of a first downlink DL, the first DL uses a downlink frequency band of a first frequency band, an uplink frequency band of the first frequency band is the same as a frequency band of a supplementary uplink SUL of a first access network device, the first signal quality information is used to determine uplink indication information, and the uplink indication information is used to indicate to perform transmission on the SUL.

The communications unit is further configured to receive the uplink indication information from the first access network device.

Optionally, the communications unit is further configured to send second signal quality information, where the second signal quality information indicates signal quality of a second DL of the first access network device, and the second DL uses a downlink frequency band of a second frequency band.

The communications unit is configured to: when the signal quality of the first DL is higher than a second threshold, receive the uplink indication information from the first access network device: or the communications unit is configured to: when the signal quality of the first DL is higher than the signal quality of the second DL, receive the uplink indication information from the first access network device.

Optionally, the communications unit is further configured to receive the first measurement control information from the first access network device, where the first measurement control information indicates to measure the signal quality of the first DL.

The communications unit is configured to send the first signal quality information to the first access network device.

The communications unit is configured to receive the second measurement control information from the first access network device.

The communications unit is configured to send the second signal quality information to the first access network device.

Optionally, the communications unit is further configured to: when the signal quality of the second DL is lower than a first threshold, receive first measurement control information, where the first measurement control information indicates to measure the signal quality of the first DL.

Optionally, the communications unit is configured to receive the first measurement control information from the first access network device.

The communications unit is configured to send the first signal quality information to the first access network device.

The communications unit is configured to receive the second measurement control information from the first access network device.

The communications unit is configured to send the second signal quality information to the first access network device.

The first access network device is a secondary access network device, and the second access network device is a master access network device.

In another aspect, optionally, the processing unit is configured to obtain first signal quality information, where the first signal quality information indicates signal quality of a first uplink UL.

The communications unit is configured to send the first signal quality information to a first access network device, where the first signal quality information is used to determine uplink indication information, and the uplink indication is used to indicate to perform transmission on a supplementary uplink SUL of the first access network device.

The first UL is a UL of a second access network device.

Optionally, the communications unit is further configured to receive the uplink indication information from the first access network device, where the uplink indication information indicates to perform transmission on the SUL.

The communications unit is further configured to send the uplink indication information to a terminal.

The first access network device is a secondary access network device, and the second access network device is a master access network device.

Optionally, the processing unit is configured to: when signal quality of the second DL is lower than a first threshold, and the signal quality of the first UL exceeds a second threshold, determine the uplink indication information; or when signal quality of the second DL is lower than a first threshold, and the signal quality of the first UL exceeds signal quality of a second UL, determine the uplink indication information, where the second UL uses an uplink frequency band of a second frequency band.

In another possible design, when the apparatus is the chip in the terminal, the chip includes a processing unit and a communications unit. The processing unit may be, for example, a processor, and the communications unit may be, for example, an input/output interface, a pin, or a circuit. The processing unit may execute computer-executable instructions stored in a storage unit, to enable the chip in the terminal to perform the wireless communication method according to the second aspect. Optionally, the storage unit is a storage unit in the chip, for example, a register or a cache, or the storage unit may be a storage unit in the terminal but outside the chip, for example, a read-only memory (read-only memory, ROM) or another type of static storage device capable of storing static information and instructions, or a random access memory (random access memory, RAM).

According to a seventh aspect, an embodiment of this application provides an apparatus. The apparatus may be an access network device or a chip in an access network device. The apparatus has a function of implementing the method according to the first aspect or the fourth aspect. The function may be implemented by hardware, or may be implemented by hardware executing corresponding software. The hardware or the software includes one or more modules corresponding to the function. The apparatus includes a processing unit and a communications unit. Optionally, the apparatus may further include a storage unit. The processing unit may receive or send information by using the communications unit, and the processing unit may process the information, to enable the apparatus to implement the method according to the first aspect or the fourth aspect.

In an aspect, optionally, the communications unit is configured to receive first signal quality information, where the first signal quality information indicates signal quality of a first downlink DL, the first DL uses a downlink frequency band of a first frequency band, and an uplink frequency band of the first frequency band is the same as a frequency band of an SUL of a first access network device.

The processing unit is configured to determine uplink indication information based on the first signal quality information, where the uplink indication information is used to indicate to perform transmission on the SUL.

The communications unit is further configured to send the uplink indication information to a terminal.

Optionally, the communications unit is further configured to receive second signal quality information from the terminal, where the second signal quality information indicates signal quality of a second DL, and the second DL uses a downlink frequency band of a second frequency band.

The processing unit is specifically configured to: when the signal quality of the first DL is higher than a second threshold, determine the uplink indication information: or when the signal quality of the first DL is higher than the signal quality of the second DL, determine the uplink indication information.

Optionally, the communications unit is further configured to: when the signal quality of the second DL is less than a first threshold, deliver first measurement control information to the terminal, where the first measurement control information is used to indicate to measure the signal quality of the first DL.

Optionally, the communications unit is further configured to receive the first signal quality information from a second access network device.

The communications unit is further configured to receive the second signal quality information from the second access network device, where the second signal quality information indicates the signal quality of the second DL of the first access network device, and the second DL uses the downlink frequency band of the second frequency band. The first access network device is a secondary access network device, and the second access network device is a master access network device.

Optionally, the processing unit is further configured to: when the signal quality of the second DL is lower than a first threshold, and the signal quality of the first DL is higher than a second threshold, determine the uplink indication information: or when the signal quality of the second DL is lower than a first threshold, and the signal quality of the first DL is higher than the signal quality of the second DL, determine the uplink indication information.

In another aspect, the communications unit is configured to receive first signal quality information from a second access network device, where the first signal quality information indicates signal quality of the first uplink UL, the first UL uses an uplink frequency band of a first frequency band, and the uplink frequency band of the first frequency band is the same as a frequency band of a supplementary uplink SUL of a first access network device.

The processing unit is configured to determine uplink indication information based on the first uplink signal quality information, where the uplink indication information is used to indicate to perform transmission on the SUL.

The communications unit is further configured to send the uplink indication information to a terminal.

The first UL is a UL of the second access network device.

Optionally, the processing unit is further configured to determine second signal quality information, where the second signal quality information indicates signal quality of a second DL, and the second DL uses a downlink frequency band of a second frequency band.

The processing unit is specifically configured to: when the signal quality of the second DL is lower than a first threshold, and the signal quality of the first UL exceeds a second threshold, determine the uplink indication information; or when signal quality of the second DL is lower than a first threshold, and the signal quality of the first UL exceeds signal quality of a second UL, determine the uplink indication information, where the second UL uses an uplink frequency band of the second frequency band.

In an optional design, when the apparatus is the access network device, the processing unit may be, for example, a processor, and the communications unit may be, for example, a transceiver. The transceiver includes a radio frequency circuit. Optionally, the storage unit may be, for example, a memory. When the access network device includes the storage unit, the storage unit is configured to store computer-executable instructions. The processing unit is connected to the storage unit. The processing unit executes the computer-executable instructions stored in the storage unit, to enable the access network device to perform the method according to the first aspect or the fourth aspect.

In another possible design, when the apparatus is the chip in the access network device, the processing unit may be, for example, a processor, and the communications unit may be, for example, an input/output interface, a pin, or a circuit. The processing unit may execute computer-executable instructions stored in a storage unit, to enable the chip in the access network device to perform the method according to the first aspect or the fourth aspect. Optionally, the storage unit is a storage unit in the chip, for example, a register or a cache, or the storage unit may be a storage unit in the access network device but outside the chip, for example, a read-only memory (read-only memory, ROM) or another type of static storage device capable of storing static information and instructions, or a random access memory (random access memory, RAM).

The processor mentioned anywhere above may be a general-purpose central processing unit (central processing unit, CPU), a microprocessor, an application-specific integrated circuit (application-specific integrated circuit, ASIC), or one or more integrated circuits configured to control program execution of the method according to the first aspect or the fourth aspect.

According to an eighth aspect, an embodiment of this application provides an apparatus. The apparatus may be an access network device or a chip in an access network device. The apparatus has a function of implementing the method according to the third aspect or the fifth aspect. The function may be implemented by hardware, or may be implemented by hardware executing corresponding software. The hardware or the software includes one or more modules corresponding to the function. The apparatus includes a processing unit and a communications unit. Optionally, the apparatus may further include a storage unit. The processing unit may receive or send information by using the communications unit, and the processing unit may process the information, to enable the apparatus to implement the method according to the third aspect or the fifth aspect.

Optionally, a sending unit is configured to send first signal quality information to a first access network device, where the first signal quality information indicates signal quality of a first downlink DL, the first DL uses a downlink frequency band of a first frequency band, and an uplink frequency band of the first frequency band is the same as a frequency band of a supplementary uplink SUL of a first access network device.

A receiving unit is configured to receive uplink indication information from the first access network device, where the uplink indication information is used to indicate to perform transmission on the SUL.

The sending unit is further configured to send the uplink indication information to the terminal.

Optionally, the sending unit is further configured to send the second signal quality information to the first access network device, where the second signal quality information indicates signal quality of a second DL, and the second DL uses a downlink frequency band of a second frequency band.

When the signal quality of the second DL is less than a first threshold, and the signal quality of the first DL is greater than a second threshold, the uplink indication information indicates to perform transmission on the SUL: or when the signal quality of the second DL is less than a first threshold, and the signal quality of the first DL is greater than the signal quality of the second DL, the uplink indication information indicates to perform transmission on the SUL.

Optionally, the sending unit is configured to send first measurement control information to the terminal, where the first measurement control information indicates to measure the signal quality of the first DL.

The receiving unit is configured to receive the first signal quality information from the terminal.

The sending unit is further configured to send second measurement control information to the terminal, where the second measurement control information indicates to measure the signal quality of the second DL.

The receiving unit is further configured to receive the second signal quality information from the terminal.

In an optional design, when the apparatus is the access network device, the processing unit may be, for example, a processor, and the communications unit may be, for example, a transceiver. The transceiver includes a radio frequency circuit. Optionally, the storage unit may be, for example, a memory. When the access network device includes the storage unit, the storage unit is configured to store computer-executable instructions. The processing unit is connected to the storage unit. The processing unit executes the computer-executable instructions stored in the storage unit, to enable the access network device to perform the method according to the third aspect or the fifth aspect.

In another possible design, when the apparatus is the chip in the access network device, the processing unit may be, for example, a processor, and the communications unit may be, for example, an input/output interface, a pin, or a circuit. The processing unit may execute computer-executable instructions stored in a storage unit, to enable the chip in the access network device to perform the method according to the third aspect or the fifth aspect. Optionally, the storage unit is a storage unit in the chip, for example, a register or a cache, or the storage unit may be a storage unit in the access network device but outside the chip, for example, a read-only memory or another type of static storage device capable of storing static information and instructions, or a random access memory.

The processor mentioned anywhere above may be a general-purpose central processing unit, a microprocessor, an application-specific integrated circuit, or one or more integrated circuits configured to control program execution of the method according to the third aspect or the fifth aspect.

According to a ninth aspect, a communications apparatus is provided. The communications apparatus includes a processor. The processor is coupled to a memory, the memory is configured to store a computer program or instructions, and the processor is configured to execute the computer program or the instructions in the memory, to enable the communications apparatus to perform the method according to the first aspect or the fourth aspect.

According to a tenth aspect, a communications apparatus is provided. The communications apparatus includes a processor. The processor is coupled to a memory, the memory is configured to store a computer program or instructions, and the processor is configured to execute the computer program or the instructions in the memory, to enable the communications apparatus to perform the method according to the second aspect.

According to an eleventh aspect, a communications apparatus is provided. The communications apparatus includes a processor. The processor is coupled to a memory, the memory is configured to store a computer program or instructions, and the processor is configured to execute the computer program or the instructions in the memory, to enable the communications apparatus to perform the method according to the third aspect or the fifth aspect.

According to a twelfth aspect, a computer-readable storage medium is provided. The computer-readable storage medium stores instructions. When the instructions are run on a computer, the computer is enabled to perform the method according to any one of the first aspect to the fifth aspect or the implementations of the first aspect to the fifth aspect.

According to a thirteenth aspect, a computer program product including instructions is provided. When the computer program product runs on a computer, the computer is enabled to perform the method according to any one of the first aspect to the fifth aspect or the implementations of the first aspect to the fifth aspect.

DESCRIPTION OF EMBODIMENTS

The following describes the embodiments of the present invention with reference to the accompanying drawings in the embodiments of the present invention.

Figure 1:
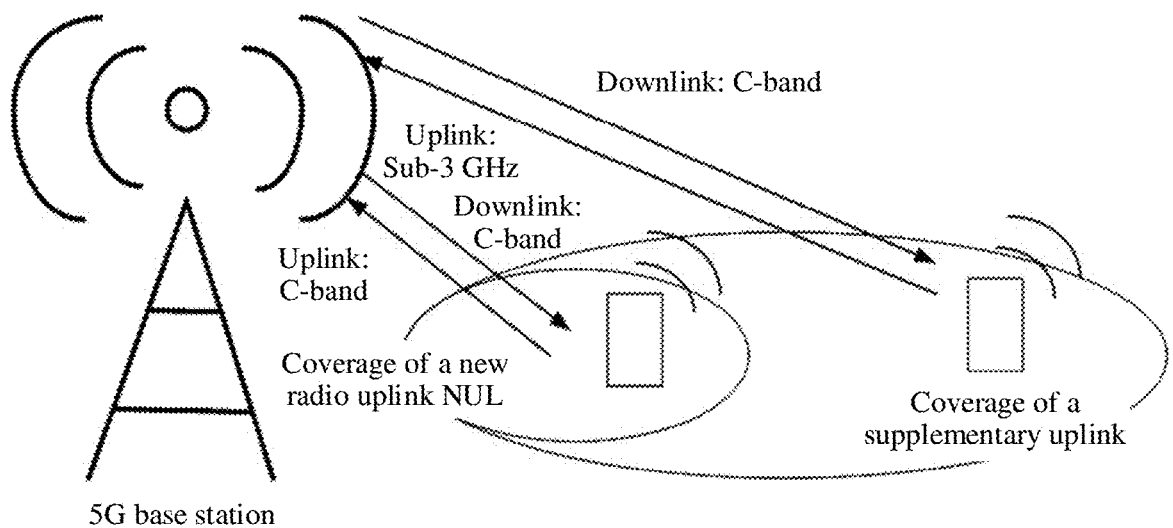
FIG. 1 is a schematic diagram of uplink and downlink decoupling.
Figure 2:
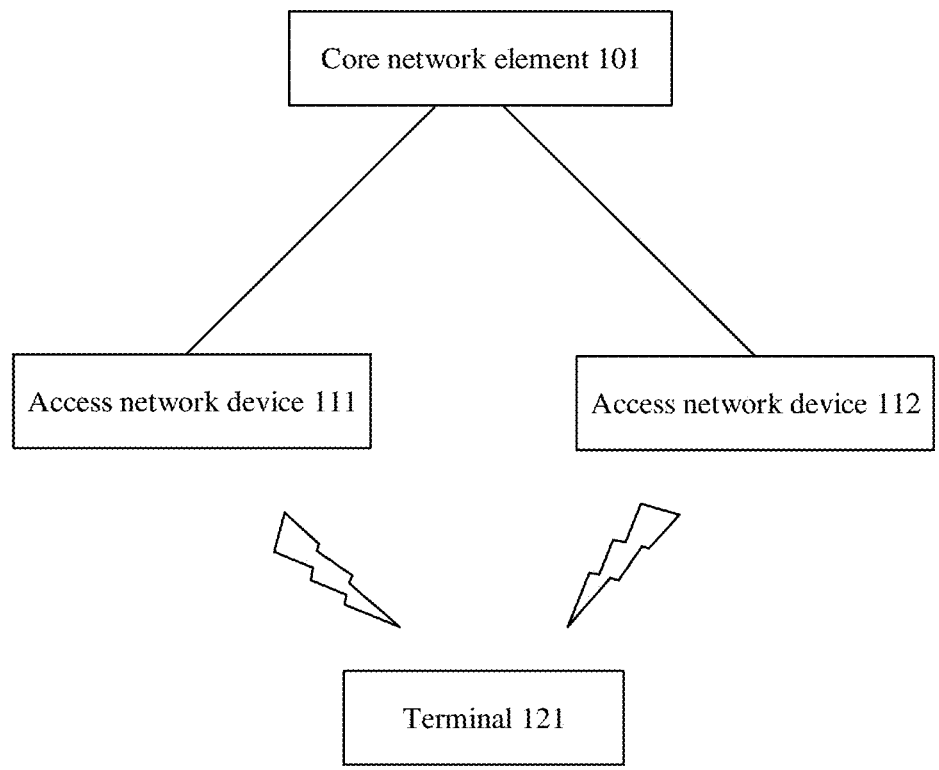
FIG. 2 is a schematic structural diagram of a communications system according to an embodiment of this application.

The technical solutions in the embodiments of this application are applicable to a communications system shown in FIG. 2. The communications system includes a core network element 101, an access network device 111, and an access network device 112. The core network element 101 may be connected to the access network device 111 and the access network device 112. Optionally, the access network device 111 may be connected to the access network device 112.

In the communications system shown in FIG. 2, a terminal 121 may communicate with at least one of the access network device 111 and the access network device 112. For example, the terminal 121 may communicate with the access network device 111. Alternatively, the terminal 121 may communicate with the access network device 112. Alternatively, the terminal 121 may communicate with both the access network device 111 and the access network device 112. It should be noted that the core network element and the access network device included in the communications system in FIG. 2 are merely examples. In the embodiments of this application, types and a quantity of network elements included in the communications system, and a connection relationship between the network elements are not limited thereto.

The communications system may be a communications system that supports a fourth generation (fourth generation, 4G) access technology, for example, a long term evolution (long term evolution, LTE) access technology. Alternatively, the communications system may be a communications system that supports a fifth generation (fifth generation, 5G) access technology, for example, a new radio (new radio, NR) access technology. Alternatively, the communications system may be a communications system that supports a third generation (third generation, 3G) access technology, for example, a (universal mobile telecommunications system, UMTS) access technology. Alternatively, the communications system may be a communications system that supports a second generation (second generation, 2G) access technology, for example, a global system for mobile communications (global system for mobile communications, GSM) access technology. Alternatively, the communications system may be a communications system that supports a plurality of wireless technologies, for example, a communications system that supports an LTE technology and an NR technology. In addition, the communications system is further applicable to future-oriented communications technologies.

The access network device 111 and the access network device 112 in FIG. 2 each may be a device that is on an access network side and that is configured to support the terminal in accessing a communications system, for example, a base transceiver station (base transceiver station, BTS) and a base station controller (base station controller, BSC) in the communications system that supports the 2G access technology, a NodeB (node B) and a radio network controller (radio network controller, RNC) in the communications system that supports the 3G access technology, an evolved NodeB (evolved nodeB, eNB) in the communications system that supports the 4G access technology, a next generation NodeB (next generation nodeB, gNB) in the communications system that supports the 5G access technology, a transmission reception point (transmission reception point, TRP), a relay node (relay node), or an access point (access point, AP).

The core network element 101 in FIG. 2 may control one or more access network devices, or manage resources in the system in a unified manner, or may configure a resource for the terminal. For example, the core network element may be a serving general packet radio service (general packet radio service, GPRS) support node (serving GPRS support node, SGSN) or a gateway GPRS support node (gateway GPRS support node, GGSN) in the communications system that supports the 3G access technology, or a mobility management entity (mobile management entity, MME) or a serving gateway (serving gateway, SGW) in the communications system that supports the 4G access technology, or an access and mobility management function (access and mobility management function, AMF) network element or a user plane performance (user plane function, UPF) network element in the communications system that supports the 5G access technology.

The terminal 121 in FIG. 2 may be a device that provides voice or data connectivity for a user, and may also be referred to as, for example, user equipment (user equipment, UE), a mobile station (mobile station), a subscriber unit (subscriber unit), a station (station), or terminal equipment (terminal equipment, TE). The terminal may be a cellular phone (cellular phone), a personal digital assistant (personal digital assistant, PDA), a wireless modem (modem), a handheld (handheld) device, a laptop computer (laptop computer), a cordless phone (cordless phone), a wireless local loop (wireless local loop, WLL) station, a tablet computer (pad), or the like. With development of wireless communications technologies, any device that can access a communications system, communicate with a network side of a communications system, or communicate with another object by using a communications system may be the terminal in the embodiments of this application, such as a terminal and a vehicle in intelligent transportation, a household device in a smart household, an electricity meter reading instrument in a smart grid, a voltage monitoring instrument, an environment monitoring instrument, a video surveillance instrument in an intelligent security network, or a cash register. In the embodiments of this application, the terminal may communicate with the access network device, for example, the first access network device 111 or the second access network device 112. A plurality of terminals may also communicate with each other. The terminal may be static and fixed or mobile.

Figure 3A:
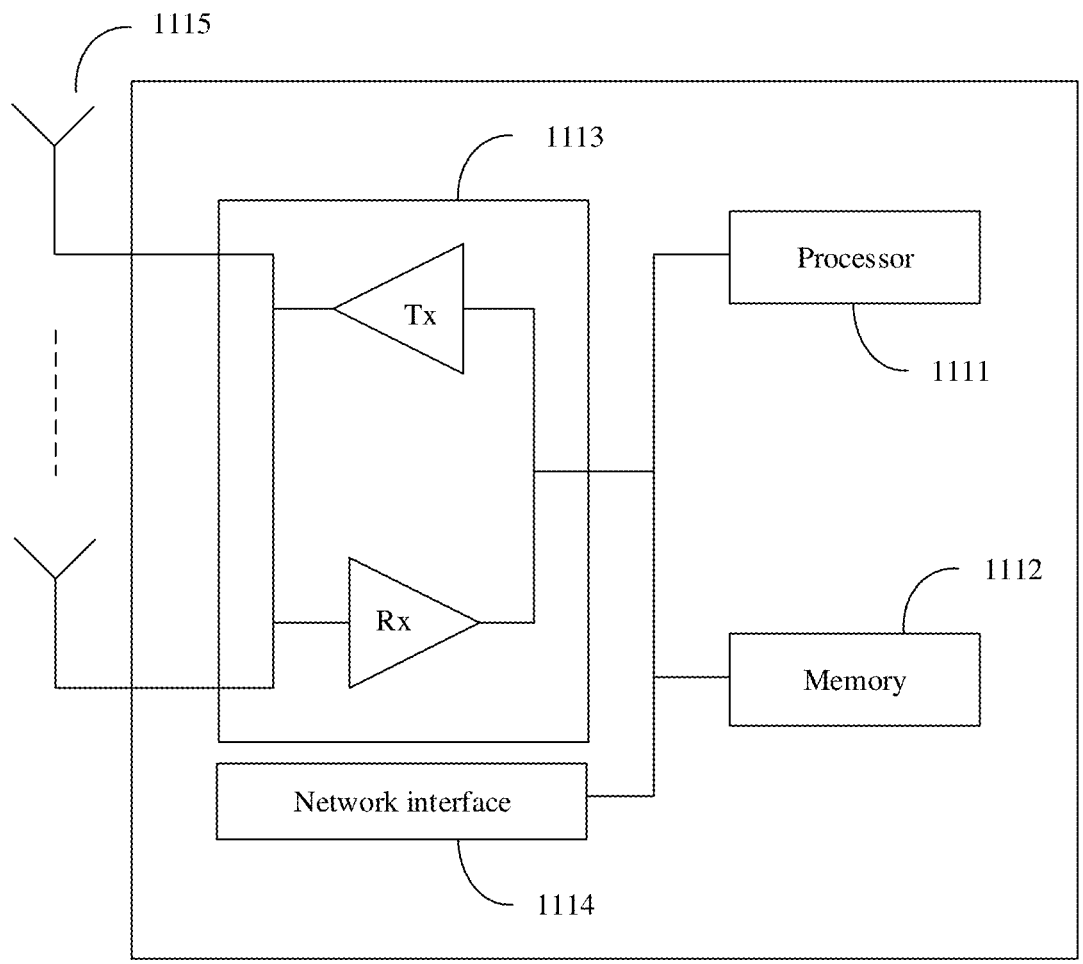
FIG. 3a is a schematic structural diagram of an access network device according to an embodiment of this application.

FIG. 3a is a schematic structural diagram of an access network device. For a structure of the first access network device 111 or the second access network device 112, refer to a structure shown in FIG. 3a.

The access network device includes at least one processor 1111, at least one memory 1112, at least one transceiver 1113, at least one network interface 1114, and one or more antennas 1115. The processor 1111, the memory 1112, the transceiver 1113, and the network interface 1114 are connected by using, for example, a bus. The antenna 1115 is connected to the transceiver 1113. The network interface 1114 is configured to enable the access network device to be connected to another communications device through a communications link. For example, the access network device is connected to the core network element 101 through an S1 interface. In the embodiments of this application, the connection may include various types of interfaces, transmission lines, buses, or the like. This is not limited in the embodiments.

In the embodiments of this application, the processor such as the processor 1111 may include at least one of the following types: a general-purpose central processing unit (central processing unit, CPU), a digital signal processor (digital signal processor, DSP), a microprocessor, an application-specific integrated circuit (application-specific integrated circuit, ASIC), a microcontroller (microcontroller unit, MCU), a field programmable gate array (field programmable gate array, FPGA), or an integrated circuit configured to implement a logical operation. For example, the processor 1111 may be a single-core (single-CPU) processor or a multi-core (multi-CPU) processor. The at least one processor 1111 may be integrated into one chip or located on a plurality of different chips.

In the embodiments of this application, the memory such as the memory 1112 may include at least one of the following types: a read-only memory (read-only memory, ROM) or another type of static storage device that can store static information and instructions, a random access memory (random access memory, RAM) or another type of dynamic storage device that can store information and instructions, or an electrically erasable programmable read-only memory (electrically erasable programmable read-only memory, EEPROM). In some scenarios, the memory may alternatively be a compact disc read-only memory (compact disc read-only memory, CD-ROM) or another compact disc storage, an optical disc storage (including a compact disc, a laser disc, an optical disc, a digital versatile disc, a Blu-ray disc, and the like), a magnetic disk storage medium or another magnetic storage device, or any other medium that can be configured to carry or store expected program code in a form of an instruction or a data structure and that can be accessed by a computer. However, the memory is not limited thereto.

The memory 1112 may exist independently, and is connected to the processor 1111. Optionally, the memory 1112 and the processor 1111 may alternatively be integrated, for example, integrated into a chip. The memory 1112 can store program code for executing the technical solutions in the embodiments of this application, and the processor 1111 controls execution of the program code. Various types of executed computer program code may also be considered as drivers of the processor 1111. For example, the processor 1111 is configured to execute the computer program code stored in the memory 1112, to implement the technical solutions in the embodiments of this application.

The transceiver 1113 may be configured to support receiving or sending of a radio frequency signal between the access network device and a terminal, and the transceiver 1113 may be connected to the antenna 1115. The transceiver 1113 includes a transmitter Tx and a receiver Rx. Specifically, the one or more antennas 1115 may receive a radio frequency signal. The receiver Rx of the transceiver 1113 is configured to: receive the radio frequency signal from the antenna, convert the radio frequency signal into a digital baseband signal or a digital intermediate frequency signal, and provide the digital baseband signal or the digital intermediate frequency signal for the processor 1111, so that the processor 1111 further processes the digital baseband signal or the digital intermediate frequency signal, for example, performs demodulation processing and decoding processing. In addition, the transmitter Tx of the transceiver 1113 is further configured to: receive a modulated digital baseband signal or digital intermediate frequency signal from the processor 1111, convert the modulated digital baseband signal or digital intermediate frequency signal into a radio frequency signal, and send the radio frequency signal through the one or more antennas 1115. Specifically, the receiver Rx may selectively perform one or more levels of frequency down-mixing processing and analog-to-digital conversion processing on the radio frequency signal to obtain the digital baseband signal or the digital intermediate frequency signal. A sequence of the frequency down-mixing processing and the analog-to-digital conversion processing is adjustable. The transmitter Tx may selectively perform one or more levels of frequency up-mixing processing and digital-to-analog conversion processing on the modulated digital baseband signal or digital intermediate frequency signal to obtain the radio frequency signal. A sequence of the frequency up-mixing processing and the digital-to-analog conversion processing is adjustable. The digital baseband signal and the digital intermediate frequency signal may be collectively referred to as digital signals.

Optionally, the access network device 111 may include a baseband unit (baseband unit, BBU), a radio remote unit (radio remote unit, RRU), and an antenna. The BBU is connected to the RRU, and the RRU is connected to the antenna.

Optionally, the access network device 112 may include a baseband unit (baseband unit, BBU), a radio remote unit (radio remote unit, RRU), and an antenna. The BBU is connected to the RRU, and the RRU is connected to the antenna.

Figure 3B:
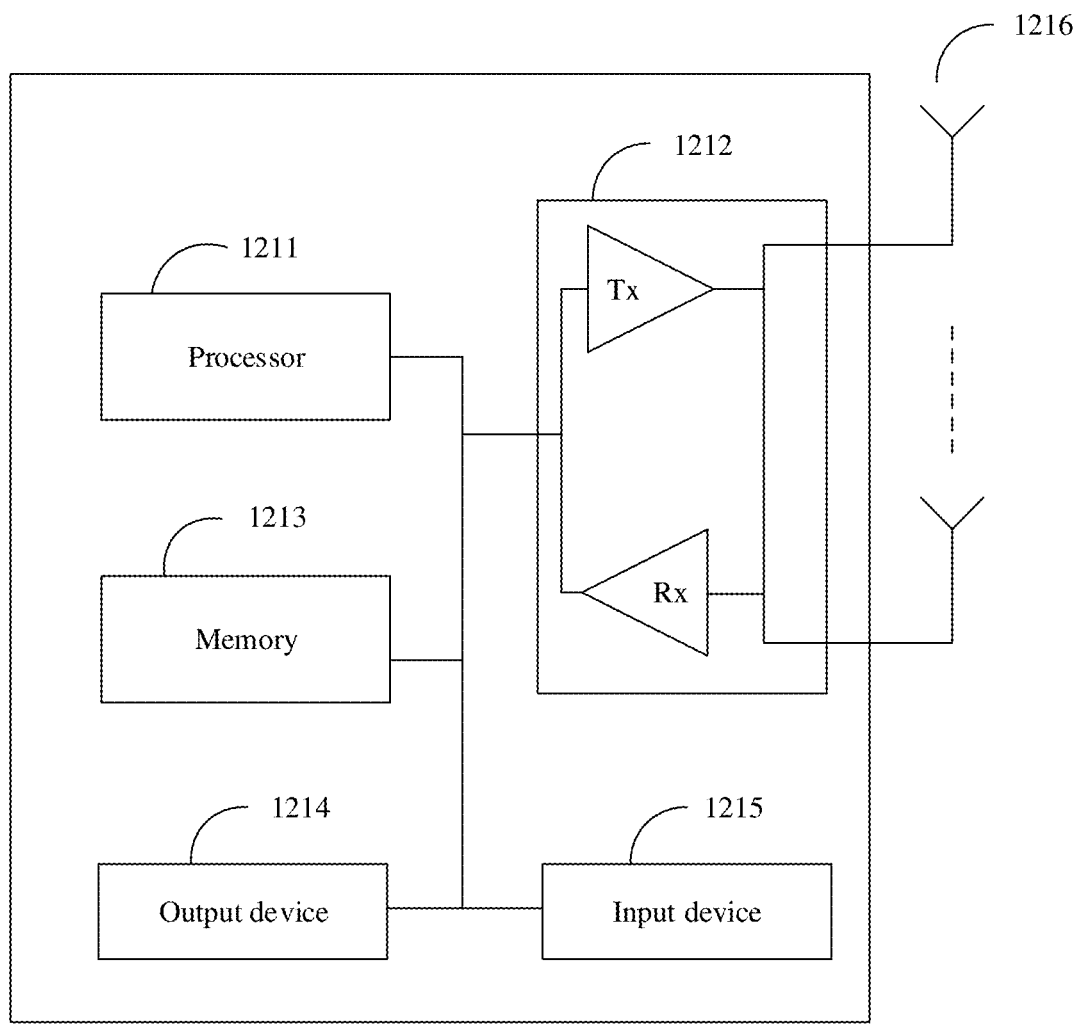
FIG. 3b is a schematic structural diagram of a terminal according to an embodiment of this application.

FIG. 3b is a schematic structural diagram of a terminal according to an embodiment of this application. For a structure of the terminal 121, refer to a structure shown in FIG. 3b.

The terminal includes at least one processor 1211, at least one transceiver 1212, and at least one memory 1213. The processor 1211, the memory 1213, and the transceiver 1212 are connected. Optionally, the terminal 121 may further include an output device 1214, an input device 1215, and one or more antennas 1216. The antenna 1216 is connected to the transceiver 1212, and the output device 1214 and the input device 1215 are connected to the processor 1211.

Figure 4A:
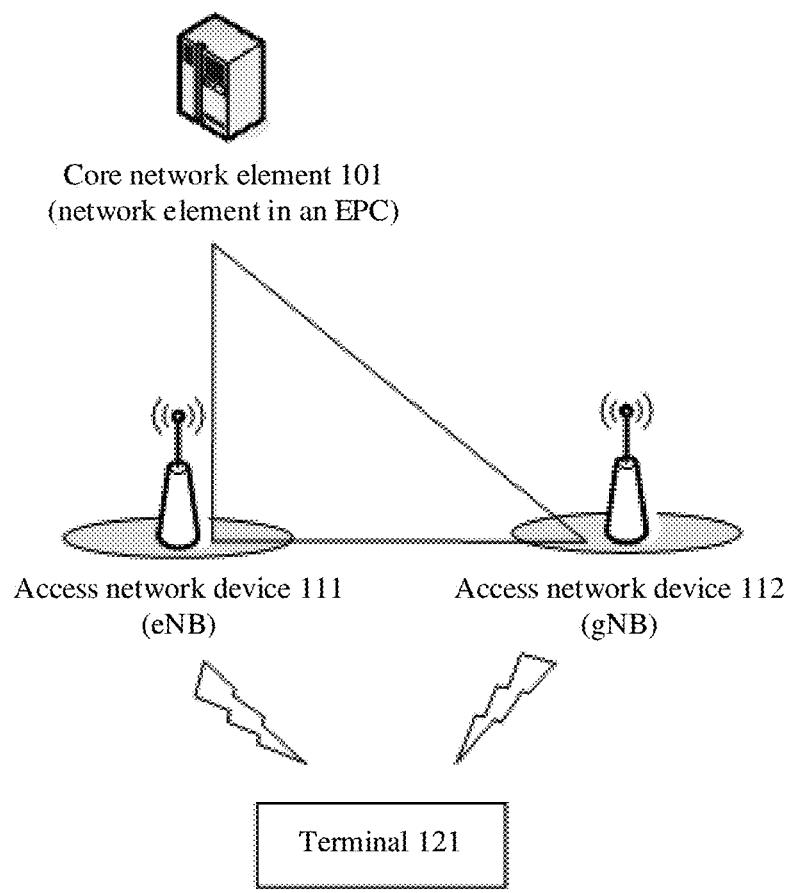
FIG. 4a is a schematic diagram of an EN-DC scenario.

For the transceiver 1212, the memory 1213, and the antenna 1216, refer to related descriptions in FIG. 4a, to implement a similar function.

The processor 1211 may be a baseband processor, or may be a CPU. The baseband processor and the CPU may be integrated or separated.

The processor 1211 may be configured to implement various functions for the terminal, for example, configured to process a communication protocol and communication data, or configured to: control the entire terminal device, execute a software program, and process data of the software program, or configured to assist in completing a computing processing task, for example, graphics and image processing or audio processing. Alternatively, the processor 1211 is configured to implement one or more of the foregoing functions.

The output device 1214 communicates with the processor 1211, and may display information in a plurality of manners. For example, the output device 1214 may be a liquid crystal display (liquid crystal display, LCD), a light emitting diode (light emitting diode, LED) display device, a cathode ray tube (cathode ray tube, CRT) display device, or a projector (projector). The input device 1215 communicates with the processor 1211, and may receive an input of a user in a plurality of manners. For example, the input device 1215 may be a mouse, a keyboard, a touchscreen device, or a sensing device.

For ease of description, an example in which the access network device 111 is an eNB and the access network device 112 is a gNB is used below for description. A person skilled in the art may understand that the access network 111 and the access network device 112 may be access network devices of another type. This is not limited in the embodiments of this application.

In the communications system shown in FIG. 2, based on a manner in which the terminal 121 accesses an access network, the following scenarios may be included:

(1) Evolved universal terrestrial radio access (evolved universal terrestrial radio access, E-UTRA)-new radio (new radio, NR) dual connectivity (E-UTRA-NR dual connectivity, EN-DC)

As shown in FIG. 4a, the core network element 101 is a network element in an evolved packet core (evolved packet core, EPC), the access network device 111 is an evolved node (evolved universal terrestrial radio access network NodeB, eNB), and the access network device 112 is a new radio node (new radio nodeB, gNB).

The access network device 111 is a master access network device, and the access network device 112 is a secondary access network device.

The terminal 121 communicates with both the access network device 111 and the access network device 112.

(2) Next generation (next generation, NG) radio access network (radio access network, RAN) E-UTRA-NR dual connectivity (NG-RAN E-UTRA-NR dual connectivity, NGEN-DC)

Figure 4B:
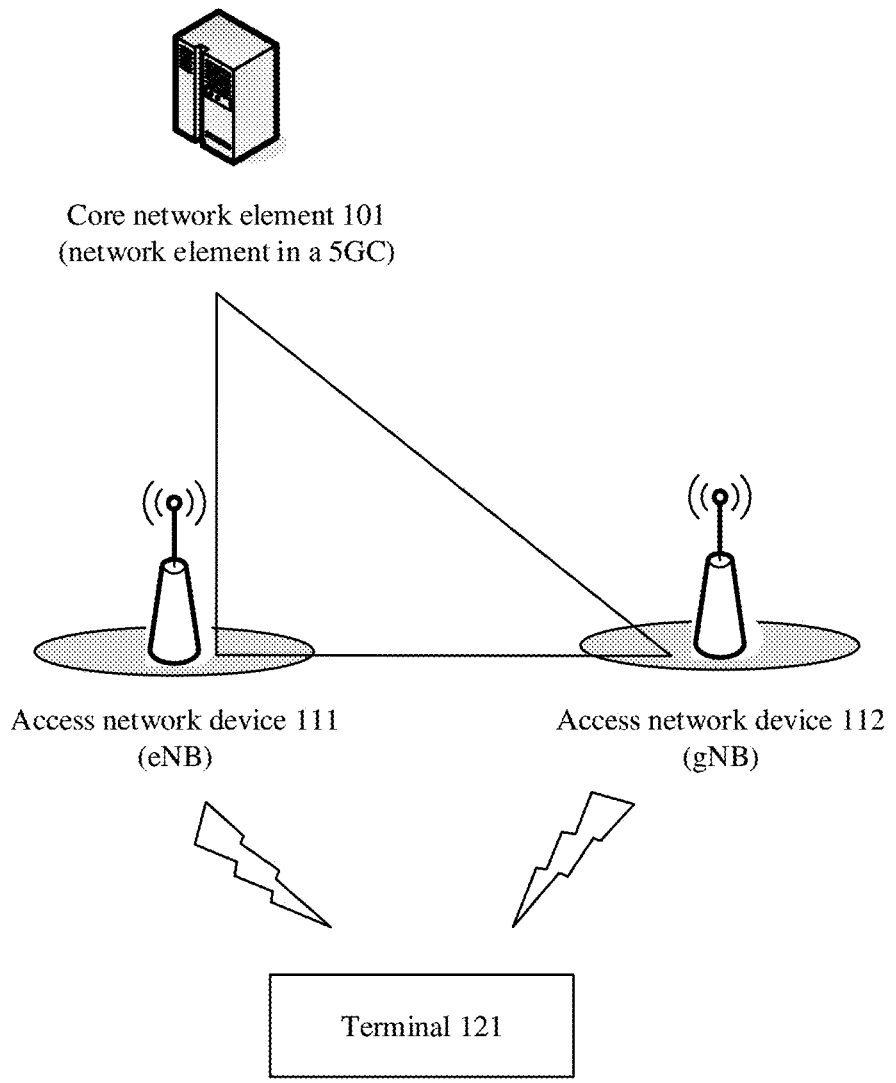
FIG. 4b is a schematic diagram of an NGEN-DC scenario.

As shown in FIG. 4b, the core network element 31 is a network element in a 5th generation (5G, 5th Generation) core network (5G core, 5GC), the access network device 111 is an eNB, and the access network device 112 is a gNB.

The access network device 111 is a master access network device, and the access network device 112 is a secondary access network device.

The terminal 121 communicates with both the access network device 111 and the access network device 112.

(3) NR-E-UTRA dual connectivity (NR-E-UTRA dual connectivity, NE-DC)

Figure 4C:
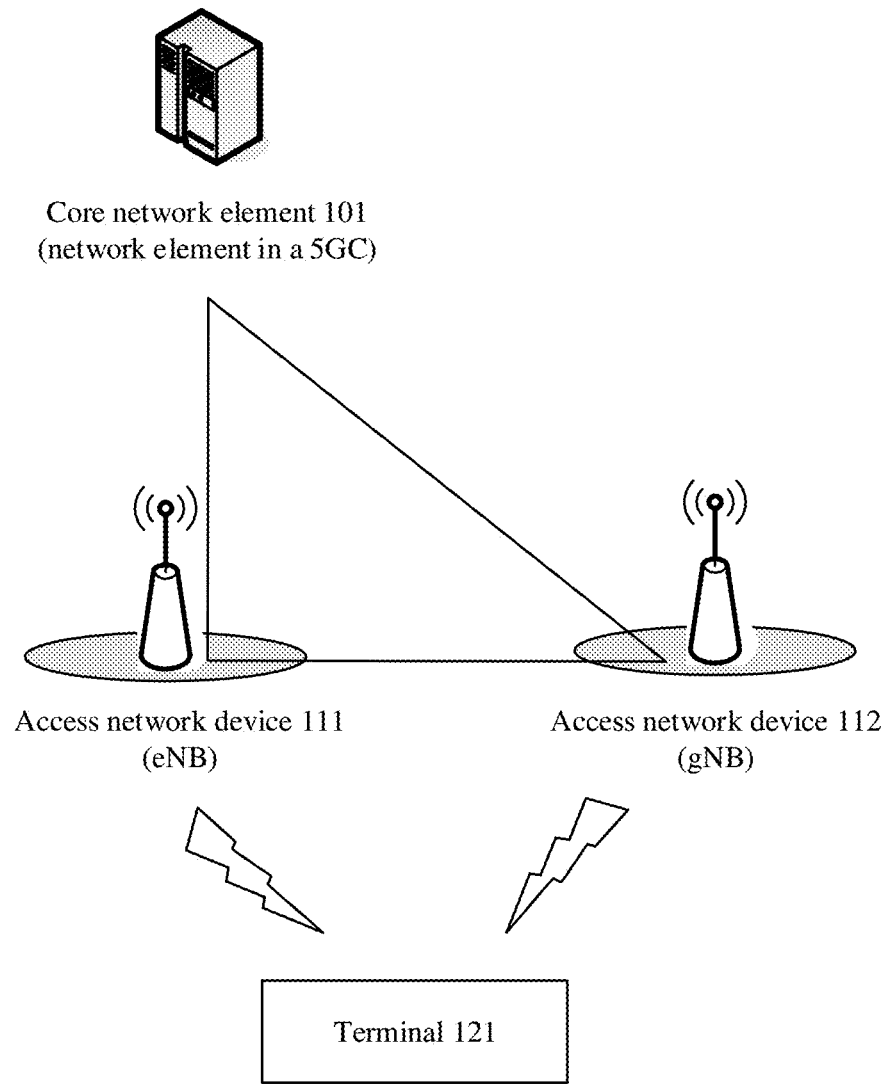
FIG. 4c is a schematic diagram of an NE-DC scenario.

As shown in FIG. 4c, the core network element 101 is a network element in a 5GC, the access network device 112 is a gNB, and the access network device 111 is an eNB.

The access network device 112 is a master access network device, and the access network device 111 is a secondary access network device.

The terminal 121 communicates with both the access network device 111 and the access network device 112.

The foregoing three scenarios may be referred to as multi-RAT dual connectivity (multi-rat dual connectivity, MR-DC) scenarios.

In the foregoing three scenarios, the master access network device may transmit control plane signaling and user plane signaling to the core network element, and the secondary access network device may transmit user plane signaling to the core network element. Control plane signaling between the core network element and the secondary access network device may be transmitted by the master access network device. For example, the core network element sends control plane signaling to the master access network device, and the master access network device sends the control plane signaling to the secondary access network device through an interface (which may be an interface between the master access network device and the secondary access network device). Alternatively, control plane signaling of the secondary access network device may be sent to the master access network device through an interface, and then the master access network device sends the control plane signaling to the core network element.

The master access network device may transmit user plane signaling or control plane signaling to the terminal 121 through an air interface. The secondary access network device may transmit user plane signaling to the terminal 121 through an air interface. The secondary access network device may transmit control plane signaling to the terminal 121 through the master access network device. For example, the secondary access network device sends control plane signaling to the master access network device, and the master access network device sends the control plane signaling to the terminal 121 through an air interface. Alternatively, the master access network device receives control plane signaling from the terminal 121, and then the master access network device sends the control plane signaling to the secondary access network device through an interface. Alternatively, the secondary access network device may transmit control plane signaling to the terminal 121 through an air interface.

For example, before the terminal 121 establishes an RRC connection to the secondary access network device, the terminal 121 may transmit control plane signaling to the master access network device through an air interface. After the terminal 121 establishes the RRC connection to the secondary access network device, the terminal 121 may transmit the control plane signaling to the secondary access network device through the master access network device, or the secondary access network device may transmit the control plane signaling to the terminal 121 through a signaling radio bearer (signal radio bearer, SRB) such as an SRB 3.

(4) Standalone (standalone, SA)

Figure 4D:
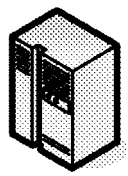
FIG. 4d is a schematic diagram of standalone networking of a gNB.
Figure 4D:
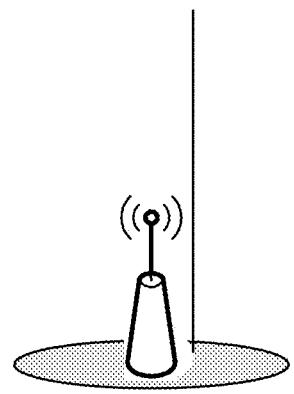
Figure 4D:
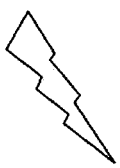

As shown in FIG. 4d, the core network element 101 is a network element in a 5GC, and the access network device 112 is a gNB.

The terminal 101 communicates with the access network device 112.

The terminal 101 may transmit user plane signaling and control plane signaling to the access network device 112 through an air interface.

In the foregoing four scenarios, when the terminal 121 communicates with the access network device 112 (namely, the gNB), the access network device 112 may provide two uplinks and one downlink for the terminal 121. For example, the two uplinks are respectively an NUL and an SUL, and the downlink is a DL. The terminal 121 may perform uplink transmission with the access network device 112 on the NUL or the SUL, and the terminal 121 may perform downlink transmission with the access network device 112 on the DL. The NUL and the DL may work in a time division duplex (time division duplexing, TDD) mode, and the SUL may work in an SUL duplex mode.

In the foregoing four scenarios, when the terminal 121 communicates with the access network device 111 (the eNB), the access network device 111 may provide one uplink and one downlink for the terminal 121. For example, the uplink is a UL, and the downlink is a DL. The terminal 121 may perform uplink transmission with the access network device 111 on the UL, and the access network device 111 may perform downlink transmission with the access network device 111 on the DL. The UL and the DL may work in a TDD duplex mode, or the UL and the DL may work in a frequency division duplex (frequency division duplexing, FDD) mode.

Table 1 is a schematic diagram of frequency bands. Table 1 shows several examples of a frequency band in the TDD duplex mode (which is referred to as a TDD frequency band below for ease of description), a frequency band in the FDD duplex mode (which is referred to as an FDD frequency band below for ease of description), and a frequency band in the SUL duplex mode (which is referred to as an SUL frequency band below for ease of description), as shown in Table 1:

The TDD frequency band includes an uplink TDD frequency band and a downlink TDD frequency band. Frequency ranges of the uplink TDD frequency band and the downlink TDD frequency band may be the same, and the uplink TDD frequency band and the downlink TDD frequency band may be distinguished in a time division manner. For example, an n34 frequency band is a TDD frequency band, and in the n34 frequency band, an uplink TDD frequency band is 2010 MHz to 2025 MHZ, and a downlink TDD frequency band is 2010 MHZ to 2025 MHZ.

The SUL frequency band may include only an uplink frequency band, and does not include a downlink frequency band. For example, an n80 frequency band is an SUL frequency band, and in the n80 frequency band, an uplink frequency band is 1710 MHz to 1785 MHZ. Because the SUL frequency band includes only the uplink frequency band, the SUL frequency band in the embodiments of this application may refer to the uplink frequency band in the SUL frequency band.

The FDD frequency band includes an uplink FDD frequency band and a downlink FDD frequency band. Frequency ranges of the uplink FDD frequency band and the downlink FDD frequency band may be different, and the uplink FDD frequency band and the downlink FDD frequency band may be distinguished in a frequency division manner. For example, n3 is an FDD frequency band, and in the n3 frequency band, an uplink FDD frequency band is 1710 MHz to 1785 MHz, and a downlink FDD frequency band is 1805 MHz to 1880 MHZ.

In addition, it can be learned from Table 1 that the SUL frequency band may be the same as the uplink FDD frequency band. For example, the n80 frequency band is an SUL frequency band, and in the n80 frequency band, the SUL frequency band is 1710 MHz to 1785 MHz. The n3 frequency band is an FDD frequency band, and in the n3 frequency band, the uplink FDD frequency band is 1710 MHz to 1785 MHz. The SUL frequency band in the n80 frequency band is the same as the uplink FDD frequency band in the n3 frequency band. For another example, an n81 frequency band is an SUL frequency band, and in the n81 frequency band, the SUL frequency band is 880 MHz to 915 MHz. An n8 frequency band is an FDD frequency band, and in the n8 frequency band, an uplink FDD frequency band is 880 MHz to 915 MHz. The SUL frequency band in the n81 frequency band is the same as the uplink FDD frequency band in the n8 frequency band.

It should be noted that Table 1 shows only several examples of the TDD frequency band, the FDD frequency band, and the SUL frequency band. Actually, the TDD frequency band may be a part of TDD frequency bands shown in Table 1, the FDD frequency band may be a part of FDD frequency bands shown in Table 1, and the SUL frequency band may be a part of SUL frequency bands shown in Table 1. Alternatively, the TDD frequency band, the FDD frequency band, and the SUL frequency band may use frequency ranges other than those shown in Table 1.

TABLE 1

| Duplex mode | Frequency band | Frequency range of an uplink frequency band | Frequency range of a downlink frequency band |
|---|---|---|---|
| TDD | n34 | 2010 MHz to 2025 MHz | 2010 MHz to 2025 MHz |
| TDD | n38 | 2570 MHz to 2620 MHz | 2570 MHz to 2620 MHZ |
| TDD | n39 | 1880 MHz to 1920 MHz | 1880 MHz to 1920 MHz |
| TDD | n40 | 2300 MHz to 2400 MHZ | 2300 MHz to 2400 MHZ |
| TDD | n41 | 2496 MHz to 2690 MHz | 2496 MHz to 2690 MHz |
| TDD | n51 | 1427 MHz to 1432 MHz | 1427 MHz to 1432 MHz |
| SUL | n80 | 1710 MHz to 1785 MHz | N/A |
| SUL | n81 | 880 MHz to 915 MHz | N/A |
| SUL | n82 | 832 MHz to 862 MHZ | N/A |
| SUL | n83 | 703 MHz to 748 MHz | N/A |
| SUL | n84 | 1920 MHz to 1980 MHz | N/A |
| SUL | n86 | 1710 MHz to 1780 MHz | N/A |
| FDD | n3 | 1710 MHz to 1785 MHz | 1805 MHz to 1880 MHz |
| FDD | n8 | 880 MHz to 915 MHz | 925 MHz to 960 MHz |
| FDD | n20 | 832 MHz to 862 MHz | 791 MHz to 821 MHz |
| FDD | n28 | 703 MHz to 748 MHz | 758 MHz to 803 MHZ |
| FDD | n1 | 1920 MHz to 1980 MHz | 2110 MHz to 2170 MHz |
| FDD | n66 | 1710 MHz to 1780 MHz | 2110 MHz to 2200 MHz |

The NUL and the DL between the terminal 121 and the access network device 112 may use a TDD frequency band, the NUL may use an uplink TDD frequency band, and the DL may use a downlink TDD frequency band. For example, the NUL and the DL may use the n34 frequency band, the NUL uses the uplink TDD frequency band of 2010 MHz to 2025 MHz, and the DL uses the downlink TDD frequency band of 2010 MHz to 2025 MHz. The SUL between the terminal 121 and the access network device 112 may use an SUL frequency band. For example, the SUL may use the n80 frequency band, and the SUL uses the uplink frequency band of 1710 MHz to 1785 MHz. The NUL and the DL between the terminal 121 and the access network device 112 may use a part of the TDD frequency bands shown in Table 1, the NUL may use a part of the uplink TDD frequency bands, and the DL may use a part of the downlink TDD frequency bands. For example, the NUL and the DL may use a part of the n38 frequency band, the NUL may use the uplink TDD frequency band of 2570 MHz to 2585 MHZ, and the DL may use the downlink TDD frequency band of 2570 MHz to 2585 MHZ.

The UL and the DL between the terminal 121 and the access network device 111 may use a TDD frequency band, the UL may use an uplink TDD frequency band, and the DL may use a downlink TDD frequency band. For example, the UL and the DL may use the n38 frequency band, the UL uses the uplink TDD frequency band of 2570 MHz to 2620 MHZ, and the DL uses the downlink TDD frequency band of 2570 MHz to 2620 MHZ. The UL and the DL between the terminal 121 and the access network device 111 may use a part of the TDD frequency bands shown in Table 1, the UL may use a part of the uplink TDD frequency bands, and the DL may use a part of the downlink TDD frequency bands. For example, the UL and the DL may use a part of the n38 frequency band, the UL may use the uplink TDD frequency band of 2605 MHz to 2620 MHZ, and the DL may use the downlink TDD frequency band of 2605 MHz to 2620 MHZ.

The UL and the DL between the terminal 121 and the access network device 111 may use an FDD frequency band, the UL uses an uplink FDD frequency band, and the DL uses a downlink FDD frequency band. For example, the UL and the DL may use the n3 frequency band, the UL uses the uplink FDD frequency band of 1710 MHZ to 1785 MHZ, and the DL uses the downlink FDD frequency band of 1805

MHZ to 1880 MHZ. The UL and the DL between the terminal 121 and the access network device 111 may use a part of the FDD frequency bands shown in Table 1, the UL may use a part of the uplink FDD frequency bands, and the DL may use a part of the downlink FDD frequency bands. For example, the UL and the DL may use a part of the n3 frequency band, the UL may use the uplink FDD frequency band of 1710 MHz to 1725 MHz, and the DL may use the downlink FDD frequency band of 1805 MHz to 1820 MHZ.

In the embodiments of this application, for ease of description, a frequency band used by the NUL between the terminal 121 and the access network device 112 is referred to as an NUL frequency band of the access network device 112. Similarly, a frequency band used by the DL between the terminal 121 and the access network device 112 is referred to as a DL frequency band of the access network device 112, a frequency band used by the SUL between the terminal 121 and the access network device 112 is referred to as an SUL frequency band of the access network device 112, a frequency band used by the UL between the terminal 121 and the access network device 111 is referred to as a UL frequency band of the access network device 111, and a frequency band used by the DL between the terminal 121 and the access network device 111 is referred to as a DL frequency band of the access network device 112.

The SUL frequency band of the access network device 112 may be the same as the UL frequency band of the access network device 111. For example, the SUL frequency band of the access network device 112 uses the n80 frequency band, and an FDD frequency band of the access network device 111 uses the n3 frequency band. Alternatively, the SUL frequency band of the access network device 112 may be different from the UL frequency band of the access network device 111. For example, the SUL frequency band of the access network device 112 uses the n80 frequency band, and an FDD frequency band of the access network device 111 uses the n8 frequency band.

That the SUL frequency band of the access network device 112 is the same as the UL frequency band of the access network device 111 may be understood as that a downlink frequency band corresponding to the SUL frequency band of the access network device 112 is the same as a DL frequency band of the access network device 111. The downlink frequency band corresponding to the SUL frequency band of the access network device 112 may be understood as a downlink FDD frequency band corresponding to an uplink FDD frequency band that is the same as the SUL frequency band. For example, the n80 frequency band is an SUL frequency band, the n80 frequency band is 1710 MHz to 1785 MHZ, the uplink FDD frequency band of the n3 frequency band is the same as the n80 frequency band, and a downlink frequency band corresponding to the n80 frequency band is the downlink FDD frequency band of the n3 frequency band. That is, the downlink frequency band corresponding to the n80 frequency band is the downlink FDD frequency band of 1805 MHZ to 1880 MHz of the n3 frequency band.

That the SUL frequency band of the access network device 112 is the same as the UL frequency band of the access network device 111 may be understood as that the SUL frequency band of the access network device 112 corresponds to the DL frequency band of the access network device 111. For example, the n80 frequency band is an SUL frequency band, the n80 frequency band is 1710 MHz to 1785 MHZ, the uplink FDD frequency band of the n3 frequency band is 1710 MHz to 1785 MHZ, and the downlink FDD frequency band of the n3 frequency band is 1805 MHz to 1880 MHz. In this case, the n80 frequency band of 1710 MHZ to 1785 MHz corresponds to the downlink FDD frequency band of 1805 MHz to 1880 MHz of the n3 frequency band. Herein, "correspond" may be understood as that a frequency in the SUL frequency band of the access network device 112 corresponds to a frequency in the UL frequency band of the access network device 111. The frequency may be understood as a frequency value in a frequency range, for example, a center frequency value in the frequency range.

That the SUL frequency band of the access network device 112 is the same as the UL frequency band of the access network device 111 may be understood as that a frequency range of the SUL frequency band of the access network device 112 is the same as a frequency range of the UL frequency band of the access network device 111: or a frequency range of the UL frequency band of the access network device 111 includes a frequency range of the SUL frequency band of the access network device 112: or a frequency range of the SUL frequency band of the access network device 112 includes a frequency range of the UL frequency band of the access network device 111: or a frequency range of the SUL frequency band of the access network device 112 overlaps a frequency range of the UL frequency band of the access network device 111.

That the downlink frequency band corresponding to the SUL frequency band of the access network device 112 is the same as the DL frequency band of the access network device 111 may be understood as that a frequency range of the downlink frequency band corresponding to the SUL frequency band of the access network device 112 is the same as a frequency range of the DL frequency band of the access network device 111: or a frequency range of the downlink frequency band corresponding to the SUL frequency band of the access network device 112 includes a frequency range of the DL frequency band of the access network device 111: or the frequency range of the DL frequency band of the access network device 111 includes a frequency range of the downlink frequency band corresponding to the SUL frequency band of the access network device 112: or the frequency range of the downlink frequency band corresponding to the SUL frequency band of the access network device 111 overlaps the frequency range of the UL frequency band of the access network device 112.

In the embodiments of this application, the SUL frequency band may be referred to as an uplink frequency band corresponding to the SUL.

Specifically, when the SUL frequency band of the access network device 112 is the same as the UL frequency band of the access network device 111, the SUL of the access network device 112 may provide a service by using a radio frequency module of the access network device 111. For example, a BBU of the access network device 112 may be connected to an RRU of the access network device 111, and the BBU of the access network device 112 and the RRU of the access network device 111 provide the SUL.

Specifically, when the SUL frequency band of the access network device 112 is different from the UL frequency band of the access network device 111, the SUL of the access network device 112 may provide a service by using a radio frequency module of another access network device (the another access network device may use an uplink FDD frequency band that is the same as the SUL frequency band). For example, the BBU of the access network device 112 may be connected to an RRU of the another access network device, and the BBU of the access network device 112 and the RRU of the another access network device provide the SUL.

This application provides a solution in which the access network device 112 may determine, based on signal quality of a downlink frequency band corresponding to a supplementary uplink SUL or signal quality of a frequency band of an SUL, the signal quality of the frequency band of the SUL, to accurately evaluate coverage performance of the SUL; and after determining the signal quality of the frequency band of the SUL, may determine whether to perform transmission on the supplementary uplink, to avoid a case in which the access network device 112 blindly indicates a terminal to perform transmission on the supplementary uplink when signal quality of the supplementary uplink is not measured, leading to transmission of the terminal on the supplementary uplink with poor coverage and even a failure, thereby improving reliability and a transmission rate of uplink transmission and improving user experience.

A method in the embodiments of this application may be used in the following two states:

(1) Connected mode: The connected mode may be understood as that the terminal 121 establishes a connection, for example, an RRC connection, to the access network device 112.

Specifically, the connected mode herein may mean that in the EN-DC, the NE-DC, and the SA, the terminal 121 may establish a connection to the access network device 112.

In the EN-DC and the NE-DC, after the terminal 121 establishes the connection to the access network device 112, the access network device 112 may transmit control plane signaling to the terminal 121 through an air interface, or the access network device 112 may transmit control plane signaling to the terminal 121 through the access network device 111.

In the SA, after the terminal 121 establishes the connection to the access network device 112, the access network device 112 may transmit control plane signaling to the terminal 121 through an air interface.

(2) Idle mode: The idle mode may be understood as that a connection, for example, an RRC connection, is not established between the terminal 121 and the access network device 112.

Specifically, the idle mode herein may mean that in the EN-DC and the NE-DC, no connection is established between the terminal 121 and the access network device 112.

In the EN-DC and the NE-DC, the terminal 121 is not connected to the access network device 112, and the access network device 112 may interact with the access network device 111.

The following describes the solution from perspectives of different devices with reference to FIG. 5 to FIG. 17.

Figure 5:
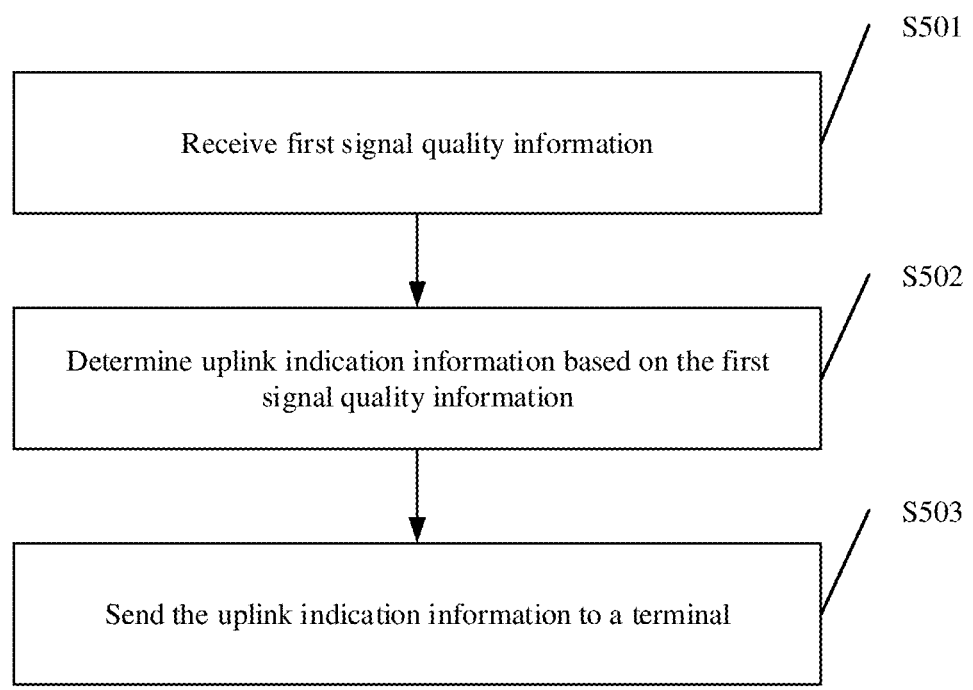
FIG. 5 is a schematic flowchart of an uplink determining method according to an embodiment of this application.

FIG. 5 is a schematic flowchart of an uplink determining method according to an embodiment of this application. The method may be performed by the access network device 112 or a chip in the access network device 112. The method in FIG. 5 may include the following steps.

S501: Receive first signal quality information, where the first signal quality information indicates signal quality of a first downlink DL.

The access network device 112 determines whether to perform uplink and downlink decoupling and whether to perform uplink transmission on an SUL, and needs to obtain signal quality of a frequency band of the SUL. The signal quality of the frequency band of the SUL may be the signal quality of the first DL. The first DL uses a downlink frequency band of a first frequency band, and an uplink frequency band of the first frequency band is the same as the frequency band of the supplementary uplink SUL of the access network device 112.

The first frequency band herein may be understood as a frequency band group, including the uplink frequency band and the downlink frequency band.

For example, the first frequency band herein may be an n20 frequency band, the first DL uses 791 MHz to 821 MHz, the frequency band of the SUL may be an n82 frequency band, the SUL uses 832 MHz to 862 MHz, the uplink frequency band of the first frequency band is 832 MHz to 862 MHZ, and the frequency band of the SUL is the same as the uplink frequency band of the first frequency band. For another example, the first frequency band may be an n28 frequency band, the first DL uses 758 MHz to 803 MHZ, the uplink frequency band of the first frequency band is 703 MHz to 748 MHZ, the frequency band of the SUL may be an n83 frequency band, the SUL uses 703 MHz to 748 MHZ, and the frequency band of the SUL is the same as the uplink frequency band of the first frequency band.

Optionally, the first signal quality information may be carried by using control plane signaling, for example, may be carried by using measurement result information.

In the foregoing scenario in the connected mode, the access network device 112 may receive the first signal quality information from the terminal 121 through the access network device 111, or the access network device 112 may receive the first signal quality information from the terminal 121 through an air interface. Optionally, the method may further include: The access network device 112 may send first measurement control information to the terminal 121 through the first access network device 111 or an air interface, where the first measurement control information is used to indicate the terminal 121 to measure the signal quality of the first DL.

In the foregoing scenario in the idle mode, the access network device 112 may receive the first signal quality information from the access network device 111. The access network device 111 may receive the first signal quality information from the terminal 121. Optionally, before this, the access network device 111 may send the first measurement control information to the terminal 121.

Optionally, in the foregoing scenario in the connected mode and the foregoing scenario in the idle mode, in the EN-DC or the NE-DC, the first DL may be a DL of the access network device 111, or may not be a DL of the access network device 111.

That the first DL is the DL of the access network device 111 may be understood as that the first DL is provided by the access network device 111, or a downlink frequency band of the access network device 111 is the same as the downlink frequency band of the first frequency band.

When the first UL is not a UL of the access network device 111, the access network device 111 needs to send the first measurement control information to UE, to indicate the UE to measure the signal quality of the first DL. When the first UL is a UL of the access network device 111, the access network device 111 does not need to additionally send the first measurement control information to the UE, and the first signal quality information that is obtained by the UE through measurement and that is received by the access network device 111 includes the signal quality of the first DL.

S502: Determine uplink indication information based on the first signal quality information.

The access network device 112 may determine signal quality of the SUL based on the first signal quality information. For example, when the signal quality of the first DL is relatively good, the access network device 112 determines the uplink indication information based on the first signal quality information. The uplink indication information is used to indicate to perform transmission on the SUL.

In a first implementation,
when the signal quality of the first DL is greater than a first threshold, the uplink indication information is determined.

Optionally, in the first implementation, the method may further include: receiving second signal quality information, where the second signal quality information indicates signal quality of a second DL of the access network device 112, and the second DL uses a downlink frequency band of a second frequency band.

Optionally, when the signal quality of the second DL is less than a second threshold, and the signal quality of the first DL is greater than the first threshold, the uplink indication information is determined.

Optionally, the first threshold may be the same as a threshold for reporting the signal quality of the first DL by the terminal 121, or the first threshold may be less than a threshold for reporting the signal quality of the first DL by the terminal 121, and the access network device 112 does not need to compare the signal quality of the first DL with the first threshold. When receiving the signal quality of the first DL, the access network device 112 determines the uplink indication information.

In a second implementation,
the method further includes: receiving second signal quality information, where the second signal quality information indicates signal quality of a second DL, and the second DL uses a downlink frequency band of a second frequency band.

When the signal quality of the first DL is greater than the signal quality of the second DL, the uplink indication information is determined.

In the first implementation and the second implementation, for receiving the second signal quality information, refer to related content of receiving the first signal quality information in S501. An example is described below:

In the foregoing scenario in the connected mode, the access network device 112 may receive the second signal quality information from the terminal 121 through the access network device 111, or the access network device 112 may receive the second signal quality information from the terminal 121 through an air interface. Optionally, the method may further include: The access network device 112 may send second measurement control information to the terminal 121, where the second measurement control information is used to indicate the terminal 121 to measure the signal quality of the second DL.

Optionally, when the signal quality of the second DL is less than or equal to the second threshold, the access network device 112 may send the first measurement control information to the terminal 121.

Optionally, the first threshold may be the same as the second threshold.

In the foregoing scenario in the idle mode, the access network device 112 may receive the second signal quality information from the access network device 111. The access network device 111 may receive the second signal quality information from the terminal 121. Optionally, before this, the access network device 111 may send the second measurement control information to the terminal 121.

Optionally, the second frequency band may be the foregoing TDD frequency band, for example, an n34 frequency band, and the second DL uses 2010 MHz to 2025 MHz.

S503: Send the uplink indication information to the terminal 121.

The access network device 112 may send the uplink indication information to the terminal through the access network device 111 or an air interface, to indicate the UE to perform transmission on the SUL.

Optionally, in the foregoing scenario in the connected mode, the terminal 121 may switch from an NUL to the SUL. It may also be understood that the terminal 121 performs transmission on the NUL before performing transmission on the SUL, and the NUL uses an uplink frequency band of the second frequency band. The NUL and the second DL use the second frequency band.

Optionally, the second frequency band may be the foregoing TDD frequency band, for example, the n34 frequency band, and the NUL uses 2010 MHz to 2025 MHz.

Optionally, in the foregoing scenario in the idle mode, the terminal 121 may perform random access on the SUL.

According to the method in FIG. 5, the signal quality of the SUL may be determined by using signal quality of a downlink frequency band corresponding to the frequency band of the SUL, so that uplink and downlink decoupling is performed based on the signal quality of the SUL. Compared with a case in which only a downlink frequency band corresponding to a frequency band of the NUL is used to perform uplink and downlink decoupling, this is more accurate. Therefore, coverage of the SUL can be accurately evaluated, to determine whether to perform transmission on the SUL, thereby improving uplink transmission reliability and user experience.

Figure 6:
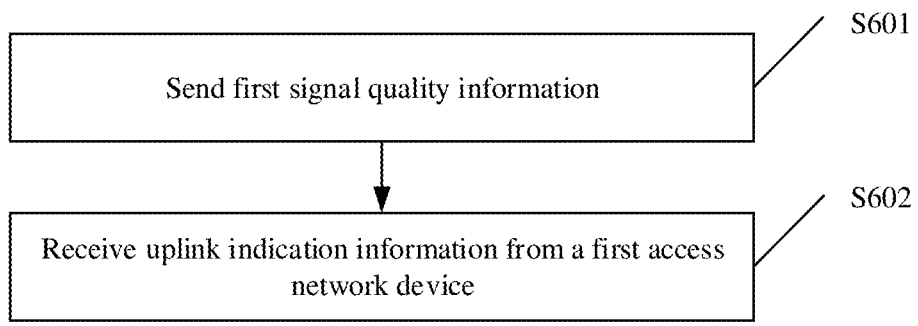
FIG. 6 is a schematic flowchart of another uplink determining method according to an embodiment of this application.

FIG. 6 is a schematic flowchart of another uplink determining method according to an embodiment of this application. The method may be performed by the terminal 121 or a chip in the terminal 121. The method in FIG. 6 may include the following steps.

S601: Send first signal quality information, where the first signal quality information indicates signal quality of the first DL, and the first signal quality information is used to determine uplink indication information.

Optionally, the first DL uses a downlink frequency band of a first frequency band, and an uplink frequency band of the first frequency band is the same as a frequency band of an SUL of the access network device 112.

In the foregoing scenario in the connected mode, the terminal 121 may send the first signal quality information to the access network device 112 through the access network device 111, or the terminal 121 may send the first signal quality information to the access network device 112 through an air interface. Optionally, the method may further include: The terminal 121 may receive first measurement control information from the access network device 112 through the first access network device 111 or an air interface, where the first measurement control information is used to indicate the terminal 121 to measure the signal quality of the first DL.

In the foregoing scenario in the idle mode, the terminal 121 may send the first signal quality information to the access network device 111. Optionally, before this, the access network device 111 may send the first measurement control information to the terminal 121.

Optionally, in the foregoing scenario in the connected mode and the foregoing scenario in the idle mode, in the EN-DC or the NE-DC, the first DL may be a DL of the access network device 111, or may not be a DL of the access network device 111. Optionally, the access network device 112 may determine to perform transmission on the SUL based on the first signal quality information.

The first signal quality information is used to determine the uplink indication information. In a first implementation, when the signal quality of the first DL is greater than a first threshold, the first signal quality information is used to determine the uplink indication information.

Optionally, in the first implementation, the method may further include: sending second signal quality information, where the second signal quality information indicates signal quality of a second DL of the access network device 112, and the second DL uses a downlink frequency band of a second frequency band.

Optionally, when the signal quality of the second DL is less than a second threshold, and the signal quality of the first DL is greater than the first threshold, the first signal quality information is used to determine the uplink indication information.

Optionally, the first threshold may be the same as a threshold for reporting the signal quality of the first DL by the terminal 121, or the first threshold may be less than a threshold for reporting the signal quality of the first DL by the terminal 121, and the access network device 112 does not need to compare the signal quality of the first DL with the first threshold. When receiving the signal quality of the first DL, the access network device 112 determines the uplink indication information.

The first signal quality information is used to determine the uplink indication information. In a second implementation, the method further includes: sending second signal quality information, where the second signal quality information indicates signal quality of a second DL, and the second DL uses a downlink frequency band of a second frequency band.

When the signal quality of the first DL is greater than the signal quality of the second DL, the first signal quality information is used to determine the uplink indication information.

In the first implementation and the second implementation, for sending the second signal quality information, refer to related content of sending the first signal quality information in S601. An example is described below:

In the foregoing scenario in the connected mode, the terminal 121 may send the second signal quality information to the access network device 112 through the access network device 111, or the terminal 121 may send the second signal quality information to the access network device 112 through an air interface. Optionally, the method may further include: The terminal 121 may receive second measurement control information from the access network device 112, where the second measurement control information is used to indicate the terminal 121 to measure the signal quality of the second DL.

Optionally, when the signal quality of the second DL is less than or equal to the second threshold, the terminal 121 may receive the first measurement control information sent by the access network device 112.

For related content in S601, refer to related content in S501.

S602: Receive the uplink indication information from the access network device 112, where the uplink indication information is used to indicate to perform transmission on the SUL.

In the foregoing scenario in the connected mode, the terminal 121 may receive the uplink indication information from the access network device 112.

In the foregoing scenario in the idle mode, the terminal 121 may receive the uplink indication information from the access network device 112 through the access network device 111.

Optionally, in the foregoing scenario in the connected mode, the terminal 121 may switch from an NUL to the SUL. It may also be understood that the terminal 121 performs transmission on the NUL before performing transmission on the SUL, and the NUL uses an uplink frequency band of the second frequency band. The NUL and the second DL use the second frequency band.

Optionally, in the foregoing scenario in the idle mode, the terminal 121 may perform random access on the SUL.

Figure 10A:
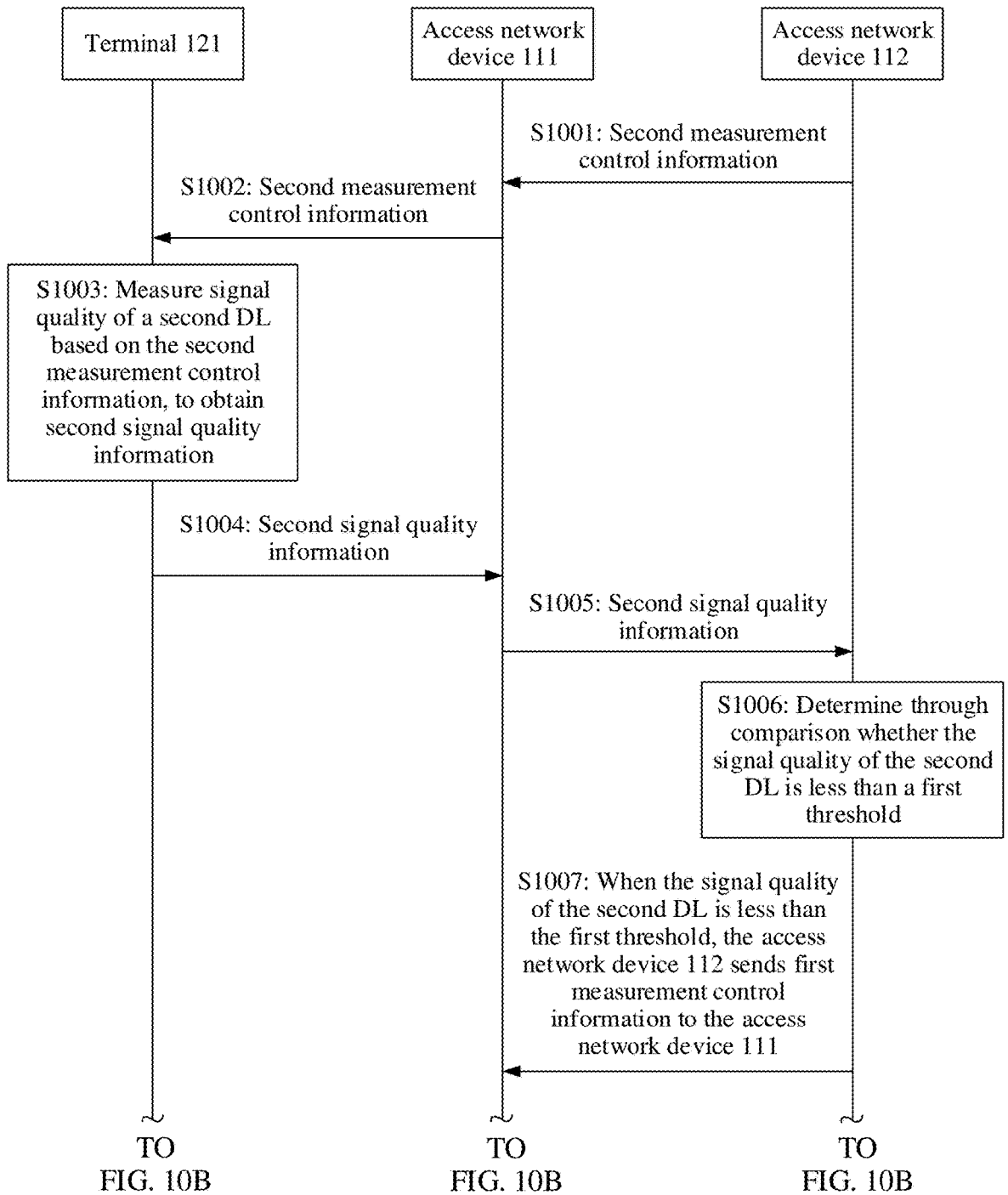
FIG. 10A and FIG. 10B are a schematic flowchart of an uplink determining method when a terminal is in an EN-DC or NGEN-DC connected mode.
Figure 10B:
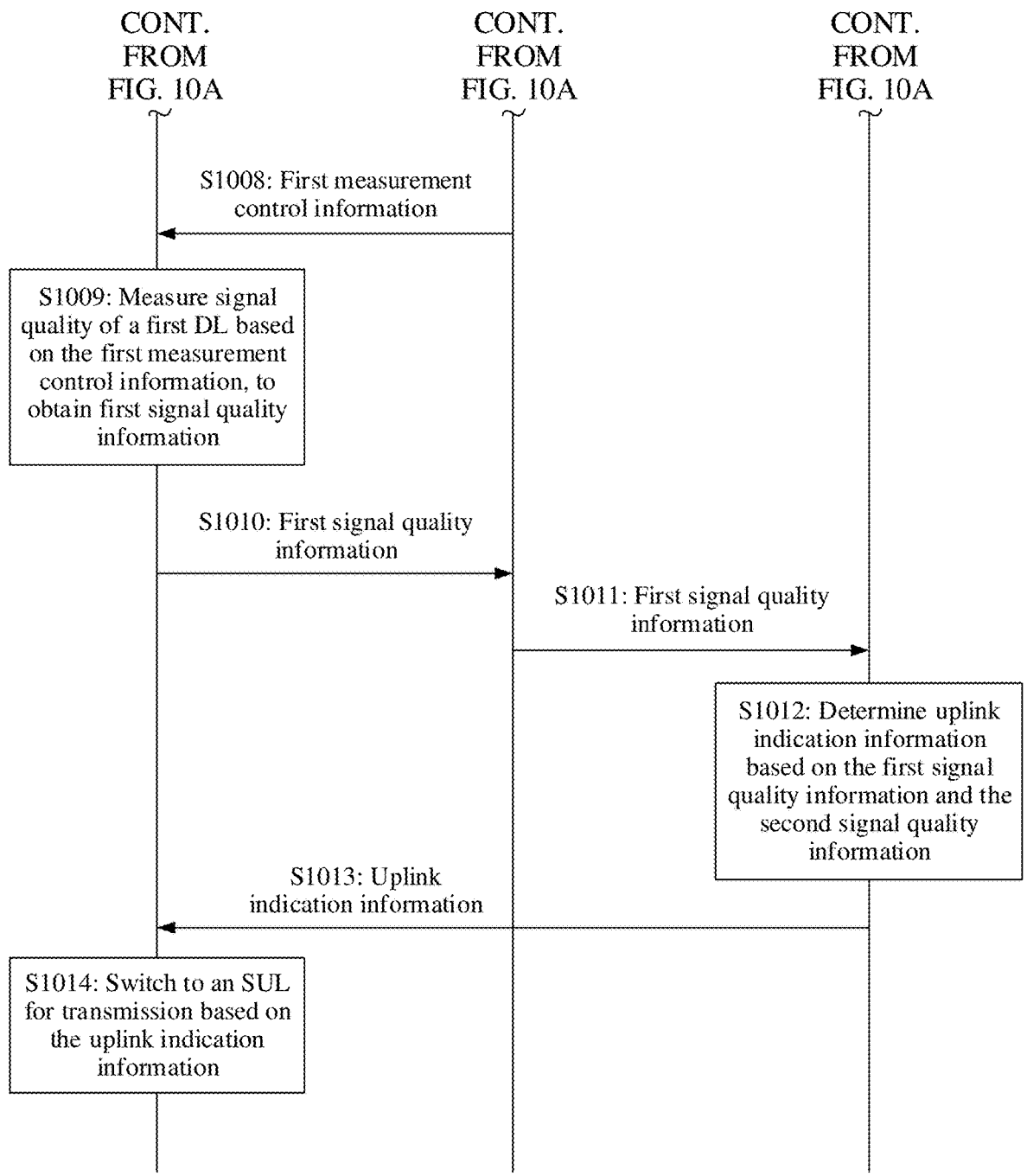

FIG. 10A and FIG. 10B are a schematic flowchart of still another uplink determining method according to an embodiment of this application. The method may be performed by the access network device 111 or a chip in the access network device 111. The method in FIG. 7 includes the following steps.

S701: Send first signal quality information to the access network device 112, where the first signal quality information indicates signal quality of the first DL, and the first signal quality information is used to determine uplink indication information.

Optionally, the first signal quality information may be carried by using control plane signaling, for example, may be carried by using measurement result information.

In the foregoing scenario in the connected mode, the access network device 111 receives the first signal quality information from the terminal 121, and sends the first signal quality information to the access network device 112. Optionally, the method may further include: The first access network device 111 receives first measurement control information from the access network device 112, and sends the first measurement control information to the terminal 121, where the first measurement control information is used to indicate the terminal 121 to measure the signal quality of the first DL.

In the foregoing scenario in the idle mode, the access network device 111 receives the first signal quality information from the terminal 121, and sends the first signal quality information to the access network device 112. The access network device 111 may receive the first signal quality information from the terminal 121. Optionally, before this, the access network device 111 may send the first measurement control information to the terminal 121.

Optionally, in the foregoing scenario in the connected mode and the foregoing scenario in the idle mode, in the EN-DC or the NE-DC, the first DL may be a DL of the access network device 111, or may not be a DL of the access network device 111.

That the first DL is the DL of the access network device 111 may be understood as that the first DL is provided by the access network device 111, or a downlink frequency band of the access network device 111 is the same as the downlink frequency band of the first frequency band.

When the first UL is not a UL of the access network device 111, the access network device 111 needs to send the first measurement control information to UE, to indicate the UE to measure the signal quality of the first DL. When the first UL is a UL of the access network device 111, the access network device 111 does not need to additionally send the first measurement control information to the UE, and the first signal quality information that is obtained by the UE through measurement and that is received by the access network device 111 includes the signal quality of the first DL.

The first signal quality information is used to determine the uplink indication information. In a first implementation, when the signal quality of the first DL is greater than a first threshold, the first signal quality information is used to determine the uplink indication information.

Optionally, in the first implementation, the method may further include: The access network device 111 sends second signal quality information to the access network device 112, where the second signal quality information indicates signal quality of a second DL, and the second DL uses a downlink frequency band of a second frequency band.

Optionally, when the signal quality of the second DL is less than a second threshold, and the signal quality of the first DL is greater than the first threshold, the first signal quality information is used to determine the uplink indication information.

Optionally, the first threshold may be the same as a threshold for reporting the signal quality of the first DL by the terminal 121, or the first threshold may be less than a threshold for reporting the signal quality of the first DL by the terminal 121, and the access network device 112 does not need to compare the signal quality of the first DL with the first threshold. When receiving the signal quality of the first DL, the access network device 112 determines the uplink indication information.

In a second implementation,
the method further includes: The access network device 111 sends second signal quality information to the access network device 112, where the second signal quality information indicates signal quality of a second DL, and the second DL uses a downlink frequency band of a second frequency band.

When the signal quality of the first DL is greater than the signal quality of the second DL, the first signal quality information is used to determine the uplink indication information.

In the first implementation and the second implementation, for receiving the second signal quality information, refer to related content of receiving the first signal quality information in S501. An example is described below:

In the foregoing scenario in the connected mode, the access network device 111 receives the second signal quality information from the terminal 121, and forwards the second signal quality information to the access network device 112.

In the foregoing scenario in the idle mode, the access network device 111 receives the second signal quality information from the terminal 121, and forwards the second signal quality information to the access network device 112.

S702: Receive the uplink indication information from the access network device 112, where the uplink indication information indicates to perform transmission on the SUL.

The access network device 111 receives the uplink indication information from the access network device 112, and sends the uplink indication information to the terminal 121.

Optionally, that the uplink indication information indicates the terminal 121 to perform transmission on the SUL means that in the foregoing scenario in the connected mode, the terminal 121 may switch from an NUL to the SUL. It may also be understood that the terminal 121 performs transmission on the NUL before performing transmission on the SUL, and the NUL uses an uplink frequency band of the second frequency band. The NUL and the second DL use the second frequency band.

Optionally, that the uplink indication information indicates the terminal 121 to perform transmission on the SUL means that in the foregoing scenario in the idle mode, the terminal 121 may perform random access on the SUL.

S703: Send the uplink indication information to the terminal.

In the foregoing scenario in the connected mode, the access network device 111 receives the uplink indication information from the terminal 121, and forwards the uplink indication information to the access network device 112.

In the foregoing scenario in the idle mode, the access network device 111 receives the uplink indication information from the terminal 121, and forwards the uplink indication information to the access network device 112.

Figure 7:
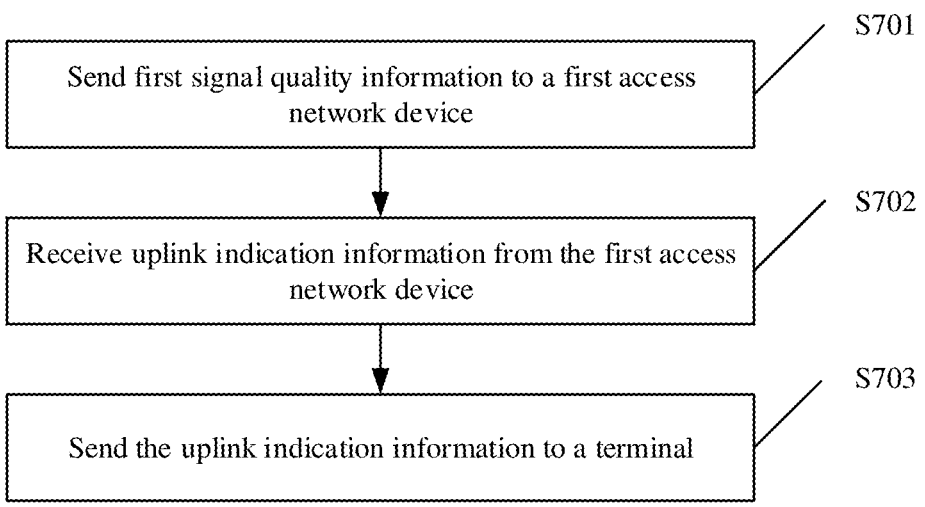
FIG. 7 is a schematic flowchart of still another uplink determining method according to an embodiment of this application.

For different scenarios, the following describes in detail interaction procedures between the terminal 121, the access network device 111, and the access network device 112 in the embodiments shown in FIG. 5 to FIG. 7.

Figure 8A:
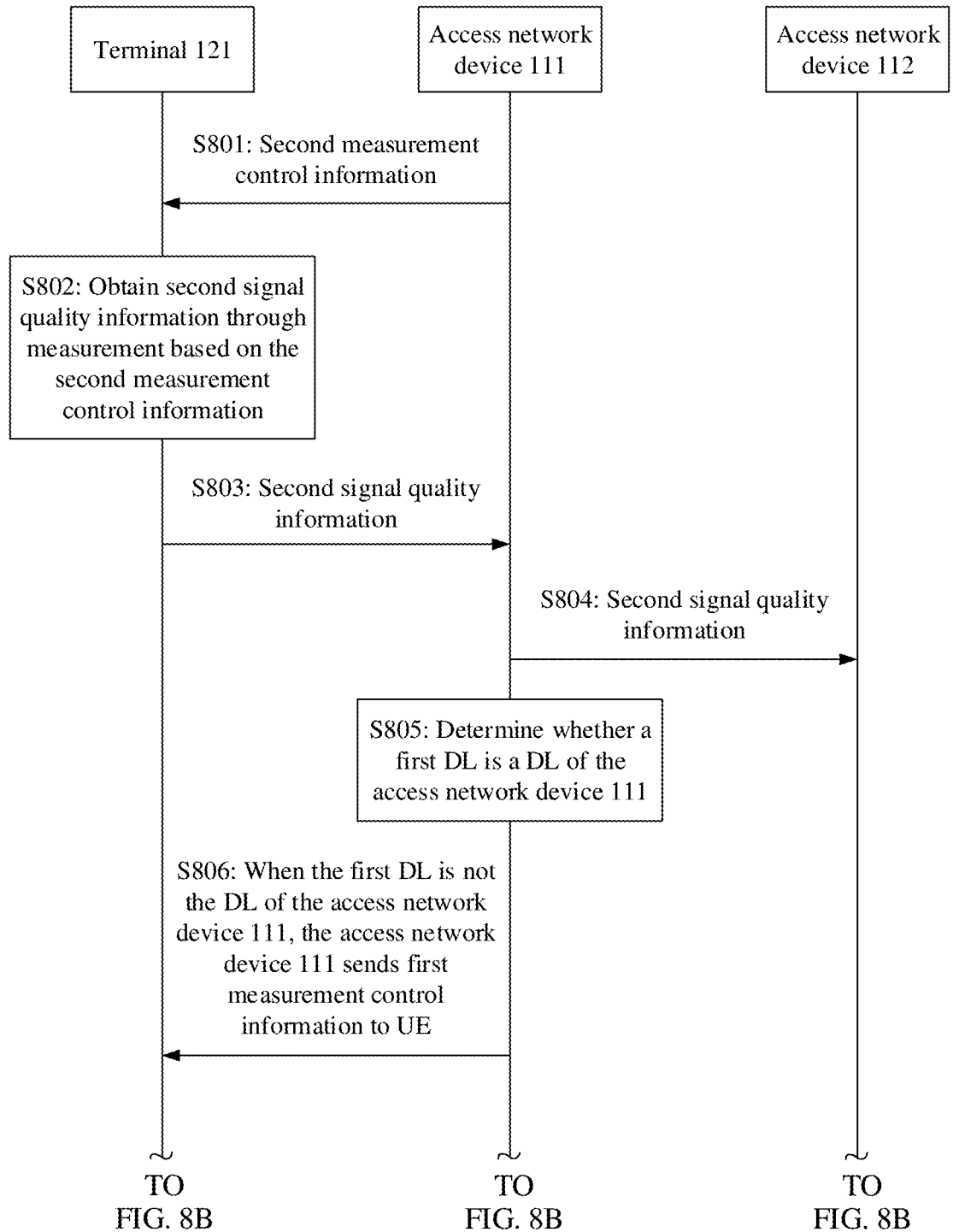
FIG. 8A and FIG. 8B are a schematic flowchart of an uplink determining method when a terminal is in an EN-DC or NGEN-DC idle mode.
Figure 8B:
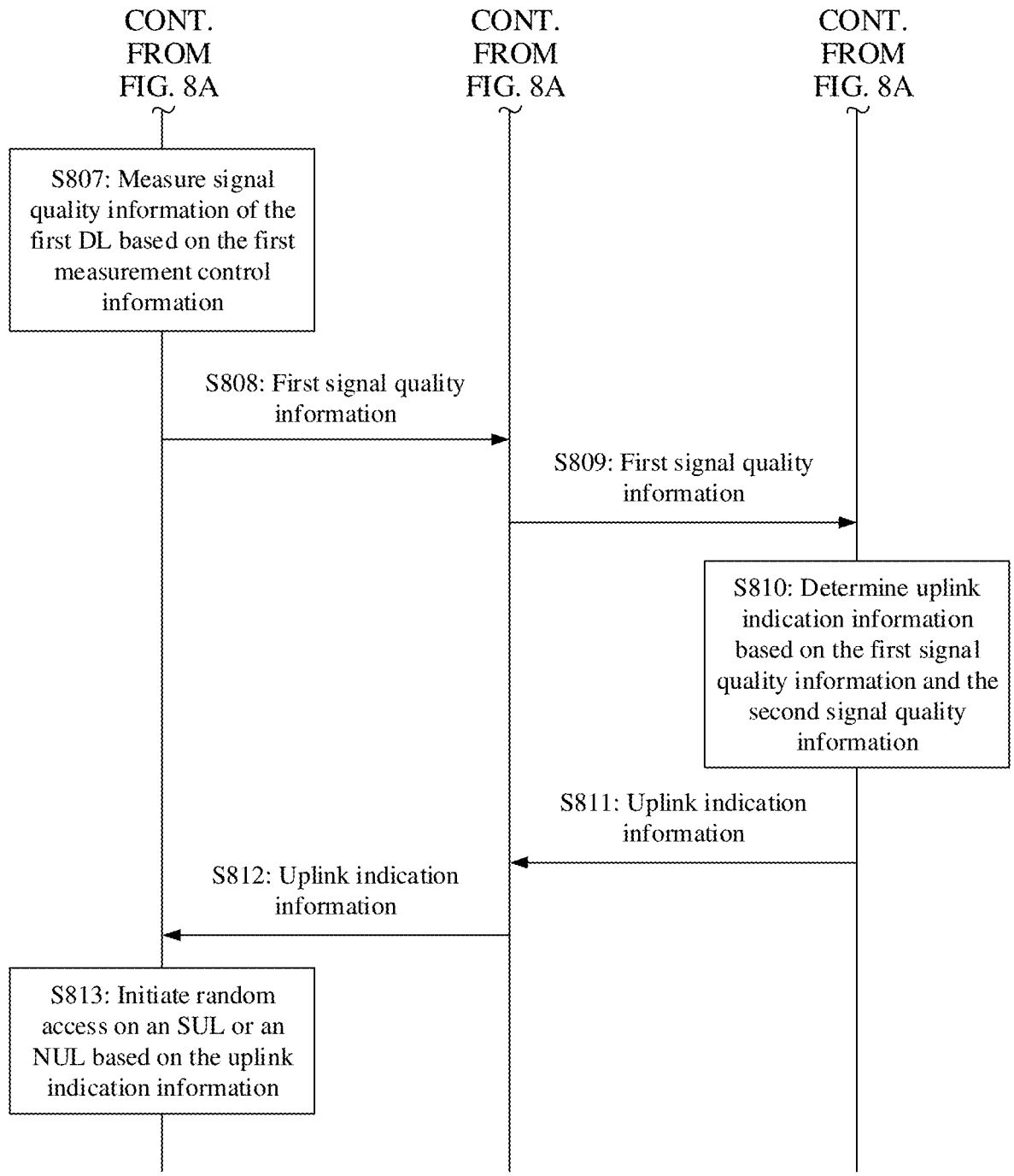

In an embodiment, the terminal 121 is in an EN-DC idle mode or an NGEN-DC idle mode, a frequency band of an SUL is different from a frequency band of a UL of the access network device 111, and the access network device 112 may determine an uplink based on signal quality of a DL of the access network device 112 and signal quality of a DL corresponding to the SUL. FIG. 8A and FIG. 8B are a schematic flowchart of determining an uplink by the terminal 121 in the EN-DC idle mode or the NGEN-DC idle mode. The method includes the following steps.

S801: The access network device 111 sends second measurement control information to the terminal 121, where the second measurement control information indicates to measure signal quality of the second DL.

Uplinks between the access network device 112 and the terminal 121 are an NUL and an SUL, and a downlink between the access network device 112 and the terminal 121 is the second DL. The second DL and the NUL use a second frequency band, and the SUL uses an SUL frequency band.

Optionally, the second measurement control information may be a B1 measurement event. The B1 measurement event may refer to measurement of downlink signal quality of an inter-system cell. When the downlink signal quality of the inter-system cell that is obtained through measurement by the terminal 121 is higher than a threshold, it indicates that the downlink signal quality of the inter-system cell is good enough, and the terminal 121 may perform reporting. The inter-system herein may refer to a communications system different from a system currently accessed by the terminal 121. For example, in the EN-DC, the terminal 121 currently accesses the access network device 111, a system currently accessed by the terminal 121 is an LTE system, and the inter-system may be an NR system.

The signal quality of the second DL herein may be reference signal received power (reference signal receiving power, RSRP), reference signal received quality (reference signal receiving quality, RSRQ), or the like.

Optionally, before S801, the method may further include the following steps.

(1) Check whether a cell status is normal, including whether the second DL, the NUL, and the SUL are normal (that is, whether they can provide communication services properly) and whether abnormal alarms are reported.

(2) Configure a neighboring relationship.

Optionally, a cell provided by the access network device 112 and a cell corresponding to the SUL frequency band have same or similar coverage geographically. For example, the two may be considered to have same coverage based on an empirical value of 70% or more.

Optionally, a bidirectional neighboring relationship may be configured for the cell provided by the access network device 112 and the cell corresponding to the SUL frequency band. It may be understood that, for the cell provided by the access network device 112, the cell corresponding to the SUL frequency band may be configured as a neighboring cell, and for the cell corresponding to the SUL frequency band, the cell provided by the access network device 112 may be configured as a neighboring cell.

The cell corresponding to the SUL frequency band herein may be understood as a cell that uses an uplink FDD frequency band that is the same as the SUL frequency band. For example, the SUL frequency band is an n80 frequency band, and a cell corresponding to the n80 frequency band is a cell that uses an n3 frequency band.

(3) Check whether an interface status is normal.

For example, whether an interface between the access network device 111 and the access network device 112 is normal, whether an interface between the access network device 111 and the core network element 101 is normal, and whether an interface between the access network device 112 and the core network element 101 is normal are checked.

S802: The terminal 121 measures the signal quality of the second DL based on the second measurement control information, to obtain second signal quality information.

S803: The terminal 121 reports the second signal quality information to the access network device 111.

The second signal quality information indicates the signal quality of the second DL.

Optionally, the second signal quality information may be a B1 measurement report. The B1 measurement report may be a downlink signal quality measurement report of the inter-system cell.

For example, the signal quality of the second DL may be RSRP of the second DL. For example, in the EN-DC, the signal quality of the second DL may be NR DL RSRP.

S804: The access network device 111 sends the second signal quality information to the access network device 112.

For example, the access network device 111 may send the second signal quality information to the access network device 112 through an X2 interface.

S805: The access network device 111 determines whether a first DL is a DL of the access network device 111.

The first DL uses a downlink frequency band of a first frequency band, and an uplink frequency band of the first frequency band is the same as the SUL frequency band of the access network device 112.

Optionally, the access network device 112 sends information about the SUL frequency band to the access network device 111. For example, the access network device 112 may send the information about the SUL frequency band to the access network device 111 through an interface.

Optionally, a network management system may send the information about the SUL frequency band of the access network device 112 to the access network device 111.

Optionally, the information about the SUL frequency band may be preconfigured in the access network device 111.

Optionally, after sending the second signal quality information to the access network device 112, the access network device 111 determines whether the first DL is the DL of the access network device 111.

S806: When the first DL is not the DL of the access network device 111, the access network device 111 sends first measurement control information to the terminal 121, where the first measurement control information indicates to measure signal quality of the first DL.

Optionally, a cell in which the first DL is located may be configured as a neighboring cell of a cell of the access network device 111, and the cell in which the first DL is located may be identified in a neighboring cell list of the access network device 111. The access network device 111 may indicate, based on the identifier, the terminal 121 to measure the signal quality of the first DL.

S807: After receiving the first measurement control information, the terminal 121 measures a signal quality value of the first DL.

S808: The terminal 121 sends the first signal quality information to the access network device 111.

The first signal quality information may indicate the signal quality of the first DL.

S809: The access network device 111 sends the received first signal quality information to the access network device 112.

For example, the access network device 111 may send the received first signal quality information to the access network device 112 through an X2 interface.

For example, the access network device 111 may send a secondary node addition request message to the access network device 112, and then send the first signal quality information to the access network device 112.

The access network device 111 sends the secondary node addition request to the access network device 112, so that when determining to add a secondary node, the access network device 111 may send signal quality information of the first DL to the access network device 112.

S810: The access network device 112 determines uplink indication information based on the first signal quality information and the second signal quality information.

In a first optional implementation, the access network device 112 may determine through comparison whether the signal quality of the first DL is greater than the signal quality of the second DL.

Optionally, the access network device 112 may first determine through comparison whether the signal quality of the second DL is less than a first threshold, and then compare the signal quality of the first DL with the signal quality of the second DL when the signal quality of the second DL is less than the first threshold. Herein, the first threshold may be referred to as a decoupling start threshold, the signal quality of the second DL is a threshold obtained through actual measurement, and the signal quality of the second DL may be referred to as a decoupling trigger threshold.

In the first optional implementation, the following cases may exist:

Case 1:

When the signal quality of the second DL is less than the first threshold, and the signal quality of the first DL is greater than the signal quality of the second DL, the uplink indication information may be used to indicate the terminal 121 to initiate random access on the SUL.

Because the signal quality of the first DL is greater than the signal quality of the second DL, it indicates that the terminal 121 is in an area in which the NUL has weak uplink coverage or has no coverage but the SUL has relatively good coverage, and it indicates that the terminal 121 may initiate random access on the SUL.

Case 2:

When the signal quality of the second DL is less than the first threshold, and the signal quality of the first DL is less than or equal to the signal quality of the second DL, the uplink indication information is used to indicate the terminal 121 to initiate random access on the NUL.

If the signal quality of the second DL is less than the first threshold, and the signal quality of the first DL is less than or equal to the signal quality of the second DL, it indicates that both the NUL and the SUL have weak coverage. In this case, the terminal 121 may initiate random access on the NUL.

Case 3:

When the signal quality of the second DL is greater than or equal to a third threshold, the uplink indication information is used to indicate the terminal 121 to initiate random access on the NUL. The third threshold may be greater than the first threshold.

Because the signal quality of the second DL is greater than or equal to the third threshold, it indicates that the terminal 121 is in an area with good NR uplink coverage, and uplink and downlink decoupling does not need to be triggered, and it indicates that the terminal 121 may initiate random access on the NUL.

In a second optional implementation, the access network device 112 may determine through comparison whether the signal quality of the first DL is greater than a second threshold.

A difference between the second optional implementation and the first optional implementation lies in that the decoupling trigger threshold may alternatively be a configured value or an absolute threshold.

Optionally, the access network device 112 may first determine through comparison whether the signal quality of the second DL is less than a first threshold, and then compare the signal quality of the first DL with the second threshold when the signal quality of the second DL is less than the first threshold. Herein, the first threshold may be referred to as a decoupling start threshold, the second threshold is a fixed value, for example, an empirical value, and a signal quality threshold of the second DL may be referred to as a decoupling trigger threshold.

Case 1:

When the signal quality of the second DL is less than the first threshold, and the signal quality of the first DL is greater than the second threshold, the uplink indication information may be used to indicate the terminal 121 to initiate random access on the SUL.

When the signal quality of the first DL is greater than the second threshold, it indicates that the terminal 121 is in an area in which the SUL has relatively good coverage, and it indicates that the terminal 121 may initiate random access on the SUL.

Case 2:

When the signal quality of the second DL is less than the first threshold, and the signal quality of the first DL is less than or equal to the second threshold, the uplink indication information is used to indicate the terminal 121 to initiate random access on the NUL.

If the signal quality of the second DL is less than the first threshold, and the signal quality of the first DL is less than or equal to the second threshold, it indicates that both the NUL and the SUL have weak coverage, and the terminal 121 may perform random access on the NUL.

Case 3:

Refer to related content of Case 3 in the first implementation.

Optionally, in the foregoing first implementation and second implementation, when the signal quality of the second DL is less than the first threshold, it indicates that the terminal 121 is in an area in which the NUL has weak coverage or an area in which the NUL has no coverage, and the terminal 121 may not be suitable for initiating random access on the NUL. Then, the access network device 112 may determine, with reference to the signal quality of the first DL, whether the terminal 121 initiates random access on the SUL.

Optionally, the access network device 112 may determine the uplink indication information based on the first signal quality information. In this case, the access network device 112 may not determine whether the signal quality of the second DL is less than the first threshold, and delivers the uplink indication information when the signal quality of the first DL is greater than the signal quality of the second DL, or the signal quality of the first DL is greater than the second threshold.

S811: The access network device 112 sends the uplink indication information to the access network device 111.

S812: The access network device 111 forwards the uplink indication information to the terminal 121.

The access network device 112 sends the uplink indication information to the terminal 121 based on the uplink indication information determined in S809. The uplink indication information is forwarded by the access network device 111 to the terminal 121. The uplink indication information may indicate the terminal 121 to perform random access on the SUL, or may indicate the terminal 121 to perform random access on the NUL.

Optionally, when the uplink indication information indicates the terminal 121 to perform random access on the SUL, to ensure correct access and working of the terminal 121 on the SUL, the access network device 111 may send SUL related information to the terminal 121. The SUL related information may include: a frame structure, a system bandwidth, a frequency, a physical random access channel (physical random access channel, PRACH) configuration (including a time-frequency resource configuration and an uplink carrier selection threshold), a physical uplink shared channel (physical uplink shared channel, PUSCH) common configuration, a physical uplink control channel (physical uplink control channel, PUCCH) common configuration, a sounding reference signal (sounding reference signal, SRS) configuration, and the like. For example, the foregoing information may be carried in a "serving cell common configuration" ("servingcellconfigrcommon") information element of an RRC reconfiguration message.

S813: The terminal 121 initiates random access on the SUL or the NUL based on the uplink indication information.

When the uplink indication information indicates the terminal 121 to perform transmission on the SUL, the terminal 121 initiates random access on the SUL. When the uplink indication information indicates the terminal 121 to perform transmission on the NUL, the terminal 121 initiates random access on the NUL.

It can be learned that in this embodiment, uplink and downlink decoupling is divided into two phases, that is, a decoupling start phase and a decoupling trigger phase. When uplink and downlink decoupling is performed, a dual-threshold algorithm is used, that is, both the signal quality of the second DL (the decoupling start threshold) and the signal quality of the first DL (the decoupling trigger threshold) are considered. Uplink and downlink decoupling is implemented only when both the start threshold and the trigger threshold meet a condition.

In this embodiment, the access network device 112 determines, based on the signal quality of the second DL and the signal quality of the first DL (that is, dual thresholds) that are reported by the terminal 121, how to select an uplink, to accurately learn of signal quality of the SUL, thereby avoiding blindly selecting the SUL for uplink access. In addition, when the signal quality of the second DL is lower than the first threshold, the access network device 111 sends the signal quality of the first DL, that is, a decoupling process is divided into a decoupling start process and a decoupling trigger process, to avoid triggering decoupling prematurely or belatedly.

Figure 9A:
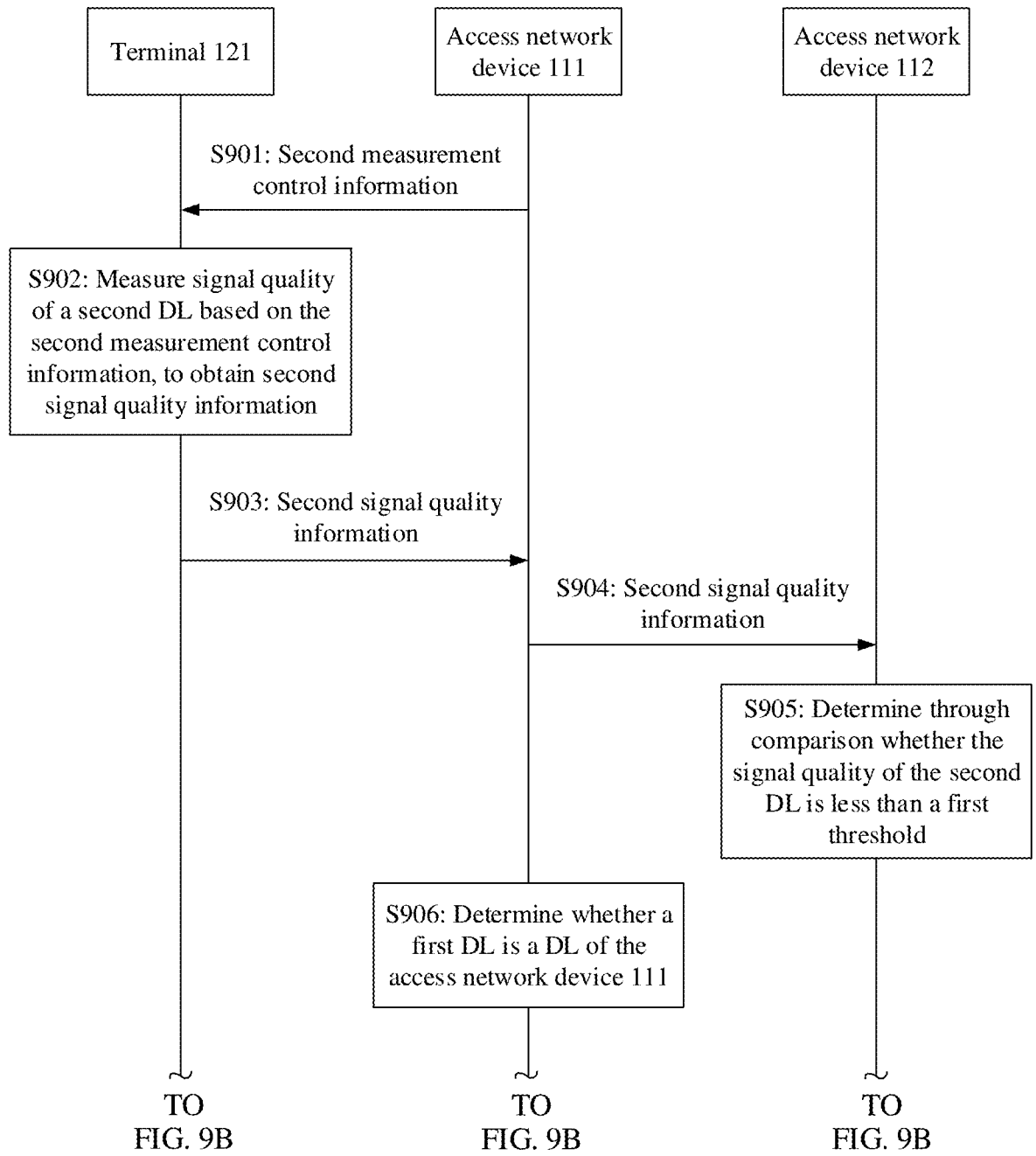
FIG. 9A and FIG. 9B are a schematic flowchart of an uplink determining method when a terminal is in an EN-DC or NGEN-DC idle mode.
Figure 9B:
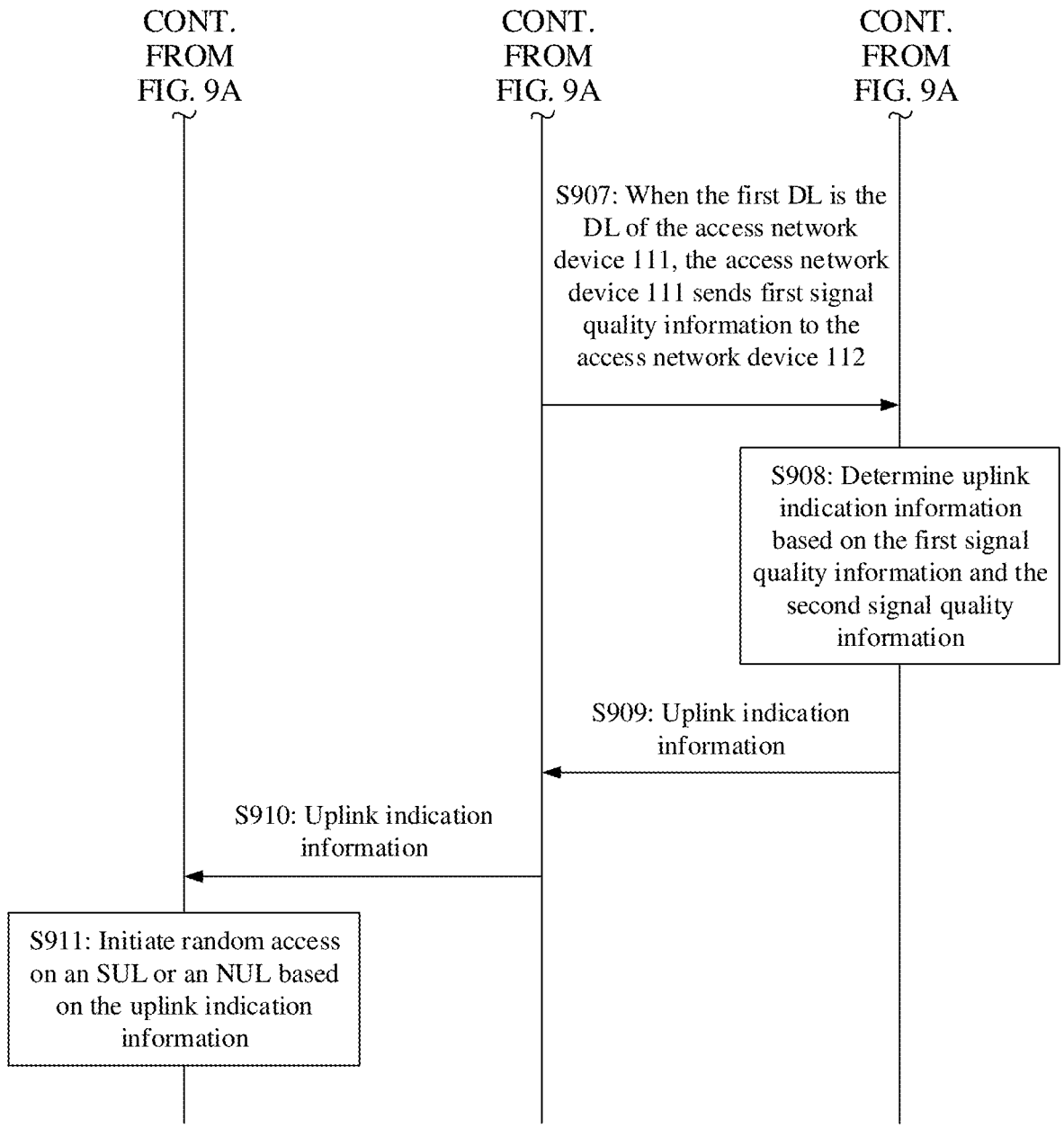

In another embodiment, in the EN-DC or NGEN-DC scenario, the terminal 121 is in an EN-DC or NGEN-DC idle mode, a frequency band of an SUL is the same as a frequency band of a UL of the access network device 111, and the access network device 112 may determine an uplink based on signal quality of a DL of the access network device 112 and a signal quality value of a DL corresponding to the SUL. FIG. 9A and FIG. 9B are a schematic flowchart of determining an uplink in the EN-DC or NGEN-DC idle mode. The method includes the following steps.

S901: The access network device 111 sends second measurement control information to the terminal 121, where the second measurement control information indicates to measure signal quality of the second DL.

S902: After receiving the second measurement control information, the terminal 121 measures the signal quality of the second DL, to obtain second signal quality information.

S903: The terminal 121 reports the second signal quality information to the access network device 111.

The second signal quality information indicates the signal quality of the second DL.

S904: The access network device 111 sends the second signal quality information to the access network device 112.

For content in S901 to S904, refer to content in S801 to S804.

S905: The access network device 112 determines through comparison whether the signal quality of the second DL is less than a first threshold.

S905 is optional.

S906: The access network device 111 determines whether a first DL is a DL of the access network device 111.

S907: When the first DL is the DL of the access network device 111, the access network device 111 sends first signal quality information to the access network device 112.

For example, the access network device 111 may send the first signal quality information to the access network device 112 through an interface.

Figure 11:
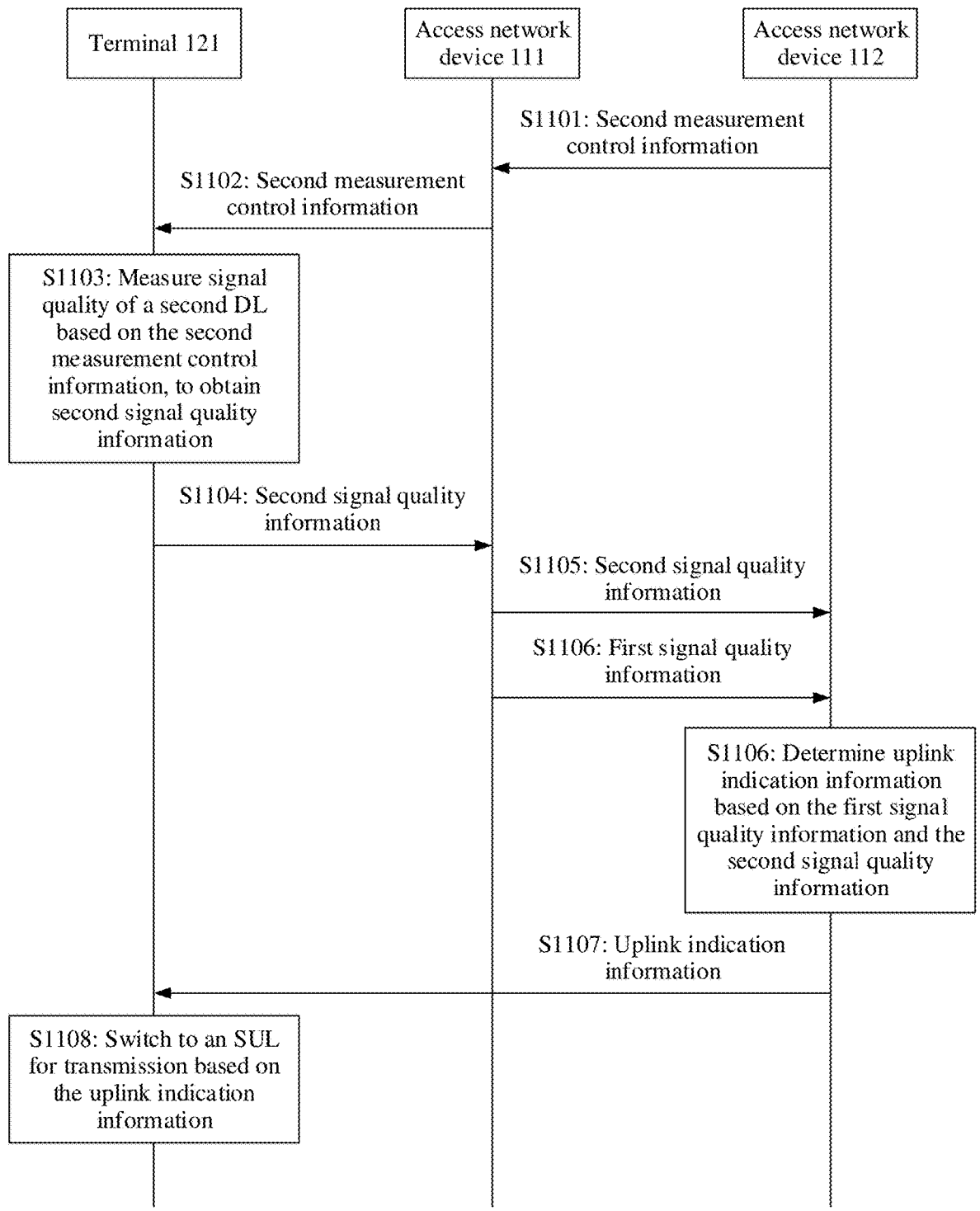
FIG. 11 is a schematic flowchart of an uplink determining method when a terminal is in an EN-DC or NGEN-DC connected mode.

A difference between this embodiment and the embodiment shown in FIG. 11 lies in the following: Because the first DL is the DL of the access network device 111, the access network device 111 may not resend measurement control information to the terminal 121, and the access network device 111 may send the measurement control information to the terminal 121 after an RRC connection is established. The terminal 121 sends a signal quality value of a DL of the access network device 111 to the access network device 111 periodically or in real time. The access network device 111 may use the received signal quality value of the DL of the access network device 111 as signal quality of the first DL, and send the signal quality to the access network device 112. For example, the access network device 111 may use a recently received signal quality value of the DL of the access network device 111 as the signal quality of the first DL and send the signal quality to the access network device 112.

S908: The access network device 112 determines uplink indication information based on the first signal quality information and the second signal quality information.

S909: The access network device 112 sends the uplink indication information to the access network device 111.

S910: The access network device 111 forwards the uplink indication information to the terminal 121.

S911: The terminal 121 initiates random access on an SUL or an NUL based on the uplink indication information.

For S908 to S911, refer to related content in S810 to S813.

It can be learned that in this embodiment, uplink and downlink decoupling is divided into two phases, that is, a decoupling start phase and a decoupling trigger phase. When uplink and downlink decoupling is performed, a dual-threshold algorithm is used, that is, both the signal quality of the second DL (a decoupling start threshold) and the signal quality of the first DL (a decoupling trigger threshold) are considered. Uplink and downlink decoupling is implemented only when both the start threshold and the trigger threshold meet a condition.

In this embodiment, the access network device 112 determines, based on the signal quality of the second DL and the signal quality of the first DL (that is, dual thresholds) that are reported by the terminal 121, how to select an uplink, to accurately learn of signal quality of the SUL, thereby avoiding blindly selecting the SUL for uplink access. In addition, when the signal quality of the second DL is lower than the first threshold, the access network device 111 sends the signal quality of the first DL, that is, a decoupling process is divided into a decoupling start process and a decoupling trigger process, to avoid triggering decoupling prematurely or belatedly.

In another embodiment, the terminal 121 is in an EN-DC connected mode or an NGEN-DC connected mode, the terminal 121 has accessed the access network device 112, the terminal 121 currently performs uplink transmission on an NUL, and a frequency band of an SUL is different from a frequency band of a UL of the access network device 111. Due to an uplink coverage difference between an NUL carrier and an SUL carrier, an uplink may change when the terminal 121 moves in a cell. A network side may select an uplink based on dual thresholds. FIG. 10A and FIG. 10B are a schematic flowchart of determining an uplink in the EN-DC connected mode or the NGEN-DC connected mode. The method includes the following steps.

S1001: The access network device 112 sends second measurement control information to the access network device 111, where the second measurement control information is used to indicate the terminal to measure signal quality of a second DL.

Uplinks between the access network device 112 and the terminal 121 are an NUL and an SUL, and a downlink between the access network device 112 and the terminal 121 is the second DL. The second DL and the NUL use a second frequency band, and the SUL uses an SUL frequency band.

The terminal 121 currently performs uplink transmission on the NUL. After an RRC connection is established, the access network device 112 sends the second measurement control information to the access network device 111. The second measurement control information is used to indicate the terminal 121 to measure the signal quality of the second DL.

The second measurement control information may be referred to as an A2 measurement event. The A2 event refers to measurement of downlink signal quality of a serving cell. When the downlink signal quality of the serving cell is less than a threshold, reporting is performed. When the downlink signal quality of the serving cell is less than the threshold, it indicates that the signal quality of the serving cell has become relatively poor.

S1002: The access network device 111 forwards the second measurement control information to the terminal 121.

In the EN-DC scenario, control plane signaling of the access network device 112 is forwarded by the access network device 111. In this case, the access network device 111 forwards the second measurement control information to the terminal 121.

S1003: The terminal 121 measures the signal quality of the second DL based on the second measurement control information.

S1004: The terminal 121 sends second signal quality information to the access network device 111.

The second signal quality information is used to indicate the signal quality of the second DL.

Optionally, the second signal quality information is included in an A2 measurement report. When the signal quality of the second DL that is obtained through measurement by the terminal 121 is lower than a threshold, the A2 measurement report is reported. The access network device 111 receives the A2 measurement report reported by the terminal 121.

S1005: The access network device 111 forwards the second signal quality information to the access network device 112.

S1001 to S1005 show a process in which the access network device 112 sends the second measurement control information to the terminal 121 through the access network device 111, and the terminal 121 sends the second signal quality information to the access network device 112 through the access network device 111. In addition to a manner shown in S1001 to S1005, the access network device 112 may send the second measurement control information to the terminal 121 through an air interface, and the terminal 121 may send the second signal quality information to the access network device 112 through an air interface.

S1006: The access network device 112 determines through comparison whether the signal quality of the second DL is less than a first threshold.

S1007: When the signal quality of the second DL is less than the first threshold, the access network device 112 sends first measurement control information to the access network device 111. The first measurement control information is used to indicate the terminal to measure signal quality of a first DL of the access network device 112.

The first DL uses a downlink frequency band of a first frequency band, and an uplink frequency band of the first frequency band is the same as the frequency band of the SUL of the access network device 112.

When the signal quality of the second DL is less than the first threshold, it indicates that the terminal 121 is currently in an area with weak coverage of an NR cell, and uplink and downlink decoupling needs to be started. In addition, because the first DL is not a DL of the access network device 111, and the access network device 111 does not obtain the signal quality of the first DL, the access network device 112 needs to deliver the first measurement control information to the terminal 121, to indicate the terminal 121 to measure the signal quality of the first DL. The first threshold may be referred to as a decoupling start threshold.

Optionally, when the signal quality of the second DL is greater than or equal to a third threshold, the terminal 121 maintains uplink transmission on the NUL, and does not deliver uplink indication information.

Because the signal quality of the second DL is greater than or equal to the third threshold, it indicates that the terminal 121 is in an area with good NR uplink coverage, and uplink and downlink decoupling does not need to be triggered, and the terminal 121 maintains uplink transmission on the NUL.

S1008: The access network device 111 forwards the first measurement control information to the terminal 121.

S1009: The terminal 121 obtains first signal quality information through measurement based on the first measurement control information.

The first signal quality information is used to indicate the signal quality of the first DL.

S1010: The terminal 121 sends the first signal quality information to the access network device 111.

S1011: The access network device 111 forwards the first signal quality information to the access network device 112.

Optionally, the access network device 111 forwards the first signal quality information to the access network device 112 through an X2 interface.

Optionally, S1008 to S1010 are optional. The access network device 111 may determine whether a frequency band of the first DL is the same as the downlink frequency band of the access network device 111; and when the frequency band of the first DL is different from the downlink frequency band of the access network device 111, the access network device 111 may not measure the first DL, and the access network device 111 may deliver the first measurement control information, to indicate the terminal 121 to measure the signal quality of the first DL. In this case, S1008 to S1010 exist. Alternatively, when the frequency band of the first DL is different from the downlink frequency band of the access network device 111, the access network device 111 may measure the first DL. In this case, the access network device 111 may not deliver the first measurement control information, but send the signal quality of the first DL that is received from the terminal 121 to the access network device 112. In this case, S1008 to S1010 do not exist.

Optionally, a cell in which the first DL is located may be configured as a neighboring cell of a cell of the access network device 111, and the cell in which the first DL is located may be identified in a neighboring cell list of the access network device 111. The access network device 111 may indicate, based on the identifier, the terminal 121 to measure the signal quality of the first DL.

S1012: The access network device 112 determines uplink indication information based on the first signal quality information and the second signal quality information.

When determining that the terminal 121 maintains transmission on the NUL, the access network device 112 does not deliver the uplink indication information.

When determining that the terminal 121 performs transmission on the SUL, the access network device 112 delivers the uplink indication information. The uplink indication information indicates the terminal 121 to switch from the NUL to the SUL.

In a first optional implementation, the access network device 112 may determine through comparison whether the signal quality of the first DL is greater than the signal quality of the second DL. The following cases exist:

Herein, a threshold compared with the signal quality of the first DL is signal quality of the second DL that is obtained through actual measurement, and is a variable value. The threshold may be referred to as a decoupling trigger threshold.

Case 1:

When the signal quality of the first DL is greater than the signal quality of the second DL, the uplink indication information may be used to indicate the terminal 121 to switch to the SUL for transmission.

Because the signal quality of the first DL is greater than the signal quality of the second DL, it indicates that the terminal 121 is in an area in which the NUL has weak uplink coverage or has no coverage but the SUL has relatively good coverage, and the terminal 121 switches to the SUL for transmission, thereby improving transmission reliability and user experience.

Case 2:

When the signal quality of the first DL is less than or equal to the signal quality of the second DL, the terminal 121 maintains uplink transmission on the NUL, and does not deliver the uplink indication information.

When the signal quality of the first DL is less than or equal to the signal quality of the second DL, it indicates that both the NUL and the SUL have weak coverage, and the terminal 121 maintains uplink transmission on the NUL.

In a second optional implementation, the access network device 112 may determine through comparison whether the signal quality of the first DL is greater than a second threshold.

Optionally, the second threshold may be a constant value. Optionally, the second threshold may be an empirical value, and may be used to determine the signal quality of the first DL.

Case 1:

When the signal quality of the first DL is greater than the second threshold, the uplink indication information may be used to indicate the terminal 121 to switch to the SUL for transmission.

Because the signal quality of the first DL is greater than the second threshold, it indicates that the terminal 121 is in an area in which the SUL has relatively good coverage, and the terminal 121 may switch to the SUL for transmission, thereby improving transmission reliability and user experience.

Case 2:

When the signal quality of the first DL is less than or equal to the second threshold, the terminal 121 maintains uplink transmission on the NUL, and does not deliver the uplink indication information.

Because the signal quality of the first DL is less than or equal to the second threshold, it indicates that the terminal 121 is in an area in which the SUL has weak coverage, and the terminal 121 maintains uplink transmission on the NUL, and performs no switching.

A difference between the second optional implementation and the first optional implementation lies in that the decoupling trigger threshold may alternatively be a configured value or an absolute threshold. A comparison process is similar to that in the first optional implementation. For related content, refer to the first optional implementation.

S1013: The access network device 112 sends the uplink indication information to the terminal 121.

S1014: The terminal 121 switches to the SUL for transmission based on the uplink indication information.

In this embodiment, when performing uplink transmission on the NUL, the terminal 121 determines, based on the signal quality of the second DL and the signal quality of the first DL, whether to change to the SUL for transmission, to accurately learn of the signal quality of the first DL, thereby avoiding blindly changing to the SUL, and improving transmission reliability and user experience.

In another embodiment, the terminal 121 is in an EN-DC connected mode or an NGEN-DC connected mode, the terminal 121 has accessed the access network device 112, the terminal 121 currently performs uplink transmission on an NUL, and a frequency band of an SUL is the same as a frequency band of a UL of the access network device 111. Due to an uplink coverage difference between an NUL carrier and an SUL carrier, an uplink may change when the terminal 121 moves in a cell. A network side may select an uplink based on dual thresholds. FIG. 11 is a schematic flowchart of determining an uplink by the terminal 121 in the EN-DC connected mode or the NGEN-DC connected mode. The method includes the following steps.

S1101: The access network device 112 sends second measurement control information to the access network device 111, where the second measurement control information is used to indicate the terminal to measure signal quality of a second DL.

S1102: The access network device 111 forwards the second measurement control information to the terminal 121.

S1103: The terminal 121 obtains second signal quality information through measurement based on the second measurement control information.

The second signal quality information is used to indicate the signal quality of the second DL.

S1104: The terminal 121 sends the second signal quality information to the access network device 111.

S1105: The access network device 111 forwards the second signal quality information to the access network device 112.

For S1101 to S1105, refer to related content in S1001 to S1005.

S1106: The access network device 111 sends first signal quality information to the access network device 112.

The first signal quality information is used to indicate signal quality of a first DL.

Optionally, the access network device 111 sends the first signal quality information to the access network device 112 through an X2 interface.

A difference from the implementation shown in FIG. 10A and FIG. 10B lies in the following: Because the first DL is a DL of the access network device 111, a signal quality value that is of a frequency band of a DL of the access network device 111 and that is received by the access network device 111 from the terminal 121 is the signal quality of the first DL, and the access network device 112 may not need to re-deliver measurement control information to the terminal 121, but sends a first request to the access network device 111 to request the access network device 111 to send the signal quality of the first DL. The first threshold may be referred to as a decoupling start threshold.

Optionally, the access network device 111 may determine whether the first DL is the DL of the access network device 111. When the first DL is the DL of the access network device 111, the access network device 111 sends the first signal quality information to the access network device 112.

Optionally, the access network device 112 may send the first request to the access network device 111. The first request is used to request to obtain the signal quality of the first DL of the access network device 112. The access network device 112 sends the signal quality of the first DL to the access network device 111 based on the request. Optionally, the first request may be the first measurement control information, and the first measurement control information is used to indicate to measure the signal quality of the first DL. S1109: The access network device 112 determines uplink indication information based on the first signal quality information and the second signal quality information.

The uplink indication information is used to indicate the terminal 121 to perform transmission on the SUL. For example, the terminal 121 switches from the NUL to the SUL for transmission.

In a first optional implementation, the access network device 112 may determine through comparison whether the signal quality of the first DL is greater than the signal quality of the second DL.

Optionally, the access network device 112 may first determine through comparison whether the signal quality of the second DL is less than the first threshold, and then compare the signal quality of the first DL with the signal quality of the second DL when the signal quality of the second DL is less than the first threshold. Herein, the first threshold may be referred to as a decoupling start threshold, the signal quality of the second DL is a value obtained through actual measurement, and the signal quality of the second DL may be referred to as a decoupling trigger threshold.

Case 1:

When the signal quality of the second DL is less than the first threshold, and the signal quality of the first DL is greater than the signal quality of the second DL, the uplink indication information may be used to indicate the terminal 121 to perform transmission on the SUL.

Because the signal quality of the first DL is greater than the signal quality of the second DL, it indicates that the terminal 121 is in an area in which the NUL has weak uplink coverage or has no coverage but the SUL has relatively good coverage, and it indicates that the terminal 121 may perform transmission on the SUL.

Case 2:

When the signal quality of the second DL is less than the first threshold, and the signal quality of the first DL is less than or equal to the signal quality of the second DL, the terminal 121 may maintain transmission on the NUL, and the access network device 112 does not send the uplink indication information.

If the signal quality of the second DL is less than the first threshold, and the signal quality of the first DL is less than or equal to the signal quality of the second DL, it indicates that both the NUL and the SUL have weak coverage. In this case, the terminal 121 may continue to perform transmission on the NUL.

Case 3:

When the signal quality of the second DL is greater than or equal to a third threshold, the terminal 121 may maintain transmission on the NUL, and the access network device 112 does not send the uplink indication information. The third threshold may be greater than the first threshold.

Because the signal quality of the second DL is greater than or equal to the third threshold, it indicates that the terminal 121 is in an area with good NR uplink coverage, and uplink and downlink decoupling does not need to be triggered, and it indicates that the terminal 121 may initiate random access on the NUL.

In a second optional implementation, the access network device 112 may determine through comparison whether the signal quality of the first DL is greater than a second threshold.

A difference between the second optional implementation and the first optional implementation lies in that the decoupling trigger threshold may alternatively be a configured value or an absolute threshold.

Optionally, the access network device 112 may first determine through comparison whether the signal quality of the second DL is less than the first threshold, and then compare the signal quality of the first DL with the second threshold when the signal quality of the second DL is less than the first threshold. Herein, the first threshold may be referred to as a decoupling start threshold, the second threshold is a fixed value, for example, an empirical value, and a signal quality threshold of the second DL may be referred to as a decoupling trigger threshold.

Case 1:

When the signal quality of the second DL is less than the first threshold, and the signal quality of the first DL is greater than the second threshold, the uplink indication information may be used to indicate the terminal 121 to perform transmission on the SUL.

When the signal quality of the first DL is greater than the second threshold, it indicates that the terminal 121 is in an area in which the SUL has relatively good coverage, and it indicates that the terminal 121 may perform transmission on the SUL, for example, switch from the NUL to the SUL.

Case 2:

When the signal quality of the second DL is less than the first threshold, and the signal quality of the first DL is less than or equal to the second threshold, the terminal 121 may maintain transmission on the NUL, and the access network device 112 does not send the uplink indication information.

If the signal quality of the second DL is less than the first threshold, and the signal quality of the first DL is less than or equal to the second threshold, it indicates that both the NUL and the SUL have weak coverage, and the terminal 121 may maintain transmission on the NUL.

Case 3:

Refer to related content of Case 3 in the first implementation.

Optionally, in the foregoing first implementation and second implementation, when the signal quality of the second DL is less than the first threshold, it indicates that the terminal 121 is in an area in which the NUL has weak coverage or an area in which the NUL has no coverage, and the terminal 121 may not be suitable for performing transmission on the NUL. Then, the access network device 112 may determine, with reference to the signal quality of the first DL, whether the terminal 121 performs transmission on the SUL.

Optionally, the access network device 112 may determine the uplink indication information based on the first signal quality information. In this case, the access network device 112 may not determine whether the signal quality of the second DL is less than the first threshold, and delivers the uplink indication information when the signal quality of the first DL is greater than the signal quality of the second DL, or the signal quality of the first DL is greater than the second threshold.

S1107: The access network device 112 sends the uplink indication information to the terminal 121.

S1108: The terminal 121 switches to the SUL for transmission based on the uplink indication information.

In this embodiment, when performing uplink transmission on the NUL, the terminal 121 determines, based on the signal quality of the second DL and the signal quality of the first DL, whether to change to the SUL for transmission, to accurately learn of the signal quality of the first DL, thereby avoiding blindly changing to the SUL, and improving transmission reliability and user experience.

Figure 12:
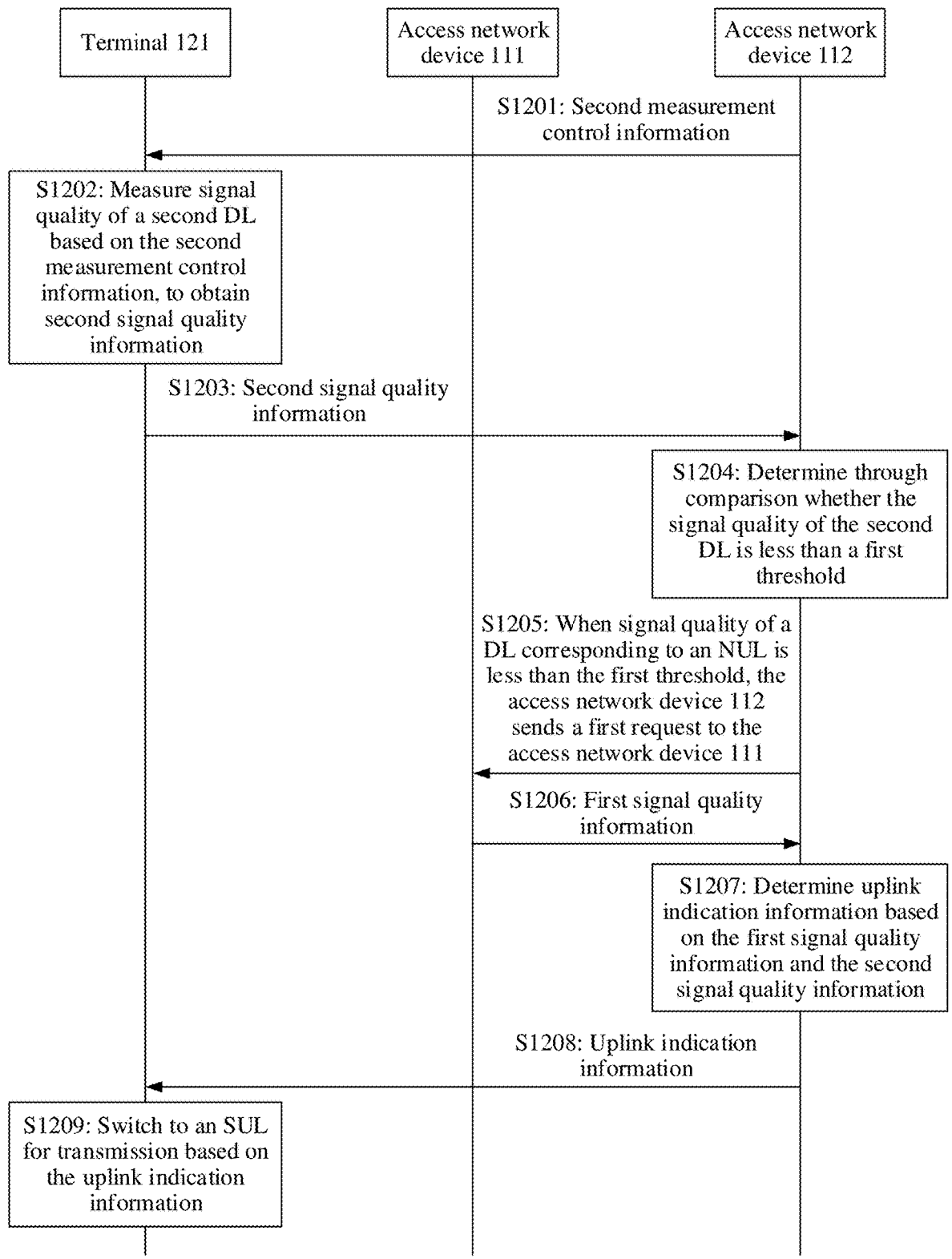
FIG. 12 is a schematic flowchart of an uplink determining method when a terminal is in an NE-DC connected mode.

In another embodiment, the terminal 121 is in an NE-DC connected mode, the terminal 121 currently performs uplink transmission on an NUL, and a frequency band of an SUL is the same as a frequency band of a UL of the access network device 111. The access network device 112 may determine an uplink based on signal quality of a DL of the access network device 112 and signal quality of a DL corresponding to the SUL. FIG. 12 is a schematic flowchart of determining an uplink by the terminal 121 in the NE-DC connected mode. The method includes the following steps.

S1201: The access network device 112 sends second measurement control information to the terminal 121, where the second measurement control information is used to indicate the terminal to measure signal quality of a second DL.

The terminal 121 is in the NE-DC connected mode, and the access network device 112 serves as a master access network device and may exchange control plane signaling and user plane signaling with the terminal 121. In this step, the access network device 112 sends the second measurement control information to the terminal 121.

S1202: The terminal 121 obtains second signal quality information through measurement based on the second measurement control information.

The second signal quality information is used to indicate the signal quality of the second DL.

S1203: The terminal 121 sends the second signal quality information to the access network device 112.

S1204: The access network device 112 determines through comparison whether the signal quality of the second DL is less than a first threshold.

S1205: When the signal quality of the second DL is less than the first threshold, the access network device 112 sends a first request to the access network device 111. The first request is used to request to obtain signal quality of a first DL.

When the signal quality of the second DL is less than the first threshold, it indicates that the terminal 121 is currently in an area with weak coverage of an NR cell, and uplink and downlink decoupling needs to be started. In addition, because the first DL is a DL of the access network device 111, a signal quality value that is of a frequency band of a DL of the access network device 111 and that is received by the access network device 111 from the terminal 121 is the signal quality of the first DL, and the access network device 112 does not need to re-deliver measurement control information to the terminal 121, but sends a first request to the access network device 111 to request the access network device 111 to send the signal quality of the first DL. The first threshold may be referred to as a decoupling start threshold.

S1206: The access network device 111 sends first signal quality information to the access network device 112.

The first signal quality information is used to indicate the signal quality of the first DL.

Optionally, the access network device 111 sends the first signal quality information to the access network device 112 through an X2 interface.

S1207: The access network device 112 determines uplink indication information based on the first signal quality information and the second signal quality information.

The uplink indication information is used to indicate the terminal 121 to maintain transmission on an NUL or switch to an SUL for transmission.

S1208: The access network device 112 sends the uplink indication information to the terminal 121.

S1209: The terminal 121 switches to the SUL for transmission based on the uplink indication information.

In this embodiment, when performing uplink transmission on the NUL, the terminal 121 determines, based on the signal quality of the second DL and the signal quality of the first DL, whether to change to the SUL for transmission, to accurately learn of the signal quality of the first DL, thereby avoiding blindly changing to the SUL, and improving transmission reliability and user experience.

Figure 13:
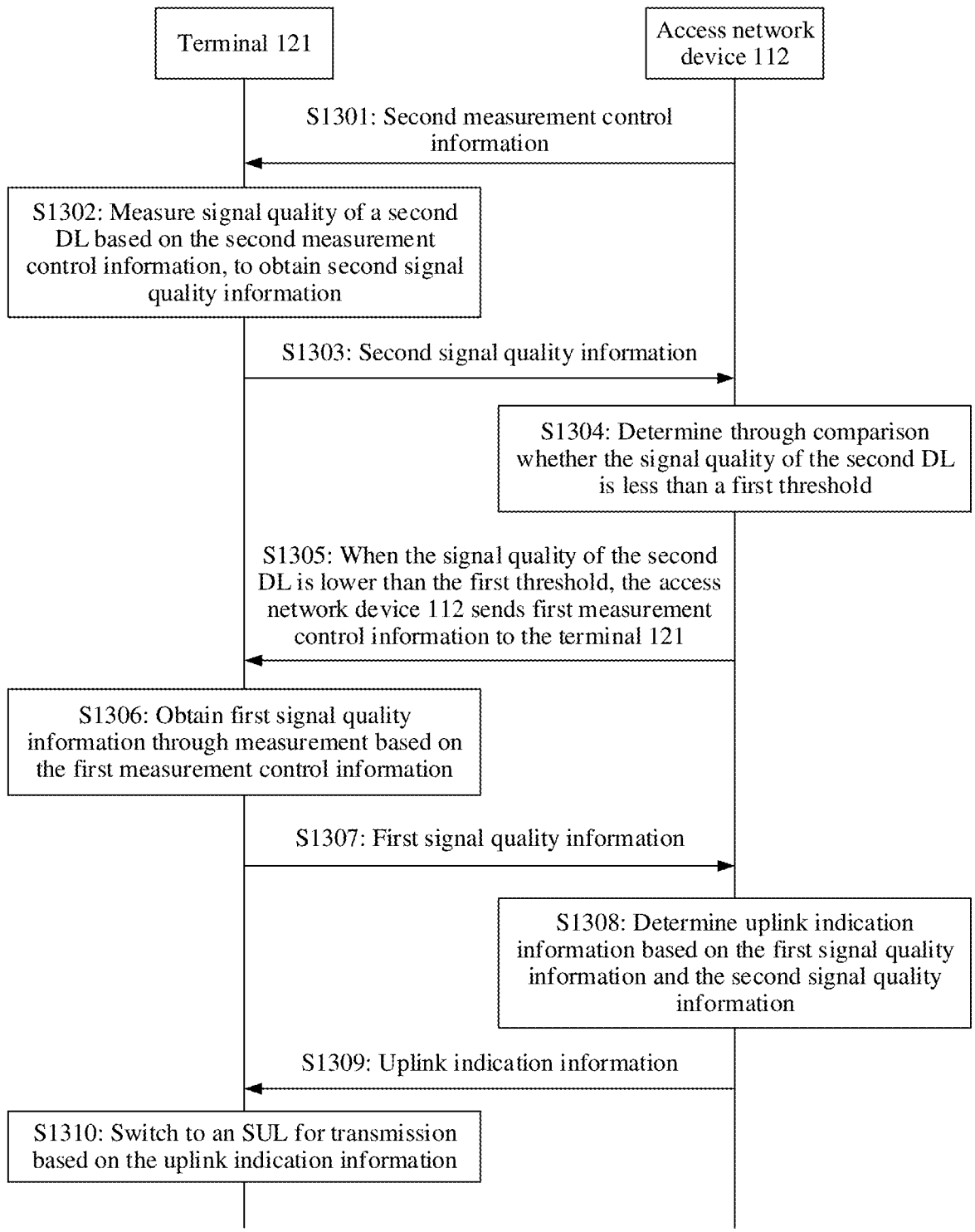
FIG. 13 is a schematic flowchart of an uplink determining method when a terminal is in an NE-DC connected mode or in a scenario of standalone networking of an access network device 112.

In another embodiment, the terminal 121 is in an SA connected mode, and the terminal 121 currently performs transmission on an NUL. Due to an uplink coverage difference between an NUL carrier and an SUL carrier, an uplink change procedure may be performed when the terminal 121 moves in a cell. A network side may select an uplink based on dual thresholds. FIG. 13 is a schematic flowchart of determining an uplink by the terminal 121 in the SA connected mode. It should be noted that, when the terminal 121 is in an EN-DC connected mode or an NGEN-DC connected mode, the access network device 112 may exchange control plane signaling with the terminal 121 through an SRB 3. In this case, this is the same as the procedure in the SA connected mode shown in FIG. 12, and mutual reference may be made. The method includes the following steps.

S1301: The access network device 112 sends second measurement control information to the terminal 121, where the second measurement control information is used to indicate the terminal to measure signal quality of a second DL.

Uplinks between the access network device 112 and the terminal 121 are an NUL and an SUL, and a downlink between the access network device 112 and the terminal 121 is the second DL. The second DL and the NUL use a second frequency band, and the SUL uses an SUL frequency band.

The terminal 121 currently performs uplink transmission on the NUL. After an RRC connection is established, the access network device 112 sends the second measurement control information to the terminal 121, to indicate the terminal 121 to measure the signal quality of the second DL.

S1302: The terminal 121 obtains second signal quality information through measurement based on the second measurement control information.

The second signal quality information is used to indicate the signal quality of the second DL.

S1303: The terminal 121 sends the second signal quality information to the access network device 112.

The second signal quality information indicates the signal quality of the second DL.

S1304: The access network device 112 determines through comparison whether the signal quality of the second DL is lower than a first threshold.

S1305: When the signal quality of the second DL is lower than the first threshold, the access network device 112 sends first measurement control information to the terminal 121, where the first measurement control information is used to indicate the terminal to measure signal quality of the first DL.

When the signal quality of the second DL is less than the first threshold, it indicates that signal coverage of the NUL has become relatively poor, and the access network device 112 sends the first measurement control information to the terminal 121, to indicate the terminal 121 to measure the signal quality of the first DL.

S1306: The terminal 121 obtains first signal quality information through measurement based on the first measurement control information.

The first signal quality information indicates the signal quality of the first DL.

S1307: The terminal 121 sends the first signal quality information to the access network device 112.

S1308: The access network device 112 determines uplink indication information based on the first signal quality information and the second signal quality information.

S1309: The access network device 112 sends the uplink indication information to the terminal 121.

S1310: The terminal 121 switches to the SUL for transmission based on the uplink indication information.

For implementation of steps S1308 to S1310, refer to steps S1012 to S1014 in the embodiment shown in FIG. 10A and FIG. 10B. Details are not described herein again.

In this embodiment, when performing uplink transmission on the NUL, the terminal 121 determines, based on the signal quality of the second DL and the signal quality of the first DL, whether to change to the SUL, to accurately learn of signal quality of a frequency band of the SUL, thereby avoiding blindly changing to the SUL.

The following describes a solution of determining an uplink based on signal quality of an uplink frequency band corresponding to an SUL.

Figure 14:
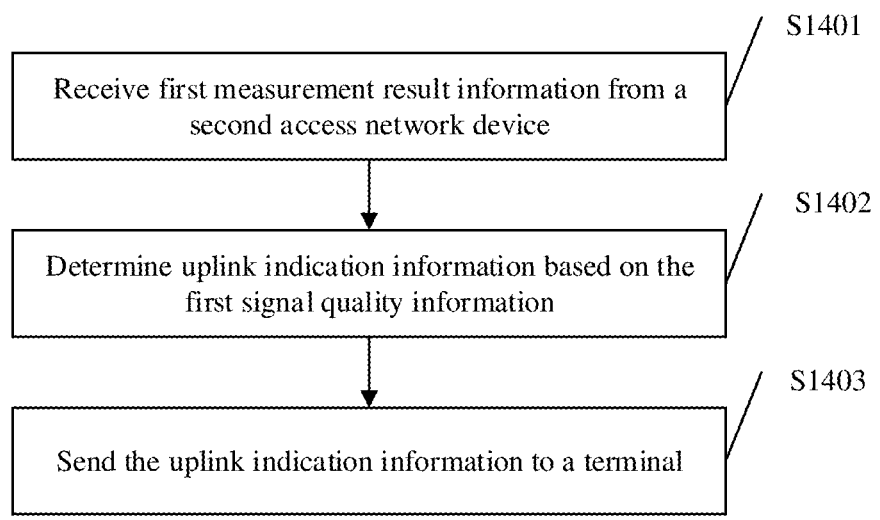
FIG. 14 is a schematic flowchart of still another uplink determining method according to an embodiment of this application.

FIG. 14 is a schematic flowchart of still another uplink determining method according to an embodiment of this application. The method may be applied to the access network device 112 or a chip in the access network device 112. The terminal 121 is in an EN-DC idle mode, an EN-DC connected mode, an NGEN-DC idle mode, or an NGEN-DC connected mode. The method may include the following steps.

S1401: Receive first signal quality information from the access network device 111, where the first signal quality information indicates signal quality of a first UL.

The access network device 112 determines whether to perform uplink and downlink decoupling and whether to perform uplink transmission on an SUL, and needs to obtain a signal quality value of a frequency band corresponding to the SUL. The signal quality value of the frequency band corresponding to the SUL may be the signal quality of the first UL. The first UL uses an uplink frequency band of a first frequency band, and the uplink frequency band of the first frequency band is the same as the frequency band of the SUL.

In this embodiment, the first UL is a UL of the access network device 111. Therefore, the signal quality of the first UL of the access network device 111 is signal quality of an uplink frequency band corresponding to the SUL of the access network device 112.

The access network device 111 receives the signal quality of the first UL that is obtained by the terminal 121 through measurement. The access network device 112 receives the first signal quality information from the access network device 111, where the first signal quality information indicates the signal quality of the first UL.

S1402: Determine uplink indication information based on the first signal quality information.

After receiving the first signal quality information, the access network device 112 determines that the signal quality of the first UL is relatively good, and determines the uplink indication information. The uplink indication is used to indicate to perform uplink transmission on the SUL.

S1403: Send the uplink indication information to the terminal, where the uplink indication information is used to indicate to perform transmission on the SUL.

The access network device 112 may send the uplink indication information to the terminal through the access network device 111, to indicate the terminal to perform transmission on the SUL, thereby improving transmission reliability and user experience.

Specifically, when the terminal 121 is in the EN-DC idle mode or the NGEC-DC idle mode, the uplink indication information is used to indicate to perform random access on the SUL. When the terminal 121 is in the EN-DC connected mode or the NGEN-DC connected mode, the uplink indication information is used to indicate to switch from an NUL to the SUL, and the NUL uses an uplink frequency band of a second frequency band.

Optionally, when the access network device 112 does not perform uplink and downlink decoupling, the access network device 112 usually chooses to perform transmission on the NUL. However, if signal quality of a DL corresponding to the NUL is relatively poor, random access is chosen to be performed on the NUL or transmission is chosen to be continued on the NUL. Consequently, transmission reliability and user experience are reduced.

In this case, further, when the terminal 121 is in the EN-DC connected mode or the NGEN-DC connected mode, the method further includes: determining signal quality information of the second UL. The second signal quality information indicates signal quality of the second UL. The second UL is the NUL of the access network device 112.

The determining uplink indication information based on the first uplink signal quality information includes:

when the signal quality of the second UL is lower than a first threshold, and the signal quality of the first UL exceeds a second threshold, determining the uplink indication information; or when the signal quality of the second UL is lower than a first threshold, and the signal quality of the first UL exceeds the signal quality of the second UL, determining the uplink indication information.

Specifically, to determine the signal quality of the second UL, the access network device 112 may measure an SRS signal sent by the terminal 121, to obtain the signal quality of the second UL.

The access network device 112 obtains the signal quality of the second UL, and when the signal quality of the second UL is relatively poor, determines through comparison whether the signal quality of the first UL is greater than a configured absolute threshold, or whether the signal quality of the first UL is greater than the signal quality of the second UL. Dual thresholds are compared. If the signal quality of the first UL is relatively good, it is determined to perform transmission on the SUL, to avoid blindly performing transmission on the SUL when the signal quality of the first UL is relatively good or when the signal quality of the second UL is relatively poor.

Figure 15:
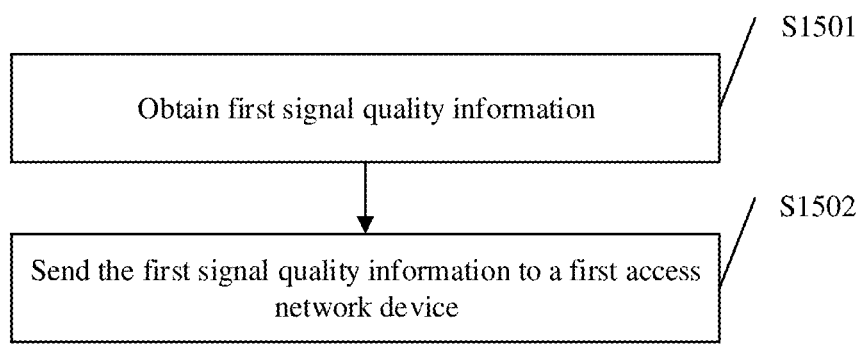
FIG. 15 is a schematic flowchart of still another uplink determining method according to an embodiment of this application.

FIG. 15 is a schematic flowchart of still another uplink determining method according to an embodiment of this application. The method is applied to the access network device 111 or a chip in the access network device 111. The terminal 121 is in an EN-DC idle mode, an EN-DC connected mode, an NGEN-DC idle mode, or an NGEN-DC connected mode. The method may include the following steps.

S1501: Obtain first signal quality information, where the first signal quality information indicates signal quality of the first UL.

The access network device 112 determines whether to perform uplink and downlink decoupling and whether to perform uplink transmission on an SUL, and needs to obtain signal quality of an uplink frequency band corresponding to the SUL. The signal quality of the uplink frequency band corresponding to the SUL may be the signal quality of the first UL.

In this embodiment, the first UL is a UL of the access network device 111. Therefore, signal quality of a UL frequency band corresponding to the SUL is the signal quality of the first UL.

The access network device 111 may measure an SRS sent by the terminal 121, to determine the signal quality of the first UL, and use the signal quality as the first signal quality information.

S1502: Send the first signal quality information to the access network device 112, where the first signal quality information is used to determine uplink indication information.

Optionally, the access network device 111 sends the first signal quality information to the access network device 112 through an interface.

After receiving the first signal quality information, the access network device 112 determines that the signal quality of the first UL is relatively good, and determines the uplink indication information. The uplink indication information is used to indicate the terminal to perform uplink transmission on the SUL.

For example, when the signal quality of the first UL is greater than a second threshold, the uplink indication information is determined. The uplink indication information indicates the terminal 121 to perform transmission on the SUL, for example, perform random access on the SUL or switch from an NUL to the SUL.

Optionally, when the access network device 112 does not perform uplink and downlink decoupling, the access network device 112 usually chooses to perform transmission on the NUL. However, if signal quality of a DL corresponding to the NUL is relatively poor, random access is chosen to be performed on the NUL or transmission is chosen to be continued on the NUL. Consequently, transmission reliability and user experience are reduced.

In this case, further, when the terminal 121 is in the EN-DC connected mode or the NGEN-DC connected mode, the method further includes;

obtaining signal quality information of a second UL. For example, the access network device 112 may measure an SRS sent by the terminal 121, to determine signal quality of the second UL, and use the signal quality of the second UL as second signal quality information. The second UL is the NUL of the access network device 112.

When the signal quality of the second UL is lower than a first threshold, and the signal quality of the first UL exceeds the second threshold, the uplink indication information is determined, where the uplink indication information indicates to perform transmission on the SUL. Alternatively, when the signal quality of the second UL is lower than a first threshold, and the signal quality of the first UL exceeds the signal quality of the second UL, the uplink indication information is determined, where the uplink indication information is used to indicate the terminal to perform transmission on the SUL, for example, to switch from the NUL to the SUL. The access network device 112 further obtains the signal quality of the second UL, and when the signal quality of the second UL is relatively poor, determines through comparison whether the signal quality of the first UL is greater than a configured absolute threshold, or whether the signal quality of the first UL is greater than the signal quality of the second UL. Dual thresholds are compared. If the signal quality of the first UL is relatively good, it is determined to perform transmission on the SUL, to avoid blindly performing transmission on the SUL when the signal quality of the second UL is relatively good or when the signal quality of the first UL is relatively poor.

With reference to different scenarios, the following describes in detail interaction procedures between the access network device 111, the access network device 112, and the terminal shown in FIG. 14 and FIG. 15.

Figure 16A:
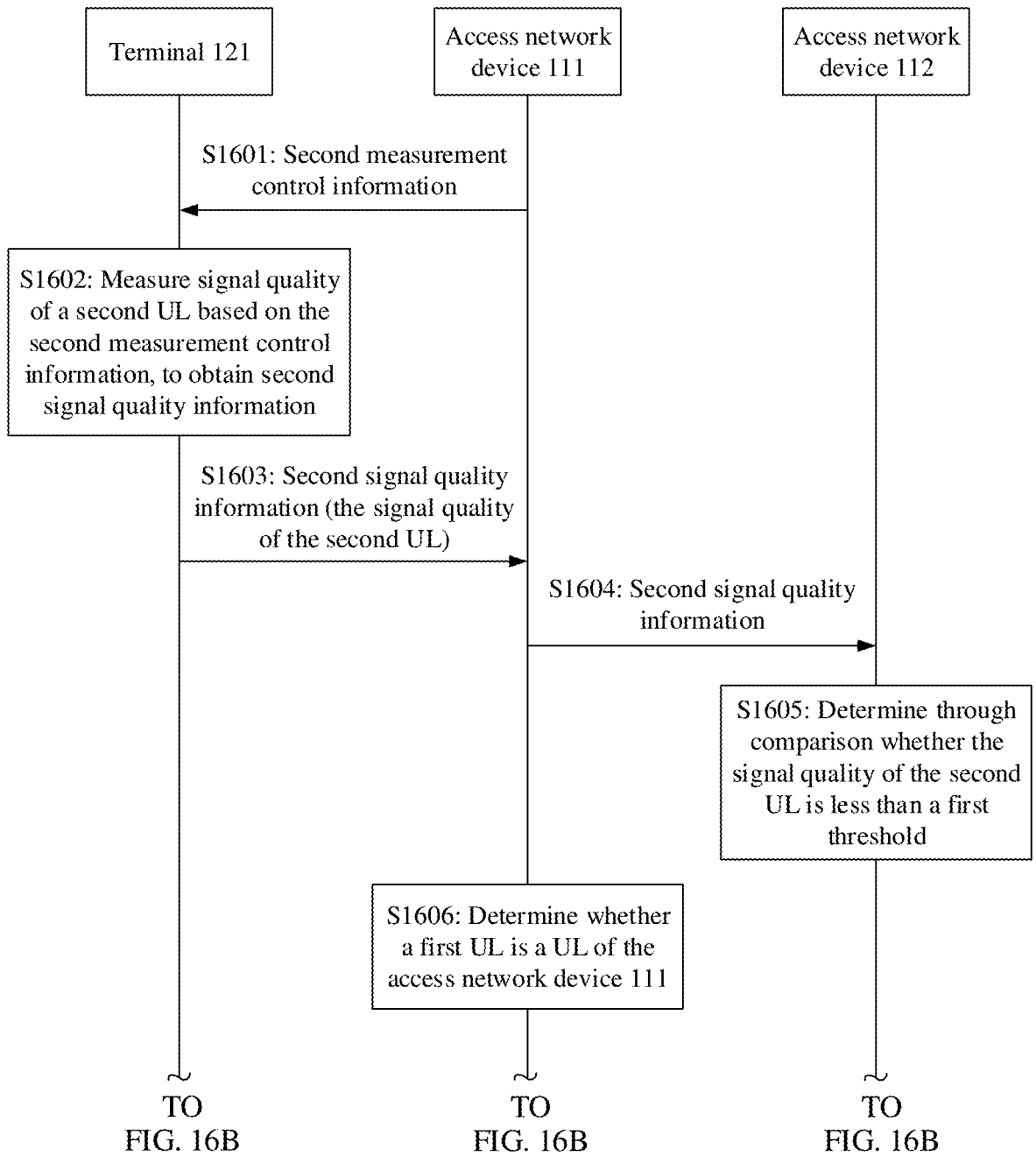
FIG. 16A and FIG. 16B are a schematic flowchart of still another uplink determining method when a terminal is in an EN-DC or NGEN-DC idle mode.
Figure 16B:
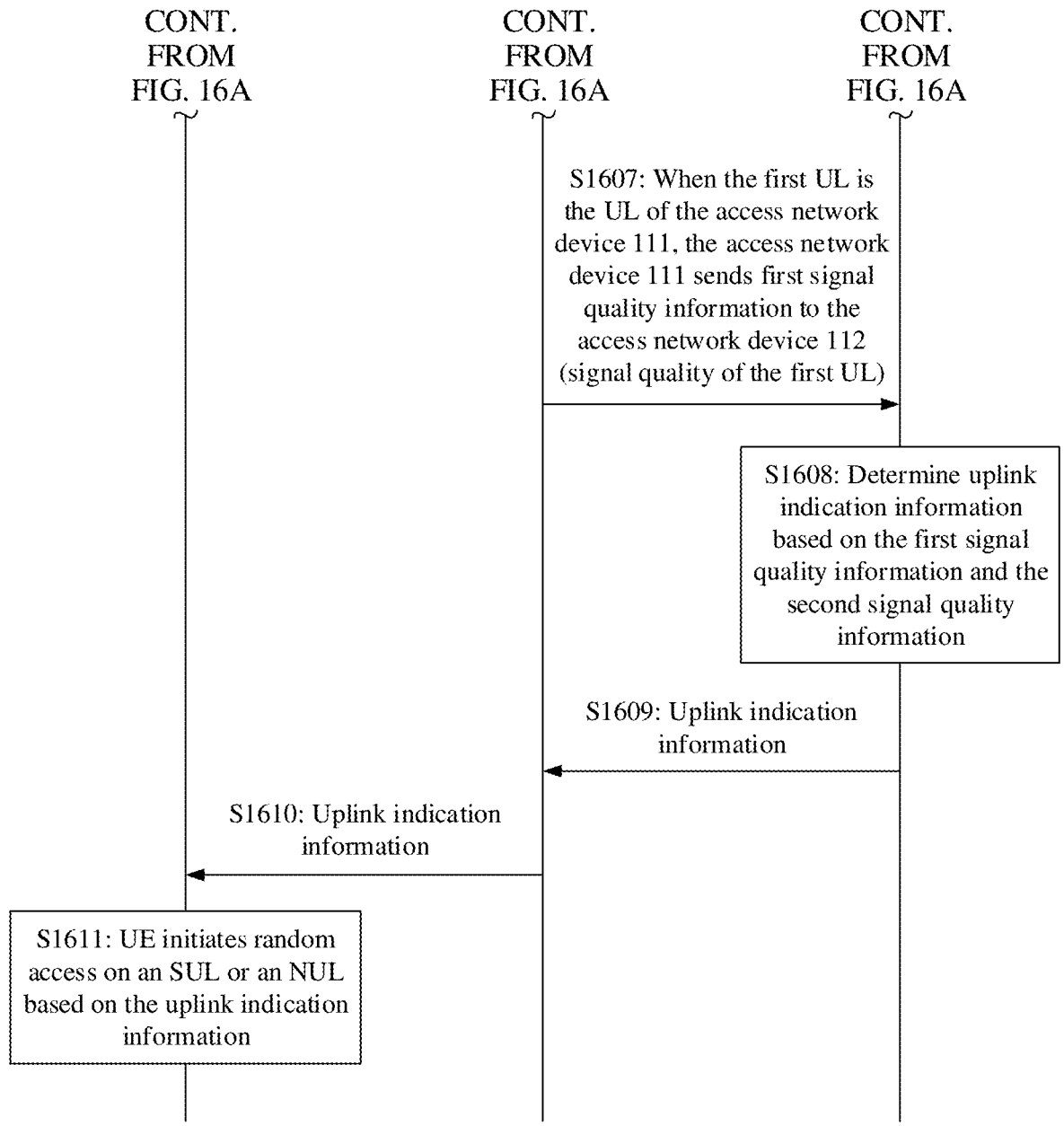

In an embodiment, in the EN-DC scenario, when the terminal 121 has not accessed the access network device 112 (the terminal 121 is in an idle mode), a network side determines an uplink based on signal quality of a second UL and signal quality of a first UL (that is, dual thresholds). In the scenario, the access network device 111 is a master access network device, and the access network device 112 is a secondary access network device. In this embodiment, the first UL is a UL of the access network device 111. FIG. 16A and FIG. 16B are a schematic flowchart of determining an uplink based on dual thresholds in the EN-DC idle mode. The method includes the following steps.

S1601: The access network device 111 sends second measurement control information to the terminal 121, where the second measurement control information indicates to measure signal quality of a second UL.

S1602: The terminal 121 obtains second signal quality information through measurement based on the second measurement control information.

The second signal quality information indicates the signal quality of the second UL.

S1603: The terminal 121 reports the second signal quality information to the access network device 111.

S1604: The access network device 111 sends the second signal quality information to the access network device 112.

S1605: The access network device 112 determines through comparison whether the signal quality of the second UL is less than a first threshold.

The second DL uses a downlink frequency band of a second frequency band.

S1606: The access network device 111 determines whether a first UL is a UL of the access network device 111.

S1607: When the first UL is the UL of the access network device 111, the access network device 111 sends first signal quality information to the access network device 112.

For example, the access network device 111 may send the first signal quality information to the access network device 112 through an X2 interface.

Because the first UL is the UL of the access network device 111, the access network device 111 may indicate, without resending measurement control information to the terminal 121, the terminal 121 to measure signal quality of the first UL. Because the terminal 121 sends the signal quality of the first UL to the access network device 111 periodically or in real time, the access network device 111 may use received latest signal quality of a frequency band of the first UL as the signal quality of the first UL, and send the signal quality to the access network device 112.

For obtaining of the first signal quality information and the second signal quality information, refer to the process in the embodiment shown in FIG. 9A and FIG. 9B. That is, for S1601 to S1607, refer to steps S901 to S907 in the embodiment shown in FIG. 9A and FIG. 9B. A difference lies in that, in this embodiment, the first signal quality information is the signal quality of the first UL, and the second signal quality information is the signal quality of the second UL.

S1608: The access network device 112 determines uplink indication information based on the first signal quality information and the second signal quality information.

S1609: The access network device 112 sends the uplink indication information to the access network device 111.

S1610: The access network device 111 sends the uplink indication information to the terminal 121.

S1611: The terminal 121 initiates random access on an SUL or an NUL based on the uplink indication information.

For implementation of steps S1608 to S1611, refer to steps S811 to S814 in the embodiment shown in FIG. 8A and FIG. 8B. Details are not described herein again.

It can be learned that in this embodiment, uplink and downlink decoupling is divided into two phases, that is, a decoupling start phase and a decoupling trigger phase. When uplink and downlink decoupling is performed, a dual-threshold algorithm is used, that is, both the signal quality of the second UL (a decoupling start threshold) and the signal quality of the first UL (a decoupling trigger threshold) are considered. Uplink and downlink decoupling is implemented only when both the start threshold and the trigger threshold meet a condition.

In this embodiment, the access network device 112 determines, based on the signal quality of the second UL and the signal quality of the first UL (that is, the dual thresholds) that are reported by the terminal 121, how to select an uplink, to accurately learn of signal quality of the SUL, thereby avoiding blindly selecting the SUL for uplink access. In addition, when the signal quality of the second UL is lower than the first threshold, the access network device 111 sends the signal quality of the first UL, that is, a decoupling process is divided into a decoupling start process and a decoupling trigger process, to avoid triggering decoupling prematurely or belatedly.

Figure 17:
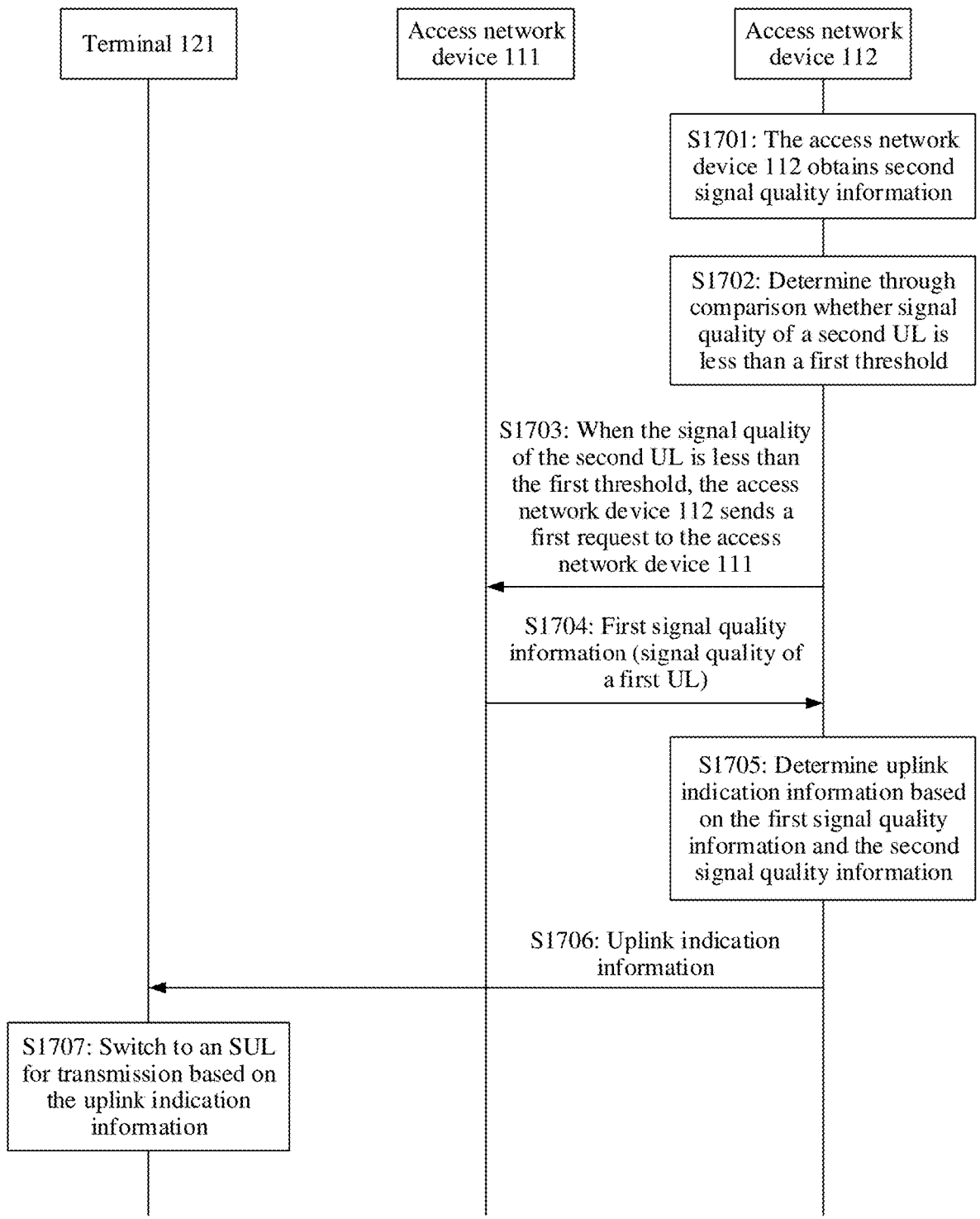
FIG. 17 is a schematic flowchart of still another uplink determining method when a terminal is in an EN-DC or NGEN-DC idle mode.

In another embodiment, the terminal 121 is in an EN-DC connected mode or an NGEN-DC connected mode, it indicates that the terminal 121 has accessed the access network device 112, the terminal 121 currently performs uplink transmission on the NUL, and a frequency band of an SUL is the same as a frequency band of a UL of the access network device 111. Due to an uplink coverage difference between an NUL carrier and an SUL carrier, an uplink change procedure may be performed when the terminal 121 moves in a cell. A network side may select an uplink based on dual thresholds. FIG. 17 is a schematic flowchart of determining an uplink by the terminal 121 in the EN-DC connected mode or the NGEC-DC connected mode. The method includes the following steps.

S1701: The access network device 112 obtains second signal quality information. Optionally, the access network device 112 may measure an SRS sent by the terminal 121, to determine signal quality of a second UL, and use the signal quality as the second signal quality information.

In a first implementation, the access network device 112 may first determine through comparison whether the signal quality of the second UL is less than a first threshold, and then obtains signal quality of a first UL. For example, S1706 and S1707 are as follows:

S1702: The access network device 112 determines through comparison whether the signal quality of the second UL is less than the first threshold.

S1703: When the signal quality of the second UL is less than the first threshold, the access network device 112 sends a first request to the access network device 111. The first request is used to request to obtain the signal quality of the first UL.

When the signal quality of the second UL is less than the first threshold, it indicates that the terminal 121 is currently in an area with weak coverage of an NR cell, and uplink and downlink decoupling needs to be started. In addition, because the first UL is a UL of the access network device 111, a signal quality value that is of a frequency band of the first UL and that is received by the access network device 111 from the terminal 121 is signal quality (first signal quality information) of an uplink frequency band corresponding to an SUL, and the access network device 112 does not need to re-deliver measurement control information to the terminal 121, but sends the first request to the access network device 111 to request the access network device 111 to send the signal quality of the first UL. The first threshold may be referred to as a decoupling start threshold.

In another implementation, when the access network device 111 may determine through comparison that a UL frequency band of the access network device is the same as a frequency band of the SUL of the access network device 112, the access network device 111 may send the first signal quality information to the access network device 112.

S1704: The access network device 111 sends the first signal quality information to the access network device 112.

The first signal quality information indicates the signal quality of the first UL.

Optionally, the access network device 111 sends the signal quality of the first UL to the access network device 112 through an X2 interface.

S1705: The access network device 112 determines uplink indication information based on the first signal quality information and the second signal quality information.

The uplink indication information is used to indicate the terminal 121 to switch from an NUL to the SUL for transmission.

S1706: The access network device 112 sends the uplink indication information to the terminal 121.

S1707: The terminal 121 switches to the SUL for transmission based on the uplink indication information.

In this embodiment, when performing uplink transmission on the NUL, the terminal 121 determines, based on the signal quality of the second UL and the signal quality of the first UL, whether to change to the SUL for transmission, to accurately learn of the signal quality of the UL corresponding to the SUL, thereby avoiding blindly changing to the SUL, and improving transmission reliability and user experience.

The method performed by the access network device 111 in the solutions in this application may be implemented by using the structure in FIG. 3a. The processor 1111 of the access network device 111 may perform transmission with the terminal 121 through the transceiver 1113 and the antenna 1115, for example, send a message such as uplink indication information or measurement control information to the terminal 121. The processor 1111 may receive a message such as signal quality information from the terminal 121 through the transceiver 1113 and the antenna 1115. The processor 1111 may perform transmission with the access network device 112 through the network interface 1114. For example, the processor 1111 may receive the uplink indication information from the access network device 112 through the network interface 1114, and the processor 111 may send the signal quality information to the access network device 112 through the network interface 1114.

Optionally, the memory 1112 may store a computer program or instructions, and the processor 1111 may invoke the computer program or the instructions, to enable the access network device 111 to perform the foregoing method.

The method performed by the access network device 112 in the solutions in this application may be implemented by using the structure in FIG. 3a. The processor 1111 of the access network device 112 may perform transmission with the terminal 121 through the transceiver 1113 and the antenna 1115, for example, send a message such as uplink indication information or measurement control information to the terminal 121. The processor 1111 may receive a message such as signal quality information from the terminal 121 through the transceiver 1113 and the antenna 1115. The processor 1111 may perform transmission with the access network device 111 through the network interface 1114. For example, the processor 1111 may send the uplink indication information to the access network device 111 through the network interface 1114, and the processor 111 may receive the signal quality information from the access network device 111 through the network interface 1114.

Optionally, the memory 1112 may store a computer program or instructions, and the processor 1111 may invoke the computer program or the instructions, to enable the access network device 112 to perform the foregoing method.

The method performed by the access network device 112 in the solutions in this application may be implemented by using the structure in FIG. 3b. The processor 1111 of the terminal 121 may perform transmission with the access network device 111 or the access network device 112 through the transceiver 1113 and the antenna 1115. For example, the processor 1111 may send information such as downlink signal quality information to the access network device 111 or the access network device 112 through the transceiver 1113 and the antenna 1115, and the processor 111 may receive information such as uplink indication information or measurement control information from the terminal 121 through the transceiver 1113 and the antenna 1115.

Optionally, the memory 1112 may store a computer program or instructions, and the processor 1111 may invoke the computer program or the instructions, to enable the terminal 121 to perform the foregoing method.

Figure 18:
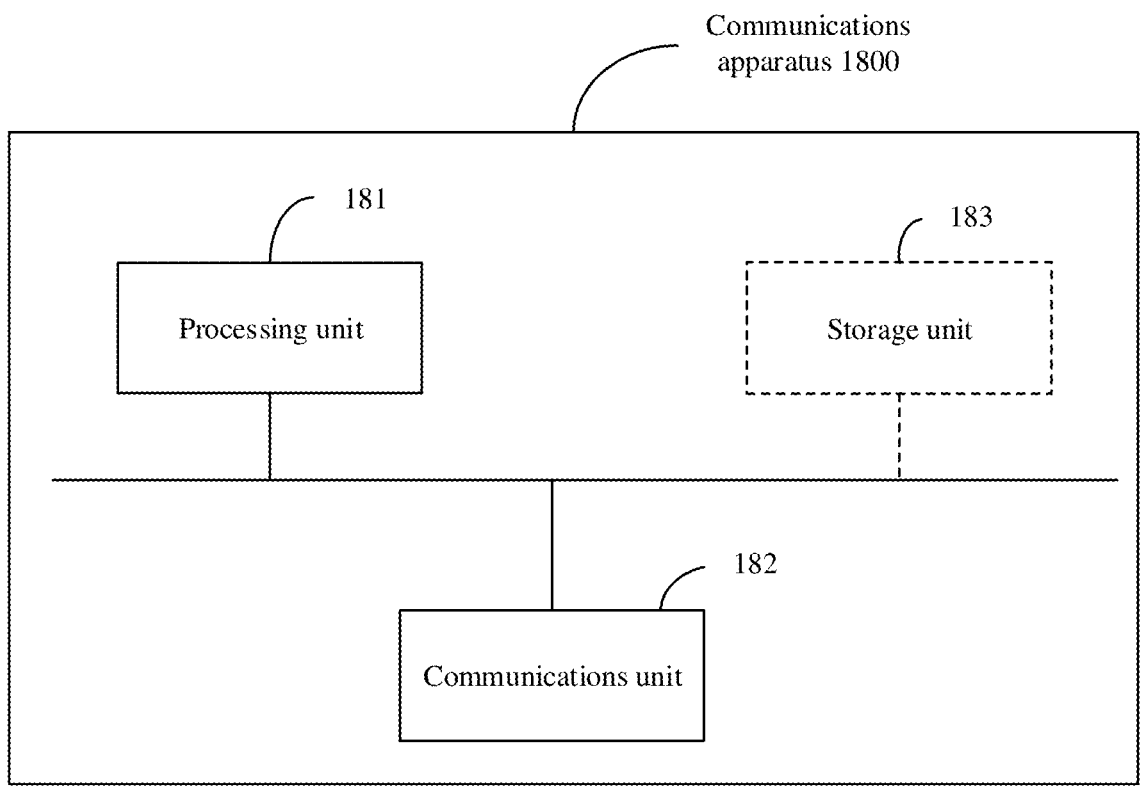
FIG. 18 is a schematic structural diagram of a communications apparatus according to an embodiment of this application.

The following describes an apparatus provided in an embodiment of this application. As shown in FIG. 18, the apparatus includes a processing unit 181 and a communications unit 182. Optionally, the apparatus further includes a storage unit 183. The processing unit 181, the communications unit 182, and the storage unit 183 are connected by using a communications bus.

The communications unit 182 may be an apparatus that has a transceiver function, and is configured to communicate with another network device or a communications network.

The storage unit 183 may include one or more memories. The memory may be a component configured to store a program or data in one or more devices or circuits.

The storage unit 183 may exist independently, and is connected to the processing unit 181 by using the communications bus. The storage unit may alternatively be integrated with the processing unit 181.

The apparatus 1800 may be used in a network device, a circuit, a hardware component, or a chip.

The apparatus 1800 may be the terminal in the embodiments of this application, for example, the terminal 121. The schematic diagram of the terminal may be shown in FIG. 3b. Optionally, the communications unit 182 of the apparatus 1800 may include an antenna and a transceiver of the terminal, for example, the antenna 1216 and the transceiver 1212 in FIG. 3b. Optionally, the communications unit 182 may further include an output device and an input device, for example, the output device 1214 and the input device 1215 in FIG. 3b.

The apparatus 1800 may be a chip in the terminal in the embodiments of this application, for example, the chip in the terminal 121. The communications unit 182 may be an input/output interface, a pin, a circuit, or the like. Optionally, the storage unit may store computer-executable instructions of a method on a terminal side, to enable the processing unit 181 to perform the method on the terminal side in the foregoing embodiments. The storage unit 183 may be a register, a cache, a RAM, or the like, and the storage unit 183 may be integrated with the processing unit 181. The storage unit 183 may be a ROM or another type of static storage device that can store static information and instructions, and the storage unit 183 may be independent of the processing unit 181. Optionally, with development of wireless communications technologies, the transceiver may be integrated into the apparatus 1800. For example, the transceiver 1212 is integrated into the communications unit 182.

When the apparatus 1800 is the terminal in the embodiments of this application or the chip in the terminal, the apparatus 1800 may implement the method performed by the terminal in the foregoing embodiments. The communications unit 182 may send first signal quality information. For details, refer to related content in S601 in FIG. 6. The communications unit 182 may further receive uplink indication information from a first access network device. For details, refer to related content in S602 in FIG. 6. The apparatus may further implement another method performed on the terminal side. For details, refer to related content in FIG. 6, FIG. 8A and FIG. 8B to FIG. 13, FIG. 16A and FIG. 16B, and FIG. 17. Details are not described herein again.

The apparatus 1800 may be the access network device in the embodiments of this application, for example, the access network device 111 or the access network device 112. The schematic diagram of the access network device may be shown in FIG. 3a. Optionally, the communications unit 182 of the apparatus 1800 may include an antenna and a transceiver of the access network device, for example, the antenna 1115 and the transceiver 1113 in FIG. 3a. The communications unit 182 may further include a network interface of the access network device, for example, the network interface 1114 in FIG. 3a.

The apparatus 1800 may be a chip in the access network device in the embodiments of this application, for example, the chip in the access network device 111 or the access network device 112. The communications unit 183 may be an input/output interface, a pin, a circuit, or the like. Optionally, the storage unit may store computer-executable instructions of a method on an access network device side, to enable the processing unit 181 to perform the method on the access network device side in the foregoing embodiments. The storage unit 182 may be a register, a cache, a RAM, or the like, and the storage unit 182 may be integrated with the processing unit 181. The storage unit 182 may be a ROM or another type of static storage device that can store static information and instructions, and the storage unit 182 may be independent of the processing unit 181. Optionally, with development of wireless communications technologies, the transceiver may be integrated into the apparatus 1800. For example, the transceiver 1113 and the network interface 1114 are integrated into the communications unit 182.

When the apparatus 1800 is the access network device 111 in the embodiments of this application or the chip in the access network device 111, the method performed by the access network device 111 in the foregoing embodiments may be implemented. In an embodiment, the communications unit 182 is configured to send first signal quality information to a first access network device: the communications unit 182 is configured to receive uplink indication information from the first access network device: and the communications unit 182 is configured to send the uplink indication information to the terminal. In another embodiment, the processing unit 181 is configured to obtain first signal quality information; and the communications unit 182 is configured to send the first signal quality information to a first access network device. The apparatus may further implement another method performed on the access network device side. For details, refer to related content in FIG. 7, FIG. 8A and FIG. 8B to FIG. 12, and FIG. 14 to FIG. 16A and FIG. 16B. Details are not described herein again.

When the apparatus 1800 is the access network device 112 in the embodiments of this application or the chip in the access network device 112, the method performed by the access network device 112 in the foregoing embodiments may be implemented. In an embodiment, the communications unit 182 is configured to receive first signal quality information. For details, refer to related content in S501 in FIG. 5. The processing unit 181 is configured to determine uplink indication information based on the first signal quality information. For details, refer to related content in S502 in FIG. 5. The communications unit 182 is configured to send the uplink indication information to a terminal. For details, refer to related content in S503 in FIG. 5. In another embodiment, the communications unit 182 is configured to receive first signal quality information from a second access network device: the processing unit 181 is configured to determine uplink indication information based on the first signal quality information: and the communications unit 182 is further configured to send the uplink indication information to a terminal. The apparatus may further implement another method performed on the access network device side. For details, refer to related content in FIG. 8A and FIG. 8B to FIG. 12, FIG. 13, FIG. 15, and FIG. 16A and FIG. 16B. Details are not described herein again.

Figure 19:
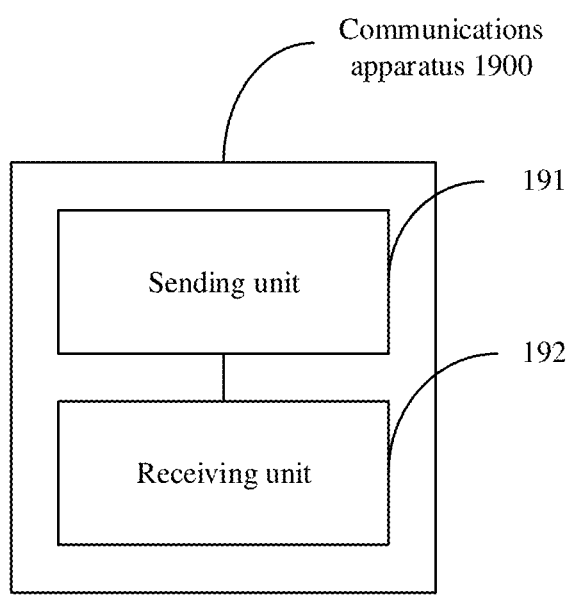
FIG. 19 is a schematic structural diagram of another communications apparatus according to an embodiment of this application.

The following describes an apparatus 1900 provided in an embodiment of this application. As shown in FIG. 19,
the apparatus 1900 includes a sending unit 191 and a receiving unit 192. The sending unit 191 and the receiving unit 192 may be independent units, or may be an entire transceiver unit or communications unit.

The sending unit 191 is configured to send first signal quality information, where the first signal quality information indicates signal quality of a first downlink DL, the first DL uses a downlink frequency band of a first frequency band, an uplink frequency band of the first frequency band is the same as a frequency band of a supplementary uplink SUL of a first access network device, the first signal quality information is used to determine uplink indication information, and the uplink indication information is used to indicate to perform transmission on the SUL.

The receiving unit 192 is configured to receive the uplink indication information from the first access network device.

Optionally, the sending unit 191 is further configured to send second signal quality information, where the second signal quality information indicates signal quality of a second DL of the first access network device, and the second DL uses a downlink frequency band of a second frequency band.

The receiving unit 192 is configured to: when the signal quality of the first DL is higher than a second threshold, receive the uplink indication information from the first access network device: or
the receiving unit 192 is configured to: when the signal quality of the first DL is higher than the signal quality of the second DL, receive the uplink indication information from the first access network device.

Optionally, the receiving unit 192 is further configured to receive the first measurement control information from the first access network device, where the first measurement control information indicates to measure the signal quality of the first DL.

The sending unit 191 is configured to send the first signal quality information to the first access network device.

The receiving unit 192 is configured to receive the second measurement control information from the first access network device.

The sending unit 191 is configured to send the second signal quality information to the first access network device.

Optionally, the receiving unit 192 is further configured to: when the signal quality of the second DL is lower than a first threshold, receive first measurement control information, where the first measurement control information indicates to measure the signal quality of the first DL.

Optionally, the receiving unit 192 is configured to receive the first measurement control information from the first access network device.

The sending unit 191 is configured to send the first signal quality information to the first access network device.

The receiving unit 192 is configured to receive the second measurement control information from the first access network device.

The sending unit 191 is configured to send the second signal quality information to the first access network device.

The first access network device is a secondary access network device, and the second access network device is a master access network device.

The apparatus 1900 may be a wireless communications apparatus, for example, may be a terminal or a chip in a terminal. The apparatus 1900 may implement other functions of the terminal in the embodiments of this application by using the sending unit 191 and the receiving unit 192. For details, refer to related content in the foregoing embodiments.

Figure 20:
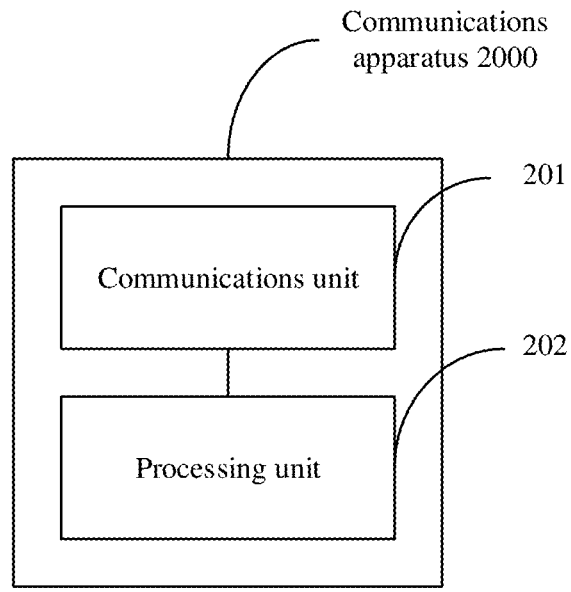
FIG. 20 is a schematic structural diagram of still another communications apparatus according to an embodiment of this application.

The following describes an apparatus 2000 provided in an embodiment of this application. As shown in FIG. 20,
the apparatus 2000 includes a communications unit 201 and a processing unit 202. The communications unit 201 is connected to the processing unit 202.

The communications unit 201 is configured to receive first signal quality information, where the first signal quality information indicates signal quality of a first downlink DL, the first DL uses a downlink frequency band of a first frequency band, and an uplink frequency band of the first frequency band is the same as a frequency band of an SUL of a first access network device.

The processing unit 202 is configured to determine uplink indication information based on the first signal quality information, where the uplink indication information is used to indicate to perform transmission on the SUL.

The communications unit 201 is further configured to send the uplink indication information to a terminal.

Optionally, the communications unit 201 is further configured to receive second signal quality information from the terminal, where the second signal quality information indicates signal quality of a second DL, and the second DL uses a downlink frequency band of a second frequency band.

The processing unit 202 is specifically configured to: when the signal quality of the first DL is higher than a second threshold, determine the uplink indication information: or when the signal quality of the first DL is higher than the signal quality of the second DL, determine the uplink indication information.

Optionally, the communications unit 201 is further configured to: when the signal quality of the second DL is less than a first threshold, deliver first measurement control information to the terminal, where the first measurement control information is used to indicate to measure the signal quality of the first DL.

Optionally, the communications unit 201 is further configured to receive the first signal quality information from a second access network device.

The communications unit 201 is further configured to receive the second signal quality information from the second access network device, where the second signal quality information indicates the signal quality of the second DL of the first access network device, and the second DL uses the downlink frequency band of the second frequency band. The first access network device is a secondary access network device, and the second access network device is a master access network device.

Optionally, the processing unit 202 is further configured to: when the signal quality of the second DL is lower than a first threshold, and the signal quality of the first DL is higher than a second threshold, determine the uplink indication information: or when the signal quality of the second DL is lower than a first threshold, and the signal quality of the first DL is higher than the signal quality of the second DL, determine the uplink indication information.

For more descriptions of the communications unit 201 and the processing unit 202, refer to the descriptions of the embodiments shown in FIG. 5, and FIG. 8A and FIG. 8B to FIG. 12.

Figure 21:
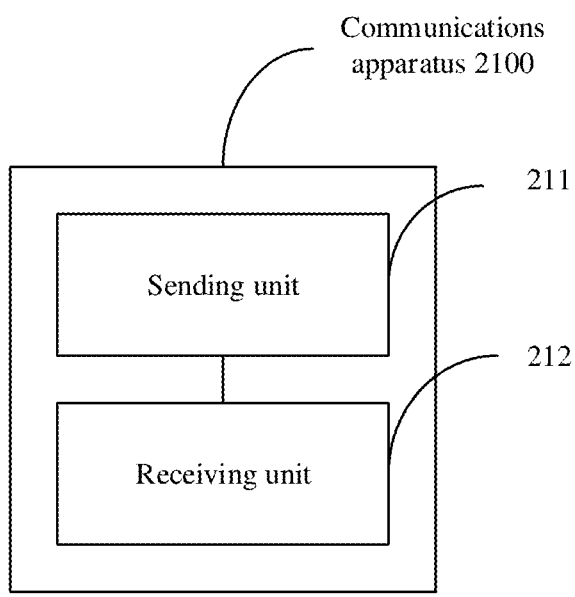
FIG. 21 is a schematic structural diagram of still another communications apparatus according to an embodiment of this application.

The following describes an apparatus 2100 provided in an embodiment of this application. As shown in FIG. 21, the apparatus 2100 includes a sending unit 211 and a receiving unit 212. The sending unit 211 and the receiving unit 212 may be independent units, or may be a unified transceiver unit or communications unit.

The sending unit 211 is configured to send first signal quality information to a first access network device, where the first signal quality information indicates signal quality of a first downlink DL, the first DL uses a downlink frequency band of a first frequency band, and an uplink frequency band of the first frequency band is the same as a frequency band of a supplementary uplink SUL of a first access network device.

The receiving unit 212 is configured to receive the uplink indication information from the first access network device, where the uplink indication information is used to indicate to perform transmission on the SUL.

The sending unit 211 is further configured to send the uplink indication information to the terminal.

Optionally, the sending unit 211 is further configured to send the second signal quality information to the first access network device, where the second signal quality information indicates signal quality of a second DL, and the second DL uses a downlink frequency band of a second frequency band.

When the signal quality of the second DL is less than a first threshold, and the signal quality of the first DL is greater than a second threshold, the uplink indication information indicates to perform transmission on the SUL: or when the signal quality of the second DL is less than a first threshold, and the signal quality of the first DL is greater than the signal quality of the second DL, the uplink indication information indicates to perform transmission on the SUL.

Optionally, the sending unit 211 is configured to send first measurement control information to the terminal, where the first measurement control information indicates to measure the signal quality of the first DL.

The receiving unit 212 is configured to receive the first signal quality information from the terminal.

The sending unit 211 is further configured to send second measurement control information to the terminal, where the second measurement control information indicates to measure the signal quality of the second DL.

The receiving unit 212 is further configured to receive the second signal quality information from the terminal.

For more descriptions of the sending unit 211 and the receiving unit 212, refer to the descriptions of the embodiments shown in FIG. 7 to FIG. 12.

Figure 22:
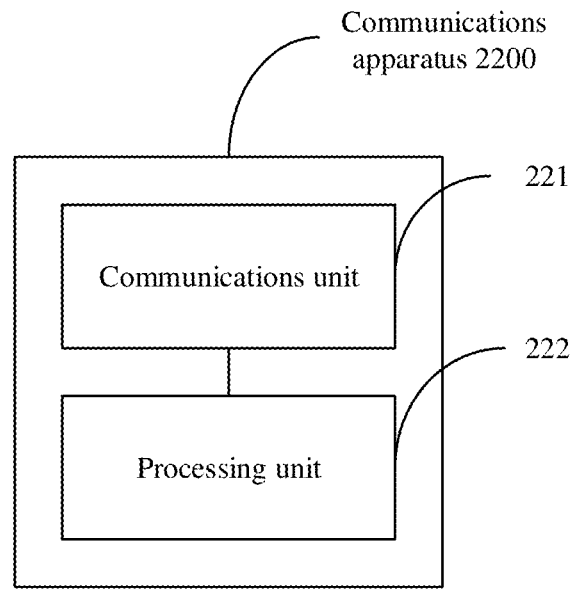
FIG. 22 is a schematic structural diagram of still another communications apparatus according to an embodiment of this application.

The following describes an apparatus 2200 provided in an embodiment of this application. As shown in FIG. 22, the apparatus 2200 includes a communications unit 221 and a processing unit 222. The communications unit 221 is connected to the processing unit 222.

The communications unit 221 is configured to receive first signal quality information from a second access network device, where the first signal quality information indicates signal quality of the first uplink UL, the first UL uses an uplink frequency band of a first frequency band, and the uplink frequency band of the first frequency band is the same as a frequency band of a supplementary uplink SUL of a first access network device.

The processing unit 222 is configured to determine uplink indication information based on the first uplink signal quality information, where the uplink indication information is used to indicate to perform transmission on the SUL.

The communications unit 221 is further configured to send the uplink indication information to a terminal.

The first UL is a UL of the second access network device.

Optionally, the processing unit 222 is further configured to determine second signal quality information, where the second signal quality information indicates signal quality of a second DL, and the second DL uses a downlink frequency band of a second frequency band.

The processing unit 222 is specifically configured to: when the signal quality of the second DL is lower than a first threshold, and the signal quality of the first UL exceeds a second threshold, determine the uplink indication information: or when signal quality of the second DL is lower than a first threshold, and the signal quality of the first UL exceeds signal quality of a second UL, determine the uplink indication information, where the second UL uses an uplink frequency band of the second frequency band.

For more detailed descriptions of the communications unit 221 and the processing unit 222, refer to the descriptions of the embodiments shown in FIG. 13, FIG. 15, and FIG. 16A and FIG. 16B.

Figure 23:
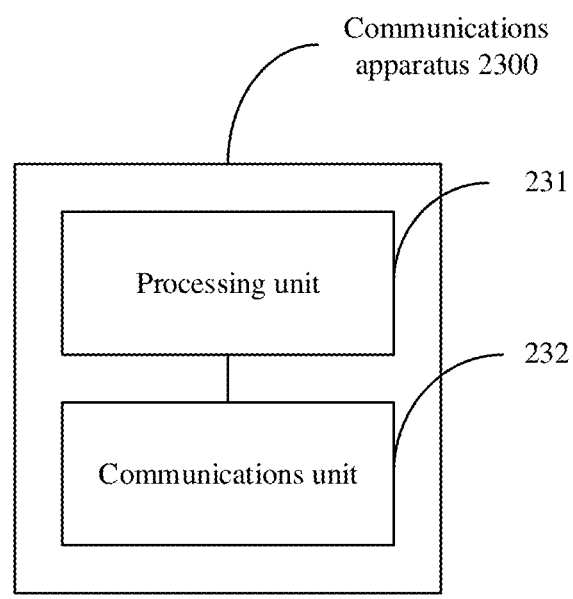
FIG. 23 is a schematic structural diagram of still another communications apparatus according to an embodiment of this application.

The following describes an apparatus 2300 provided in an embodiment of this application. As shown in FIG. 23, the apparatus 2300 includes a processing unit 231 and a communications unit 232. The processing unit 231 is connected to the communications unit 232.

The processing unit 231 is configured to obtain first signal quality information, where the first signal quality information indicates signal quality of a first uplink UL.

The communications unit 232 is configured to send the first signal quality information to a first access network device, where the first signal quality information is used to determine uplink indication information, and the uplink indication is used to indicate to perform transmission on a supplementary uplink SUL of the first access network device.

The first UL is a UL of a second access network device.

Optionally, the communications unit 232 is further configured to receive the uplink indication information from the first access network device, where the uplink indication information indicates to perform transmission on the SUL.

The communications unit 232 is further configured to send the uplink indication information to a terminal.

The first access network device is a secondary access network device, and the second access network device is a master access network device.

Optionally, the processing unit 231 is configured to: when signal quality of the second DL is lower than a first threshold, and the signal quality of the first UL exceeds a second threshold, determine the uplink indication information: or when signal quality of the second DL is lower than a first threshold, and the signal quality of the first UL exceeds signal quality of a second UL, determine the uplink indication information, where the second UL uses an uplink frequency band of a second frequency band.

For specific implementation of the processing unit 231 and the communications unit 232, refer to the descriptions of the embodiments shown in FIG. 14 to FIG. 16A and FIG. 16B.

An embodiment of this application further provides a computer-readable storage medium. The methods described in the foregoing embodiments may be all or partially implemented by using software, hardware, firmware, or any combination thereof. If the methods are implemented in software, functions used as one or more instructions or code may be stored in or transmitted on the computer-readable medium. The computer-readable medium may include a computer storage medium and a communications medium, and may further include any medium that can transfer a computer program from one place to another. The storage medium may be any available medium accessible to a computer.

It should be noted that, terms "system" and "network" in the embodiments of the present invention may be used interchangeably. "A plurality of" means two or more. In view of this, "a plurality of" may also be understood as "at least two" in the embodiments of the present invention. The term "and/or" describes an association relationship for describing associated objects and represents that three relationships may exist. For example, A and/or B may represent the following three cases: Only A exists, both A and B exist, and only B exists. In addition, unless otherwise specified, the character "/" usually indicates an "or" relationship between the associated objects.

A person skilled in the art may clearly understand that, for the purpose of convenient and brief description, for detailed working processes of the foregoing system, apparatus, and unit, refer to corresponding processes in the foregoing method embodiments, and details are not described herein again.

In the several embodiments provided in this application, it should be understood that the disclosed system, apparatus, and method may be implemented in other manners. For example, division into the units is merely logical function division and may be other division during actual implementation. For example, a plurality of units or components may be combined or integrated into another system, or some features may be ignored or not performed. The displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions in the embodiments.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, the procedures or functions according to the embodiments of this application are all or partially generated. The computer may be a general-purpose computer, a special-purpose computer, a computer network, or another programmable apparatus. The computer instructions may be stored in a computer-readable storage medium, or may be transmitted by using a computer-readable storage medium. The computer instructions may be transmitted from a website, computer, server, or data center to another website, computer, server, or data center in a wired (for example, a coaxial cable, an optical fiber, or a digital subscriber line (digital subscriber line, DSL)) or wireless (for example, infrared, radio, or microwave) manner. The computer-readable storage medium may be any usable medium accessible by a computer, or a data storage device, such as a server or a data center, integrating one or more usable media. The usable medium may be a read-only memory (read-only memory, ROM), a random access memory (random access memory, RAM), or a magnetic medium such as a floppy disk, a hard disk, a magnetic tape, a magnetic disk, or an optical medium such as a digital versatile disc (digital versatile disc, DVD), or a semiconductor medium such as a solid-state drive (solid state disk, SSD).

What is claimed is:

1. A method comprising:
receiving first signal quality information, wherein the first signal quality information indicates a signal quality of a first downlink (DL), the first DL works on a downlink frequency band of a first frequency band, and an uplink frequency band of the first frequency band is the same as a frequency band of a supplementary uplink (SUL) of a first access network device; wherein receiving of the first signal quality information further comprises:
receiving the first signal quality information from a second access network device and the receiving of second signal quality information further comprises:
receiving the second signal quality information from the second access network device, wherein the first access network device is a secondary access network device and the second access network device is a master access network device;
receiving second signal quality information, wherein the second signal quality information indicates the signal quality of the second DL of the first access network device;
determining uplink indication information based on the first signal quality information, wherein the uplink indication information indicates the terminal to perform transmission on the SUL; sending the uplink indication information to a terminal; wherein the second DL works on a downlink frequency band of a second frequency band;
switching the terminal from a normal uplink (NUL) configured to work on an uplink frequency band of a second frequency band different from the first frequency band to the SUL, when the signal quality of the first DL is either greater than an absolute threshold or greater than a signal quality of a second DL;

when signal quality of a second DL is less than a decoupling start threshold, comparing the signal quality of the first DL to a decoupling trigger threshold; and when the signal quality of the first DL is greater than the decoupling trigger threshold, initiating random access on the SUL.

2. The method according to claim 1, wherein receiving of the first signal quality information further comprises:

receiving the first signal quality information from the terminal and receiving of the second signal quality information further comprises:

receiving the second signal quality information from the terminal and the method further comprises:

sending second measurement control information to the terminal, wherein the second measurement control information indicates to measure the signal quality of the second DL; and when the signal quality of the second DL is less than a second threshold, delivering first measurement control information to the terminal, wherein the first measurement control information indicates to measure the signal quality of the first DL.

3. The method according to claim 1, wherein transmission on the SUL comprises random access on the SUL.

4. The method according to claim 1, wherein the first DL is a DL of the first access network device.

5. The method according to claim 1, wherein the first DL is not a DL of the first access network device.

6. A method comprising:

sending first signal quality information, wherein the first signal quality information indicates a signal quality of a first downlink (DL), the first DL works on a downlink frequency band of a first frequency band, an uplink frequency band of the first frequency band is the same as a frequency band of a supplementary uplink (SUL) of a first access network device, the first signal information is used to determine uplink indication information, and the uplink indication information indicates a terminal to perform transmission on the SUL; wherein sending the first signal quality information to a second access network device and sending of the second signal quality information further comprises:

sending the second signal quality information to the second access network device, wherein the first access network device is a secondary access network device, and the second access network device is a master access network device; and the method further comprises:

receiving the first measurement control information from the first access network device, wherein the first measurement control information indicates the terminal to measure the signal quality of the first DL; and receiving the second measurement control information from the first access network device, wherein the second measurement control information indicates the terminal to measure the signal quality of the second DL;

sending second signal quality information, wherein the second signal quality information indicates the signal quality of the second DL of the first access network device; wherein the second DL works on a downlink frequency band of a second frequency band;

receiving the uplink indication information from the first access network device;

switching the terminal from a normal uplink (NUL) configured to work on an uplink frequency band of a second frequency band different from the first frequency band to the SUL, when the signal quality of the first DL is either greater than an absolute threshold or greater than a signal quality of a second DL;

when signal quality of a second DL is less than a decoupling start threshold, comparing the signal quality of the first DL to a decoupling trigger threshold; and when the signal quality of the first DL is greater than the decoupling trigger threshold, initiating random access on the SUL.

7. The method according to claim 6, wherein sending of the first signal quality information further comprises:

sending the first signal quality information to the first access network device and sending of the second signal quality information further comprises:

sending the second signal quality information to the first access network device and the method further comprises:

receiving second measurement control information from the first access network device, wherein the second measurement control information indicates the terminal to measure the signal quality of the second DL; and when the signal quality of the second DL is lower than a second threshold, receiving first measurement control information from the first access network device, wherein the first measurement control information indicates the terminal to measure the signal quality of the first DL.

8. The method according to claim 6, wherein the first DL is not a DL of the second access network device.

9. An apparatus comprising:

a processor; and a non-transitory storage medium coupled to the processor and storing executable instructions that, when executed by the processor, cause a terminal to:

send first signal quality information, wherein the first signal quality information indicates a signal quality of a first downlink (DL), the first DL works on a downlink frequency band of a first frequency band, an uplink frequency band of the first frequency band is the same as a frequency band of a supplementary uplink (SUL) of a first access network device, the first signal information is used to determine uplink indication information, and the uplink indication information indicates the terminal to perform transmission on the SUL;

send second signal quality information, wherein the second signal quality information indicates the signal quality of the second DL of the first access network device; wherein the second DL works on a downlink frequency band of a second frequency band;

send the first signal quality information to a second access network device and instructions that cause the terminal to send the second signal quality information further comprise:

send the second signal quality information to the second access network device, wherein the first access network device is a secondary access network device, and the second access network device is a master access network device; and the instructions, when executed by the processor, further cause the terminal to:

receive the first measurement control information from the first access network device, wherein the first measurement control information indicates the terminal to measure the signal quality of the first DL; and receive the second measurement control information from the first access network device, wherein the second measurement control information indicates the terminal to measure the signal quality of the second DL;

receive the uplink indication information from the first access network device;

switch the terminal from a normal uplink (NUL) configured to work on an uplink frequency band of a second frequency band different from the first frequency band to the SUL, when the signal quality of the first DL is either greater than an absolute threshold or greater than a signal quality of a second DL when signal quality of a second DL is less than a decoupling start threshold, comparing the signal quality of the first DL to a decoupling trigger threshold; and when the signal quality of the first DL is greater than the decoupling trigger threshold, initiating random access on the SUL.

10. The apparatus according to claim 9, wherein instructions that cause the terminal to send the first signal quality information further comprise:

instructions that cause the terminal to send the first signal quality information to the first access network device and instructions that cause the terminal to send the second signal quality information further comprise:

instructions that cause the terminal to send the second signal quality information to the first access network device; and the instructions, when executed by the processor, further cause the terminal to:

receive second measurement control information from the first access network device, wherein the second measurement control information indicates the terminal to measure the signal quality of the second DL; and when the signal quality of the second DL is lower than a second threshold, receiving first measurement control information from the first access network device, wherein the first measurement control information indicates the terminal to measure the signal quality of the first DL.

11. The apparatus according to claim 9, wherein the first DL is not a DL of the second access network device.

* * * * *